(12) United States Patent
Hanamura et al.

(10) Patent No.: US 6,654,421 B2
(45) Date of Patent: Nov. 25, 2003

(54) APPARATUS, METHOD AND COMPUTER PROGRAM PRODUCT FOR TRANSCODING A CODED MULTIPLEXED SOUND AND MOVING PICTURE SEQUENCE

(75) Inventors: Tsuyoshi Hanamura, Tokyo (JP); Seiji Ozaki, Tokyo (JP); Satoshi Nishimura, Tokyo (JP); Hiroyuki Kasai, Tokyo (JP); Hideyoshi Tominaga, 3-10, Nishi-Waseda 1-chome, Shinjuku-ku, Tokyo (JP)

(73) Assignees: Hideyoshi Tominaga, Tokyo (JP); Media Glue Corporation, Tokyo (JP)

( * ) Notice: Subject to any disclaimer, the term of this patent is extended or adjusted under 35 U.S.C. 154(b) by 331 days.

(21) Appl. No.: 09/793,630

(22) Filed: Feb. 27, 2001

(65) Prior Publication Data

US 2001/0033619 A1 Oct. 25, 2001

(30) Foreign Application Priority Data

Mar. 2, 2000 (JP) ........................ 2000-057815

(51) Int. Cl.⁷ ..................... H04N 7/12; H04N 11/02; H04N 11/04
(52) U.S. Cl. ................... 375/240.26; 348/699
(58) Field of Search ............... 375/240.25, 240.26, 375/240.28, 240.29; 348/699; H04N 7/12, 11/02, 11/04

(56) References Cited

U.S. PATENT DOCUMENTS

| | | | | |
|---|---|---|---|---|
| 5,598,415 A | * | 1/1997 | Nuber et al. ................. | 370/474 |
| 5,742,623 A | * | 4/1998 | Nuber et al. ................. | 714/798 |
| 5,805,224 A | * | 9/1998 | Keesman et al. ...... | 375/240.04 |
| 6,038,256 A | * | 3/2000 | Linzer et al. .......... | 375/240.12 |
| 6,081,295 A | * | 6/2000 | Adolph et al. ......... | 375/240.03 |
| 6,167,084 A | * | 12/2000 | Wang et al. .......... | 375/240.02 |
| 6,434,197 B1 | * | 8/2002 | Wang et al. ........... | 375/240.29 |
| 6,493,386 B1 | * | 12/2002 | Vetro et al. ............. | 375/240.1 |

* cited by examiner

Primary Examiner—Nhon Diep
(74) Attorney, Agent, or Firm—Venable, LLP; Ralph P. Albrecht

(57) ABSTRACT

Herein disclosed is an apparatus for transcoding a coded multiplexed sound and moving picture sequence comprises the rate converter, which is operated to compress only the video bit streams, which have extremely large information volume. The compression operation is carried out through the steps of (a) operating the MPEG-2 TS demultiplexer to demultiplex the input MPEG-2 transport streams into video TS, audio TS, and system information TS; (b) operating the MPEG-2 video transcoder to transcode the video TS to generate output video TS having information volume less than the video TS; (c) operating the system controller to modify or not modify part of fixed codes of the system information TS in accordance with the output MPEG-2 transport streams; (d) operating the MPEG-2 TS multiplexer to multiplex the video TS thus transcoded, the audio TS, and the eventually partly-modified or not modified system information TS into output MPEG-2 transport streams, and output the output MPEG-2 transport streams, thereby making it possible to control the output bit rate less than the input bit rate.

30 Claims, 26 Drawing Sheets

FIG.7

| PAT | PMT |
|---|---|
| section_length | table_id |
| transport_stream_id | section_length |
| version_number | version_number |
| current_next_indicator | current_next_indicator |
| section_number | section_number |
| last_section_number | last_section_number |
| program_number | program_number |
| program_map_PID | program_info_length |
| network_PID | program_info[] |
| | stream_type |
| | elementary_PID |
| | ES_info_length |
| | ES_info[] |

ND COMPUTER
PRODUCT FOR TRANSCODING
A CODED MULTIPLEXED SOUND AND
MOVING PICTURE SEQUENCE

BACKGROUND OF THE INVENTION

1. Field of the Invention

The present invention relates to an apparatus, a method and a computer program product for transcoding a coded multiplexed sound and moving picture sequence, and more particularly, to an apparatus, a method and a computer program product for demultiplexing the first coded multiplexed sound and moving picture sequence signal containing video information, audio information, and program information into video information data strings, audio information data strings, and control information data strings, compress the video information data strings, and multiplex the compressed video information data strings, the audio information data strings, and the control information data strings in to the second coded multiplexed sound and moving picture sequence signal, and thus converting a first coded multiplexed sound and moving picture sequence signal containing video information, the audio information, and the program information in the form of bit streams transmitted at a first bit rate into a second coded multiplexed sound and moving picture sequence signal in the form of bit streams transmitted at a second bit rate lower than the first bit rate.

2. Description of the Related Art

There have so far been proposed a wide variety of systems for compressing and encoding a moving picture having a considerable large amount of data to produce a coded moving picture sequence signal. The international standard, ISO-IEC 13818-2, was created for a system operable to encode a digital video signal associated with a digital audio signal and commonly called "Moving Picture Expert Group Phase 2", i.e., "MPEG-2". The MPEG-2 system is designed to encode a digital video signal associated with a digital audio signal to generate a coded multiplexed sound and moving picture sequence signal in the form of bit streams. For avoiding tedious repetition in the following description, the bit streams conformable to the above MPEG-2 standard will be referred to as "MPEG-2 bit streams", and a device for encoding a digital video signal associated with a digital audio signal to generate a coded multiplexed sound and moving picture sequence signal in the form of bit streams will be referred to as an "encoder", hereinlater. In recent years, the MPEG-2 standard has become increasingly applied for various technical systems such as a communicating system, and a television broadcasting system.

The above MPEG-2 bit streams are each of a hierarchical structure consisting of: a top, sequence layer; a GROUP OF PICTURES layer; a picture layer; a slice layer; a macroblock layer; and a low, block layer.

The typical encoder is operable under the MPEG-2 standard through a method of compressing and encoding a moving picture as follows. The method comprises the steps of:
(a) inputting the moving picture sequence consisting of a series of pictures;
(b) temporally storing the series of pictures as frames in memories, respectively;
(c) computing a difference between one frame and another frame to eliminate redundancy in a time axis direction; and
(d) orthogonal transforming, e.g., discrete cosine transforming (DCT), a plurality of picture elements within each of the frames to eliminate redundancy in a spatial axis direction.

The encoder thus constructed can compress and encode the moving picture to generate and output a coded moving picture sequence signal in the form of the MPEG-2 bit streams through a transmitting path at a predetermined bit rate. The coded signal is then transmitted from the encoder to a decoder which is adapted to decode the coded signal to reproduce the moving picture. The typical decoder is operated to decode the coded signal through a so-called bi-directionally predicting method which comprises the steps of:
(a) storing one reproduced picture, generally referred to as "intra-picture", i.e., "I-picture", in a first frame memory;
(b) estimating another picture generally referred to as "predictive-picture", i.e., "P-picture", followed by the I-picture, on the basis of the information on a difference between I-picture and P-picture;
(c) storing the estimated picture in a second frame memory; and
(d) estimating further another picture interposed between the I-picture and P-picture, generally referred to as "bi-directionally predictive-picture", i.e., "B-picture".

Here, the I-picture is encoded independently of the pictures of the other types, so that a single I-picture can be reproduced as a static image only by itself. A P-picture can be predicted on the basis of the I-picture or a P-picture located on a position prior to the P-picture to be encoded.

In the above encoder, a volume of information on the coded moving picture sequence signal is, however, variable. In particularly, the volume of information increases remarkably when a scene is changed. The decoder is generally provided with an input buffer for receiving the coded moving picture sequence signal from the encoder. The input buffer of the decoder, however, has a limited storage capacity. Therefore, when a large number of bits of the coded moving picture sequence signal are transmitted from the encoder to the decoder, the input buffer overflows with the bits of the coded moving picture sequence signal thereby making the decoder difficult to process the coded moving picture sequence signal. In order to transmit such coded moving picture sequence signal having a variable number of bits through the transmitting path at a predetermined bit rate and to make it possible for any decoder to receive the whole of the coded moving picture sequence signal without overflow, the encoder comprises: an output buffer for temporally storing the coded moving picture sequence signal before transmitting the coded moving picture sequence signal through the transmitting path; and a rate controller for controlling the volume of information on the coded moving picture sequence signal stored in the output buffer so as to keep the volume of information on the coded moving picture sequence signal to be transmitted to the decoder from exceeding the volume of the input buffer of the decoder and then to control the bit rate of the coded moving picture sequence signal.

A typical rate controlling method in MPEG-2 standard is described in "ISO-IEC/JTC1/SC29/WG11/N0400 Test Model 5", April, 1993, hereinlater referred to as "TM-5". The rate controlling method according to the TM-5 comprises the steps of:
(I) allocating a target number of bits to a picture of each type on the basis of the total number of bits available to the current pictures to be encoded in the GROUP OF PICTURES, i.e., R, which will be described hereinafter;
(II) computing the reference value of a quantization parameter used for the quantization of each of macroblocks in a current picture on the basis of the utilization volume of a "virtual buffer" to perform the rate control; and (III) modulating the reference value of the quantization parameter in accordance with the spatial activity in the macroblock.

Furthermore, there are many types of decoders. For instance, a decoder is designed to decode the coded signal in a unique compression format different from that of MPEG-2 bit streams, and another decoder is connectable to a transmitting path having a different bit rate. The decoders of these types are therefore required to provide with an apparatus, a so-called transcoder, for converting the MPEG-2 bit streams into another appropriate coded signal in the specified format having the required bit rate. The transcoder makes it possible for the encoder to transmit the coded signal to any types of decoders.

Referring to FIG. 18 of the drawings, there is shown a conventional transcoder of one typical type as a first conventional transcoder 50. The conventional transcoder 50 has an input terminal $a_1$ electrically connected to a first transmitting path, not shown, and an output terminal $a_2$ electrically connected to a second transmitting path, not shown. The conventional transcoder 50 is designed to input first bit streams $b_1$ at a predetermined input bit rate through the input terminal $a_1$, to convert the first bit streams $b_1$ into second bit streams $b_2$ to be outputted at a predetermined output bit rate, i.e., a target bit rate, lower than the input bit rate of the inputted first bit streams $b_1$, and then to output the second bit streams $b_2$ through the output terminal $a_2$. The conventional transcoder 50 comprises a variable length decoder 51, referred to as "VLD" in the drawings, an inverse quantizer 53, referred to as "IQ" in the drawings, a quantizer 55, referred to as "Q" in the drawings, a variable length encoder 57, referred to as "VLC" in the drawings, and a rate controller 59.

The variable length decoder 51 is electrically connected to the input terminal $a_1$ and designed to decode a coded moving picture sequence signal within the first bit streams $b_1$ inputted through the input terminal $a_1$ to reconstruct original picture data for each of pictures including a matrix of original quantization coefficients, referred to as "level", for each of macroblocks within each of the pictures and an original quantization parameter, hereinlater referred to as "first quantization parameter $Q_1$".

The inverse quantizer 53 is electrically connected to the variable length decoder 51 and designed to input the matrix of original quantization coefficients level from the variable length decoder 51 and the first quantization parameter $Q_1$. The inverse quantizer 53 is further designed to inversely quantize the inputted matrix of original quantization coefficients level with the first quantization parameter $Q_1$ to generate a matrix of de-quantization coefficients, referred to as "dequant", i.e., DCT coefficients, for each of macroblocks as follows:

$$\text{dequant} = \{2 \times \text{level} + \text{sign}(\text{level})\} \times \frac{Q_1 \times QM}{32} \quad \text{equation (1)}$$

or $$\text{dequant} = \text{level} \times \frac{Q_1 \times QM}{16} \quad \text{equation (2)}$$

where the equation (1) is used for the inter macroblock, while the equation (2) is used for the intra macroblock. QM is a matrix of quantization parameters stored in a predetermined quantization table. The first quantization parameter $Q_1$ and the matrix of quantization parameters QM are derived from the inputted first bit streams $b_1$ by the decoder 51. Here, the original quantization coefficients level, the de-quantization coefficients dequant, the matrix of quantization parameters QM, and the first quantization parameter $Q_1$ are integers. The de-quantization coefficients dequant calculated by the equations (1) and (2) should be rounded down to the nearest one.

The quantizer 55 is electrically connected to the inverse quantizer 53 and designed to input the matrix of de-quantization coefficients dequant from the inverse quantizer 53 and then quantize the inputted matrix of de-quantization coefficients dequant for each of macroblocks with a second quantization parameter, referred to as "$Q_2$" hereinlater, to generate a matrix of re-quantization coefficients, referred to as "tlevel", as follows:

$$\text{tlevel} = \text{dequant} \times \frac{16}{Q_2 \times QM} \quad \text{equation (3)}$$

or $$\text{tlevel} = \text{dequant} \times \frac{16}{Q_2 \times QM} + \text{sign}(\text{dequant}) \times \frac{1}{2} \quad \text{equation (4)}$$

where the equation (3) is used for the inter macroblock, while the equation (4) is used for the intra macroblock. The second quantization parameter $Q_2$ is obtained by the rate controller 59. Here, the re-quantization coefficients tlevel and the second quantization parameter $Q_2$ are also integers. The re-quantization coefficients tlevel calculated by the equations (3) and (4) should be rounded down to the nearest one. Such rounding operation for the integers will be omitted from the later description for avoiding tedious repetition.

The variable length encoder 57 is electrically connected to the quantizer 55 and designed to input the re-quantization coefficients tlevel from the quantizer 55 and then encode the inputted matrix of the re-quantization coefficients tlevel to generate objective picture data for each of pictures to sequentially output the objective picture data in the form of the second bit streams $b_2$ through the output terminal $a_2$. The variable length encoder 57 is further electrically connected to the variable length decoder 51 and designed to input a diversity of information data included in the first bit streams $b_1$ necessary for the second bit streams $b_2$ from the variable length decoder 51.

The rate controller 59 is electrically connected to the inverse quantizer 53 and designed to perform rate control process in accordance with the TM-5 on the basis of the information obtained from the inverse quantizer 53 as described below.

Referring to FIG. 19 of the drawings, there is shown a flowchart of the rate controlling process in accordance with the TM-5 carried out in the conventional transcoder 50. As shown in FIG. 19, the rate controlling process comprises steps A1 to A14.

In the step A1, "1" is assigned to a picture number variable n representing the serial number of a picture within the first bit streams $b_1$. Hereinlater, a n-th picture in the first bit streams b, is referred to as "pic(n)".

In the following step A2, a global complexity measure, referred to as $X_i$, $X_p$, or $X_b$, for a picture of the corresponding type, i.e., I, P or B-picture is computed as follows:

$$X_i = S_i \times Q_i \quad \text{equation (5)}$$

or $$X_p = S_p \times Q_p \quad \text{equation (6)}$$

or $$X_b = S_b \times Q_b \quad \text{equation (7)}$$

where $S_i$, $S_p$, or $S_b$ is the number of bits generated for an encoded I, P or B-picture, and $Q_i$, $Q_p$, or $Q_b$ is the average quantization parameter computed by averaging the actual quantization values used during the quantization of the all macroblocks within I, P or B-picture. The average quantization parameters $Q_i$, $Q_p$, and $Q_b$ are normalized within a range of 1 to 31. The average quantization parameters $Q_i$, $Q_p$, and $Q_b$ respectively correspond to the first quantization parameters $Q_1$ obtained from the variable length decoder 51.

The global complexity measure $X_i$, $X_p$, or $X_b$ of the corresponding picture is inversely proportional to the compressing ratio of the moving picture, namely, a ratio of the volume of information in the second bit streams $b_2$ to that in the first bit streams $b_1$. Namely, as the volume of information on the first bit streams $b_1$ becomes larger, the compressing ratio is decreased. Therefore, the global complexity measure $X_i$, $X_p$, or $X_b$ of the corresponding picture becomes larger, as the compressing ratio is decreased. In contrast, the global complexity measure $X_i$, $X_p$, or $X_b$ of the corresponding picture becomes smaller, as the compressing ratio is increased.

The initial value of global complexity measure $X_i$, $X_p$, or $X_b$ of the corresponding picture is given as follows:

$$X_i = 160 \times Target\_Bitrate/115 \quad \text{equation (8)}$$

or $$X_p = 60 \times Target\_Bitrate/115 \quad \text{equation (9)}$$

or $$X_b = 42 \times Target\_Bitrate/115 \quad \text{equation (10)}$$

where Target_Bitrate is measured in bits/s and corresponds to the target bit rate of the first conventional transcoder 50.

In the following step A3, the target number of bits for a picture of the corresponding type, i.e., I, P or B-picture to be encoded in the current GROUP OF PICTURES, referred to as $T_i$, $T_p$, or $T_b$ is computed as:

$$T_i = \frac{R}{1 + \frac{N_p X_p}{X_i K_p} + \frac{N_b X_b}{X_i K_b}} \quad \text{equation (11)}$$

or $$T_p = \frac{R}{N_p + \frac{N_b K_p X_b}{K_b X_p}} \quad \text{equation (12)}$$

or $$T_b = \frac{R}{N_b + \frac{N_p K_b X_p}{K_p X_b}} \quad \text{equation (13)}$$

where $N_p$ and $N_b$ are the number of P-pictures and B-pictures remained not yet encoded in the current GROUP OF PICTURES, respectively. $K_p$ and $K_b$ are constants computed on the basis of the ratio of the quantization value of P-picture to the quantization value of I-picture, and the ratio of the quantization parameter of B-picture to the quantization value of I-picture, respectively. When it is assumed that $K_p=1.0$ and $K_b=1.4$, the quality of the image can be always optimized.

In the following step A4, it is judged upon whether the picture number variable n is "1" or not, i.e., the current picture is the first picture pic(1) or not. When it is judged that the picture number variable n is "1", i.e., the current picture is the first picture pic(1), the step A4 goes forward to the step A5. When, on the other hand, it is judged that the picture number variable n is not "1", i.e., the current picture is not the first picture, the step A4 goes forward to the step A6. In the step A5, the total number of bits available to the pictures to be encoded in the current GROUP OF PICTURES, i.e., the remaining number of bits available to the GROUP OF PICTURES, hereinlater referred to as R, is initialized in accordance with the following equation (14). This remaining number of bits available to the GROUP OF PICTURES R is computed before encoding the first picture pic(1) within the GROUP OF PICTURES, as follows:

$$R = Target\_Bitrate \times NPIC/picture\_rate + R \quad \text{equation (14)}$$

where NPIC is the total number of pictures of any type in the GROUP OF PICTURES, and picture_rate is expressed in the number of pictures decoded and indicated per second. At the start of the sequence R=0.

In the step A6, the above remaining number of bits available to the GROUP OF PICTURES R is updated before encoding the current picture pic(n) as follows:

$$R = R - S_i \quad \text{equation (15)}$$

or $$R = R - S_p \quad \text{equation (16)}$$

or $$R = R - S_b \quad \text{equation (17)}$$

where $S_i$, $S_p$, or $S_b$ is the number of bits generated in the previously encoded picture pic(n−1) of the corresponding type (I, P or B).

The step A5 or A6 goes forward to the step A7 wherein "1" is assigned to a macroblock number variable j (j>=1) representing the serial number of a macroblock within one of the pictures. Hereinlater, the j-th macroblock in the picture is referred to as "MB(j)".

In the following step A8, a utilization volume of the capacity of a virtual buffer for I, P or B-pictures, referred to as $d_i(j)$, $d_p(j)$ or $d_b(j)$, is computed before encoding the macroblock MB(j) as follows:

$$d_i(j) = d_i(0) + B(j-1) - \frac{T_i \times (j-1)}{NMB} \quad \text{equation (18)}$$

or $$d_p(j) = d_p(0) + B(j-1) - \frac{T_p \times (j-1)}{NMB} \quad \text{equation (19)}$$

or $$d_b(j) = d_b(0) + B(j-1) - \frac{T_b \times (j-1)}{NMB} \quad \text{equation (20)}$$

where B(j−1) is the total number of bits generated for encoded macroblocks in the picture up to and including the U-l)th macroblock MB(j−1). NMB is the total number of macroblocks in the picture. $d_i(j)$, $d_p(j)$, or $d_b(j)$ is the utilization volume of the capacity of the virtual buffer at the j-th macroblock MB(j) for I, P, or B-picture.

$d_i(0)$, $d_p(0)$, or $d_{b(0)}$ is the initial utilization volume of the virtual buffer for I, P, or B-picture and given by:

$$d_i(0) = 10 \times r/31 \quad \text{equation (21)}$$

or $$d_p(0) = K_p \times d_i(0) \quad \text{equation (22)}$$

or $$d_b(0)=K_b \times d_i(0) \qquad \text{equation (23)}$$

where r is referred to as "reaction parameter" and used for the control of a reaction rate of the feed back loop as follows:

$$R = 2 \times Target\_Bitrate/picture\_rate \qquad \text{equation (24)}$$

The final utilization volume of the virtual buffer, referred to as, $d_i(NMB)$, $d_p(NMB)$, or $d_b(NMB)$ of the last macroblock, i.e., NMB-th macroblock MB(NMB) of the current picture pic(n) will be used as the initial utilization volume of the virtual buffer for I, P, or B-picture, i.e., $d_i(0)$, $d_p(0)$, or $d_b(0)$ of the same type to encode the first macroblock MB(1) within the next picture pic(n+1).

In the following step A9, the reference quantization parameter Q(j) of the j-th macroblock MB(j) for each of the pictures is computed on the basis of the aforesaid utilization volume of the virtual buffer, i.e., d(j) as follows:

$$Q(j) = d(j) \times 31/r \qquad \text{equation (25)}$$

Here, the reference quantization parameter Q(j) is identical with the aforesaid second quantization parameter $Q_2$ of the j-th macroblock MB(j).

In the following step A10, the j-th macroblock MB(j) is quantized with the reference quantization parameter Q(j) computed in the step A9. In the following step A11, the macroblock number variable j is incremented by one. The step A11 goes forward to the step A12 wherein it is judged upon whether the macroblock number variable j is more than the total number of macroblocks NMB within the n-th picture pic(n) or not. When it is judged that the macroblock number variable j is not more than the total number of macroblocks NMB within the n-th picture pic(n), the step A12 returns to the step A8. When, on the other hand, it is judged that the macroblock number variable j is more than the total number of macroblocks NMB within the n-th picture pic(n), the step A12 goes forward to the step A13.

The macroblock number variable j thus serves as a loop counter for repeating the process from the steps A8 to A11 to encode all the macroblocks from the $1^{st}$ macroblock MB(1) up to the j-th macroblock MB(j) in the present picture pic(n). The entire macroblocks starting from the first macroblock MB(1) up to the NMB-th macroblock MB(NMB), in the n-th picture pic(n) can be thus encoded sequentially.

In the step A13, the picture number variable n is incremented by one. Then the step A13 goes forward to the step A14 wherein it is judged upon whether the picture number variable n is more than the total number of pictures, i.e., NPIC or not. When it is judged that the picture number variable n is not more than the total number of pictures, NPIC, the step A14 to the step A2. When, on the other hand, it is judged that the picture number variable n is more than the total number of pictures, NPIC, this routine of the rate controlling process is terminated. The picture number variable n thus serves as a loop counter for repeating the process from steps A2 to A13 to process all the pictures from the first picture pic(1) to the n-th picture pic(n) in the present GROUP OF PICTURES. The entire pictures starting from the first picture pic(1) up to the NPIC-th picture pic(NPIC), in the present GROUP OF PICTURES can be therefore processed sequentially.

The aforesaid conventional transcoder 50, however, has no information on the structure of GROUP OF PICTURES such as a picture cycle of I or P-pictures within each of the GROUP OF PICTURES, so that the transcoder 50 must estimate the structure of GROUP OF PICTURES within the inputted moving picture sequence to allocate the number of bits to pictures of each type within the estimated structure of GROUP OF PICTURES.

Furthermore, the first conventional transcoder 50 is required to decode the first bits streams $b_1$ almost all over the layers such as the sequence layer, the GROUP OF PICTURES layer, the picture layer, the slice layer and the macroblock layer in order to derive necessary data for transcoding the first bits streams $b_1$ into the second bit streams $b_2$. The operation takes time, thereby causing the delay in the transcoding process.

Referring to FIG. 20 of the drawings, there is shown an improvement of the above transcoder 50 as a second conventional transcoder 60. The second conventional transcoder 60 is adapted to perform the rate control without estimating the structure of GROUP OF PICTURES. As shown in FIG. 20, the second conventional transcoder 60 comprises a delay circuit 61 and a rate controller 62 in addition to the variable length decoder 51, the inverse quantizer 53, the quantizer 55 and the variable length encoder 57 same as those of the first conventional transcoder 50 shown in FIG. 18. The same constitutional elements are simply represented by the same reference numerals as those of the conventional transcoder 50, and will be thus omitted from description for avoiding tedious repetition.

The delay circuit 61 is interposed between the variable length decoder 51 and the inverse quantizer 53 and designed to control the flow of the signal from the variable length decoder 51 to the inverse quantizer 53. The delay circuit 61 is operated to delay the operation start time of the inverse quantizer 53 so that the inverse quantizer 53 does not start the de-quantizing process until the variable length decoder 51 terminates the process of decoding one of the pictures in the coded moving picture sequence signal.

As shown in FIG. 20, the rate controller 62 of the second conventional transcoder 60 includes a target ratio computing unit 63, an input bit summing unit 65, a bit difference computing unit 67, a target output bit updating unit 69, and a quantization parameter computing unit 71.

The target ratio computing unit 63 is electrically connected to the variable length decoder 51 and designed to input an input bit rate of the first bit streams $b_1$, hereinlater referred to as "Input_Bitrate", from the variable length decoder 51, and input a target bit rate, hereinlater referred to as "Target_Bitrate" through a terminal $a_3$. Alternatively, the target bit rate Target_Bitrate may have been stored in an internal memory, or determined on the basis of internal switches. The target ratio computing unit 63 is designed to then compute a target ratio, hereinlater referred to as "ioRatio" of the target bit rate Target_Bitrate to the input bit rate Input_Bitrate for each of pictures as follows.

$$ioRatio = \frac{Target\_Bitrate}{Input\_Bitrate} \qquad \text{equation (26)}$$

The input bit summing unit 65 is designed to sum up the number of inputting bits of the picture decoded by the variable length decoder 51 to produce the total number of inputting bits, hereinlater referred to as "$T_{in}$". On the other hand, the target output bit updating unit 69 is designed to compute a target number of outputting bits to be generated by the variable length encoder 57, hereinlater referred to as "$T_{out}$". The target number of outputting bits $T_{out}$ is computed by multiplying the total number of inputting bits $T_{in}$ by the target ratio ioRatio as follows:

$$T_{out} = T_{in} \times ioRatio \qquad \text{equation (27)}$$

The bit difference computing unit 67 is electrically connected to the variable length encoder 57 and the target output bit updating unit 69, and designed to input a real number of outputting bits encoded by the variable length encoder 57, hereinlater referred to as "$T_{real}$", and input the target number of outputting bits $T_{out}$. The bit difference computing unit 67 is designed to then compute a difference between the target number of outputting bits $T_{out}$ and the real number of outputting bits $T_{real}$, hereinlater referred to as a "difference number of bits", i.e., "$T_{diff}$" as follows:

$$T_{diff}=T_{real}-T_{out} \qquad \text{equation (28)}$$

The target output bit updating unit 69 is electrically connected to the target ratio computing unit 63, the input bit summing unit 65, and the bit difference computing unit 67. The target output bit updating unit 69 is designed to update the target number of outputting bits $T_{out}$ on the basis of the difference number of bits $T_{diff}$ as follows:

$$T_{out}=T_{out}-T_{diff} \qquad \text{equation (29)}$$

The quantization parameter computing unit 71 is electrically connected to the target output bit updating unit 69 and designed to compute the reference quantization parameter Q(j) for each of macroblocks MB(j) on the basis of the target outputting bits $T_{out}$ updated by the target output bit updating unit 69 in accordance with the step II of the TM-5.

FIG. 21 shows the flowchart of the rate controlling process performed by the above conventional transcoder 60. The rate controlling process in the transcoder 60 comprises the steps B1 to B13. The steps B6 to B13 are the almost same as those of the steps A7 to A14, respectively, in the rate controlling process shown in FIG. 19 except for the step B7 wherein the utilization volume of the capacity of the virtual buffer is computed on the basis of the target number of outputting bits $T_{out}$ given by the target output bit updating unit 69 instead of the target number of bits $T_i$, $T_p$ or $T_b$ computed in the step A3 shown in FIG. 19. The same steps will be thus omitted from description for avoiding tedious repetition.

In the step B1, "1" is assigned to the picture number variable n. The step B1 then goes forward to the step B2 wherein the target ratio ioRatio is computed by the above equation (26). In the following step B3, the difference number of bits $T_{diff}$ is computed for the present picture pic(n) by the above equation (28). The step B3 then goes forward to the step B4 wherein the number of inputting bits $T_{in}$ is summed up within the first bit streams by. In the step B5, the target number of outputting bits $T_{out}$ is computed by the above equation (27), and further updated by the above equation (29).

In the second conventional transcoder 60 thus constructed, the inverse quantizer 53, however, cannot start the de-quantization process until the target transcoding frame is completely decoded, thereby causing the delay in the transcoding process.

Referring to FIGS. 22 and 23 of the drawings, there is shown another improvement of the above transcoder 50 as a third conventional transcoder 80. The third conventional transcoder 80 is also adaptable to perform the rate control without estimating the structure of GROUP OF PICTURES. As shown in FIG. 22, the third conventional transcoder 80 comprises an input terminal $a_1$ electrically connected to a first transmitting path and designed to input an input bit streams $b_3$ at the input bit rate, and an output terminal $a_2$ electrically connected to a second transmitting path and designed to output an output bit streams $b_4$ at the target bit rate. In the third conventional transcoder 80, the input bit streams $b_3$ have a format, non-adaptable for the MPEG-2, different from that of the bit streams b, of the first and second conventional transcoders 50 and 60. The input bit streams $b_3$ have information on the number of coding bits previously recorded thereon by the encoder, not shown.

The third conventional transcoder 80 comprises a variable length decoder 81 electrically connected to the input terminal $a_1$, and a rate controller 82 in addition to the inverse quantizer 53, the quantizer 55, and the variable length encoder 57 which are same as those of the second transcoder 60 shown in FIG. 20. The rate controller 82 includes a target output bit updating unit 83, and a quantization parameter computing unit 85 in addition to the target ratio computing unit 63, and the bit difference computing unit 67 which are same as those of the second transcoder 60 shown in FIG. 20.

The third conventional transcoder 80 thus constructed can perform the rate control on the basis of the formation on the number of coding bits previously recorded in the input bit streams $b_3$. The variable length decoder 81 is adapted to decode the coded moving picture sequence signal within the third bit streams $b_3$ to reconstruct the pictures and the information on the number of coding bits, and transmit the information to the inverse quantizer 53. The variable length decoder 81 is also adapted to transmit the number of inputting bits $T_1$, to the target output bit updating unit 83.

The outputting bit updating unit 83 is designed to compute the target number of outputting bits $T_{out}$ on the basis of the number of inputting bits $T_{in}$ and the target ratio ioRatio by the above equation (26). The quantization parameter computing unit 85 is designed to compute the reference quantization parameter Q(j) of the macroblocks MB(j) for each of pictures on the basis of the target number of outputting bits $T_{out}$ updated by the outputting bit updating unit 83 in accordance with the step II in the TM-5. The quantizer 55 is then operated to quantize the j-th macroblock MB(j) on the basis of the reference quantization parameter Q(j) given by the quantization parameter computing unit 85.

FIG. 23 shows the flowchart of the rate controlling process performed by the above third conventional transcoder 80. The rate controlling process in the transcoder 80 comprises the steps C1 to C13. All the steps C1 to C13 are the same as those of the steps B1 to B13, respectively, in the rate controlling process shown in FIG. 21 except for the step C4 wherein the number of inputting bits $T_{in}$ in the current picture pic(n) is derived from the third bit streams $b_3$ by the decoder 81 to compute the total number of inputting bits $T_{in}$.

The third conventional transcoder 80 thus constructed has information on the number of coding bits previously recorded in the third bits streams b3 thereby making it possible to solve the problem of the delay in the second conventional transcoder 60. The third conventional transcoder 80, however, has another problem to restrict the form of the inputted bit streams. Moreover, the encoder which is linked with the third transcoder 80 must provide with the above information on the number of coding bits to be recorded in the bit streams, thereby causing the delay of process in the encoder.

In any one of the conventional transcoders 50, 60 and 80, the matrix of the de-quantization coefficients dequant is necessary for only the quantizer 55, but unnecessary for the transcoder itself to generate the desired bit streams. In order to eliminate the redundant matrix of the de-quantization coefficients dequant, there is proposed a fourth conventional transcoder 90 comprising a level converter 91 instead of the inverse quantizer 53 and the quantizer 55 of the transcoder 50, as shown in FIG. 26.

The level converter 91 is interposed between the variable length decoder 51 and the variable length encoder 57. The level converter 91 is designed to input the original picture data for each of pictures. The original picture data includes a matrix of original quantization coefficients level for each of macroblocks within the corresponding picture. The level converter 91 is electrically connected to the rate controller 59 and designed to input the second quantization parameter $Q_2$ from the rate controller 59.

The level converter 91 is further designed to convert the original picture data for each of pictures including the matrix of original quantization coefficients level into the objective picture data including the matrix of re-quantization coefficients tlevel without generating the matrix of the de-quantization coefficients dequant. The following equations (30) and (31) for the matrix of re-quantization coefficients tlevel are lead by eliminating the matrix of the de-quantization coefficients dequant from the above equations (1), (2), (3) and (4).

$$tlevel = \left\{\left(level + sign(level) \times \frac{1}{2}\right) \times \frac{Q_1}{Q_2}\right\} \quad \text{equation (30)}$$

or $$tlevel = level \times \frac{Q_1}{Q_2} + \frac{sign(level)}{2} \quad \text{equation (31)}$$

where the above equation (30) is used for the inter macroblock, while the above equation (31) is used for the intra macroblock. The level converter 91 is thus operable to convert the original picture data, for each of pictures, into the second picture data with the first quantization parameter $Q_1$ and the second quantization parameter $Q_2$. The first quantization parameter $Q_1$ is decoded from the first bit streams b, by the variable length decoder 51, while the second quantization parameter $Q_2$ is obtained from the rate controller 59.

In the fourth conventional transcoder 90, the rate controller 59 is designed to perform the rate control over the encoding process in the transcoder 90 according to the TM-5. The variable length encoder 57 is electrically connected to the level converter 91 and to input the above matrix of re-quantization coefficients tlevel from the level converter 91.

The fourth conventional transcoder 90 thus constructed can efficiently perform the transcoding process at high speed without storing the matrix of de-quantization coefficients dequant in a memory.

The above conventional transcoders 50, 60, 80 and 90, however, has another problem with the rate-distortion performance in converting the quantization level. The detailed description of this problem will be made later. In short, the rate-distortion performance in converting the quantization level is unstable and variable in accordance with the first and second quantization parameters and the level of the original quantization coefficients level. Therefore, as the reduced information volume becomes larger, the quantization error is liable to increase, thereby causing the unstable rate control in transcoding.

The applicant of the present application filed patent applications No. H11-278867 and No. H11-327384.

The applicant disclosed apparatus, a method and a computer program product for transcoding a coded moving picture sequence, being operable to compute the optimized quantization parameter on the basis of the de-quantization parameter and the previously computed quantization parameter in consideration of the characteristic of the rate-distortion performance dependent on the quantization parameter and the de-quantization parameter in the patent application No. H11-278867.

The transcoder disclosed in the aforesaid patent application No. H11-278867, comprising the inverse quantizer for performing the inverse-quantization operation and the quantizer for performing the quantization operation, is characterized in that the transcoder further comprises quantization parameter switching means for switching the quantization parameter in consideration of the characteristic of the rate-distortion performance dependent on the inputted quantization parameter, thereby making it possible for the transcoder to minimize the quantization error occurred when the matrix of original quantization coefficients is transformed to the matrix of re-quantization coefficients.

The applicant further disclosed apparatus, a method and a computer program product for transcoding a coded moving picture sequence, being operable to control the number of reduction-object bits in accordance with the size of the quantization parameter obtained from the input bit streams in consideration of the number of reduction-object bits and the quantization error during the re-quantization operation in the transcoder, thereby enabling to minimize the quantization error occurred as a result of the re-quantization operation within the transcoder in the patent application No. H11-327384.

The transcoder disclosed in the aforesaid patent application No. H11-327384, comprises: target reduction bit number computing means for computing the average number of reduction-object bits regarded as target number of reduction-object bits; target bit number computing means for computing the target number of bits on the basis of the average number of bits reduced in the input quantization parameter and the number of bits in the DCT coefficients; and quantization scaling factor computing means for specifying the quantization parameter on the basis of the target number of bits computed by the target bit number computing means. The thus constructed transcoder can minimize the quantization error occurred as a result of the re-quantization operation in the transcoder. Here, bit number is "the number of bits".

It is, however, unthinkable to deliver information having only video contents when information delivery is done as part of business service. Most information would be delivered in the form of multiplexed multimedia streams, i.e., MPEG-2 system bit streams, having data information such as video, audio and program information. An apparatus operative to convert a bit rate for the MPEG-2 system bit steams, is therefore required.

The present invention provides a MPEG-2 system stream transcoder for the MPEG-2 system streams. FIG. 24 shows renderings of an environment in which the present invention is utilized.

Conventional MPEG-2 transport stream rate converters in combination of the prior arts and their problems will be epitomized before describing the present invention in detail.

As shown in FIG. 25, an apparatus 900 is a simple combination of a MPEG-2 transport stream decoder 910 and a MPEG-2 transport stream encoder 930. The MPEG-2 transport stream decoder 910 comprises a transport stream demultiplexer 911, a video decoder 913, an audio decoder 915, a system information decoder 917, and a data dedicated decoder 919. The MPEG-2 transport stream encoder 930 comprises a transport stream multiplexer 931, a video encoder 933, an audio encoder 935, a system information encoder 937, and a data dedicated encoder 939.

The apparatus 900 can output MPEG-2 transport streams at a target output bit rate. The apparatus 900, however, has another problems resulted from the fact that the video decoder and the video encoder are simply combined. The problems are as follows.

(1) Amount of process is increased.

The apparatus 900 must perform a series of operations, i.e., decode all the inputted bit streams into pictures, and then encode the decoded pictures into appropriate target bit streams. The process of decoding and encoding all the inputted bit streams is time consuming.

(2) Quality of pictures is deteriorated.

Once the decoder decodes the inputted bit streams into the pictures, the thus decoded pictures does not contain original structure information elements of the inputted bit streams such as the structure of GROUP OF PICTURES and the picture types any more. As a result, the encoder must encode the decoded pictures into the target bit streams having structure information elements different from the original structure information elements. The B-picture, which is not recurrently referred to, has information volume less than the I-picture and the P-picture, which are recurrently referred to so that the quality of pictures as a whole is improved. On the other hand, the B-picture in a frame of the inputted bit streams, for instance, is encoded as the I-picture in the target bit streams, thereby causing the quality of pictures to be deteriorated.

(3) Frame realignment causes delay.

Once the decoder decodes the inputted bit streams having the B-pictures into the pictures, the frame sequence in the inputted bits streams is changed in the pictures. As a result, the encoder must realign the frame sequence to encode the decoded pictures into the target bit streams, thereby causing delay. Bit streams in the form of "M=3" type, for instance, cause the delay of three frames to decode the I-picture and the P-picture before the B-picture to realign the frame sequence while being decoded into the pictures, and the thus decoded pictures cause the delay of another three frames to encode the I-picture and P-picture before the B-picture to realign the frame sequence while being encoded again. (Here, "M" stands for a cycle of the appearance of the I-picture of the B-picture. "M=2" means that one B-picture is inserted between the I-picture or the B-picture while "M=3" means that two B-pictures are inserted between the I-picture or the B-picture. Bit streams are generally in the form of "M=3" type.) Totally, the delay of six frames is generated in the apparatus 900.

In order to solve the aforesaid problems, a rate converter 600 includes a MPEG-2 transport stream demultiplexer, a MPEG-2 video transcoder, and a MPEG-2 multiplexer.

The rate converter 600 is shown in FIG. 1 as comprising a MPEG-2 transport stream demultiplexer 610, a MPEG-2 multiplexer 620, a MPEG-2 video transcoder 640, and a system controller 650.

The rate converter 600 has a MPEG-2 video transcoder interposed between a video bit stream decoder and a video bit stream encoder (see FIG. 25) to ensure that the problems (1) to (3) are solved with respect to the apparatus 900 of the simple combination of the MPEG-2 transport stream decoder and the MPEG-2 transport stream encoder.

The audio decoder, the audio encoder, the data dedicated decoder, and the data dedicated encoder are not provided in the rate converter 600, which is operated through a method comprising the steps of:

a) inputting MPEG-2 transport streams;
b) demultiplexing the inputted MPEG-2 transport streams into video bit streams and other bit streams such as audio, system information and data bit streams;
c) compressing only the video bit streams, which has extremely large information volume;
d) modifying just part of fixed codes of the other bit streams if necessary;
e) multiplexing the compressed video bit streams, and the partly modified other bit streams into output MPEG-2 transport streams; and
f) outputting the output MPEG-2 transport streams.

The system controller 650 is operated, instead of the system information decoder 917 and the system information encoder 937 of the apparatus 900, to modify part of fixed codes of the system information bit streams and replace the thus partly modified system information bit streams with the original system information bit streams.

The rate converter 600, however, encounters additional problems as follows.

(1) The bit rate of output MPEG-2 video bit streams is, basically, computed on the basis of the bit rate of output MPEG-2 transport streams. The output MPEG-2 transport streams, however, contain other bit streams such as audio bit streams and control information bit streams, in addition to the video bit streams. Furthermore, bits such as header information bits are generated as a result of packetizing elementary streams and transport streams. The bits thus generated are added to the output MPEG-2 transport streams. It is therefore difficult to compute the bit rate of output video bit streams.

(2) The rate converter 600 is not applicable to the output bit rate control for video bit streams in the variable bit rate format.

The video bit streams contained in the MPEG-2 transport streams are assumed to be in the variable bit rate (VBR) format. On the other hand, a CBR rate control method used by a conventional video bit stream transcoder, for controlling output bit rate of video bit streams in the constant bit rate (CBR) format on the basis of input bit rate as a parameter, or on the basis of the numbers of bits and pictures to be encoded in GOP, and the picture types is not applicable to video bit streams in the VBR format.

In order to solve the above problems, the present invention is proposed to an apparatus, a method and a computer program product for transcoding a coded multiplexed sound and moving picture sequence for MPEG-2 system bit streams, which enable to completely synchronize audio and video bit streams between input and output MPEG-2 transport steams on the basis of synchronous information element contained in the input MPEG-2 transport streams; and establish a rate control method for controlling output bit rate of video bit streams in the variable bit rate, i.e., VBR format.

To be solved by the transcoder according to the present invention are problems of:

(1) completely synchronizing audio and video bit streams between input and output MPEG-2 transport steams on the basis of synchronous information element contained in the input MPEG-2 transport streams; and
(2) establishing a rate control method for controlling output bit rate of video bit streams in the variable bit rate, i.e., VBR format.

Required to solve the problem (1) are three conditions as follows: Condition (1): Time stamp (PCR) contained in output MPEG-2 transport streams must be set to a value in a certain range, for instance, to the initial value of the input MPEG-2 transport streams, so that the output MPEG-2 transport streams do not cause the breakdown of a MPEG-2 decoder buffer when the output MPEG-2 transport streams are inputted to the MPEG-2 decoder.

Condition (2): A video frame of video bit streams and an audio frame of audio bit streams contained in input MPEG-2 transport streams must share the same PTSs and DTSs with the same video frame of the video bit streams and the same audio frame of the audio bit streams contained in output MPEG-2 transport streams.

Condition (3): Bit streams constituting a video frame and an audio frame contained in the output MPEG-2 transport streams arrive at the decoder at the same time at which bit streams constituting the same video frame and the same audio frame contained in the input MPEG-2 transport streams are supposed to arrive at the decoder.

Provided that only the video bit streams are to be compressed to achieve the target bit rate, the means to solve the aforesaid problems will be described hereinlater.

Condition (1) will be satisfied by a method comprising the steps of:
(a) decoding a first PCR contained in the inputted MPEG-2 transport streams;
(b) computing a value of system time clock, i.e., reference synchronous information element for decoding process, hereinlater referred to as "STC", of the first byte of the inputted MPEG-2 transport streams on the basis of the decoded first PCR, the total number of bytes of the MPEG-2 transport streams inputted into the rate converter, and an input bit rate; and
(c) matching the thus computed value of STC of the first byte of the inputted MPEG-2 transport streams with the value of STC of the first byte of the outputting MPEG-2 transport streams.

Condition (2) will be satisfied by a method comprising the steps of: (a)

demultiplexing the inputted MPEG-2 transport streams into video transport streams and the other bit streams; (b) decoding the video transport streams into video packetized elementary streams; (c) decoding the video packetized elementary streams into video elementary streams and the corresponding PTS and DTS; (d) storing the PTS and the DTS in a memory unit; and (e) encoding video elementary streams and the corresponding PTS and the DTS to generate video packetized elementary streams. Audio bit streams in the inputted MPEG-2 transport streams remain the same in the outputted MPEG-2 transport streams. Accordingly, PTS of the audio bit streams in the inputted MPEG-2 transport streams remains the same in the outputted MPEG-2 transport streams.

FIG. 3 shows an example of a relationship between the inputted MPEG-2 transport streams and the outputted MPEG-2 transport streams, which satisfies the condition (3). Transport stream packets to be reduced, hereinlater referred to as "reduction-object transport stream packets", contained in the outputted MPEG-2 transport streams are reduced to one third of that of the inputted MPEG-2 transport streams and accordingly, the bit rate of the outputted MPEG-2 transport streams is reduced to the half of that of the inputted MPEG-2 transport streams. This means that the transport stream packets to be not reduced, for instance, the bit streams constituting an audio frame are placed and interposed between the reduction-object transport stream packets, for instance, the bit streams constituting a video frame in accordance with a ratio of output bit rate to input bit rate, thereby making it possible that the bit streams constituting a video frame and an audio frame contained in the output MPEG-2 transport streams arrives at the decoder at the same time at which the bit streams constituting the same video frame and the same audio frame contained in the input MPEG-2 transport streams are supposed to arrive at. For avoiding tedious repetition, transport stream packets will be referred to as TS packets, hereinlater.

Here, reduction-object TS packets are all the TS packets excluding two types of packets consisting of transport packets including video bit streams contained in the inputted MPEG-2 transport stream, and TS packets apt to change in accordance with the control state in the system such as PAT and PMT, which will be described hereinlater.

Furthermore, another conditions must be satisfied to reduce the number of bits of the reduction-object video bit streams to decrease the bit rate.

FIG. 4 shows examples of the transition of utilization volume of a Video Buffering Verifier buffer, hereinlater referred to as "VBV buffer" (Video Buffering Verifier: a parameter indicative of the size of the virtual buffer used for controlling the number of generated bits) and DTS (Decoding Time Stamp: decoding time management information) while the bit rate of video bit streams contained in the outputted MPEG-2 transport streams is reduced to the half of that of video bit streams contained in the inputted MPEG-2 transport streams in the case of (a) and the case of (b).

In the case of (a), the number of bits of I-pictures are not reduced while the number of bits of P-pictures and B-pictures are reduced. In the case of (b), on the other hand, I-pictures, P-pictures, and B-pictures are evenly reduced. This means that the ratio of I-pictures, P-pictures, and B-pictures in the input video bit streams remains the same as that in the output video bit streams.

In FIG. 4, the upper graph shows the transition of the video elementary streams contained in the inputted bit streams before the transcoding process, and the lower graph shows the transition of the video elementary streams contained in the outputted bit streams after the transcoding process. "B" indicates the size of a receiving buffer, "B(n)*" indicates the VBV buffer utilization volume just before the n-th picture is decoded, and "B(n)" indicates the VBV buffer utilization volume just after the n-th picture is decoded and the number of bits for the size of one frame is removed from the buffer. The VBV buffer utilization volume must fluctuate in a range of 0 and B. The slope of a line segment indicates a bit rate.

The receiving buffer waits until the time indicated by DTS, and starts decoding a frame consisting of input video elementary streams when the time indicated by DTS elapses. On the other hand, the receiving buffer waits until the time indicated by DTS', and start decoding the frame consisting of the output video elementary streams when the time indicated by DTS' elapses.

In the case of (a), DTS' is greater than DTS. This means that some of the video elementary streams constituting the frame may not arrive at the MPEG-2 transport stream decoder until the time indicated by the DTS, thereby failing to meet the condition (3). In other words, the output video elementary streams cannot have the DTS of the input video elementary streams as start time of decoding the frame consisting of the video elementary streams so as to meet the condition (2).

In the case of (b), DTS' is equal to DTS. This means that all of the video elementary streams constituting the frame will arrive at the MPEG-2 transport stream decoder until the time indicated by the DTS, thereby making it possible to start decoding the frame at the time indicated by the DTS, and meet the condition (3). Therefore, the rate control method must satisfy the condition of DTS'=DTS so as to reduce the number of bits of the video bit streams to reduce the bit rate.

A rate control method to solve the problem (2) will be described hereinlater.

FIG. 5 shows a schematic block diagram describing the concept of the rate control method for controlling output bit rate of the video bit streams in the VBR format performed during the transcoding process. In FIG. 5, the input MPEG-2 transport streams at an input bit rate is converted into the output MPEG-2 transport streams at the target bit rate, which is the half of the input bit rate.

Each of the MPEG-2 transport stream consists of packets of 188 bytes. The number of packets to be inputted at time interval of a predetermined duration is always the same. This means that the number of packets inputted at time interval of a predetermined duration can be computed on the basis of the product of the input bit rate and the predetermined time. This leads to the fact that a target number of packets to be outputted at time interval of the predetermined duration can be computed in the similar manner to the number of packets to be inputted.

Furthermore, the number of video transport streams and the number of transport streams to be not reduced, hereinlater referred to as "non-reduction transport streams", contained in the input MPEG-2 transport streams can be computed on the basis of information acquired when the input MPEG-2 transport steams are demultiplexed. Provided that the non-reduction transport streams are not to be compressed, the target number of output video transport stream packets at time interval of a predetermined duration (n) can be computed by subtraction of the number of packets of the non-reduction transport streams and the number of PAT and PMT packets to be outputted at time interval of the predetermined duration (n) from the target number of total packets to be outputted at time interval of the predetermined duration (n).

As will be understood from the foregoing descriptions, the rate control for controlling output bit rate of video bit streams in the VBR format can be performed basically through the steps of: (a) demultiplexing the MPEG-2 transport streams into video transport streams and other transport streams such as non-reduction transport streams; (b) computing the number of video transport streams and the number of non-reduction transport streams; (c) computing the target bit rate, i.e., the target number of output video transport stream packets to be outputted at time interval of a predetermined duration (n), by subtraction of the number of the non-reduction transport stream packets and the number of the PAT and PMT packets to be outputted at time interval of the predetermined duration (n) from the target number of total packets to be outputted at time interval of the predetermined duration (n); and (d) converting the video transport streams into the output video elementary streams having the target number of the output video transport stream packets, thereby making it possible to control the output bit rate less than the input bit rate.

There is another problem which makes it difficult to determine the target number of output video transport stream packets. While transcoding the MPEG-2 transport streams, video elementary streams are converted to PES (PES: Packetized Elementary Stream) packets and TS (TS: Transport Stream) packet, new packet headers are generated and attached to the PES packets and TS packets, thereby causing overhead. The exact number of packet headers thus newly generated, however, cannot be estimated beforehand. The target bit number of output video elementary streams to be outputted at time interval of the predetermined duration (n), therefore, is determined through the steps of: (a) computing the overhead generated through the process of converting the video elementary streams to PES packets and TS packets prior to the time interval of the predetermined duration (n−1); and (b) computing the target bit number of the output video elementary streams at time interval of the predetermined duration (n) in consideration of the overhead computed in the step (a).

The above described rate control method will satisfy the condition (3) of the problem (1).

SUMMARY OF THE INVENTION

It is, therefore, an object of the present invention to provide a method of transcoding a coded multiplexed sound and moving picture sequence, which sets the time stamp (PCR) contained in output MPEG-2 transport streams to a value in a certain range, for instance, to the initial value of the input MPEG-2 transport streams, so that the output MPEG-2 transport streams do not cause the breakdown of a MPEG-2 decoder buffer when the output MPEG-2 transport streams are inputted to the MPEG-2 decoder.

It is another object of the present invention to provide a method of transcoding a coded multiplexed sound and moving picture sequence, which makes it possible for a video frame of video bit streams and an audio frame of audio bit streams contained in input MPEG-2 transport streams to share the same PTSs and DTSs with the same video frame of the video bit streams and the same audio frame of the audio bit streams contained in output MPEG-2 transport streams.

It is a further object of the present invention to provide a method of transcoding a coded multiplexed sound and moving picture sequence, which makes it possible for bit streams constituting a video frame and an audio frame contained in the output MPEG-2 transport streams to arrive at the decoder at the same time at which bit streams constituting the same video frame and the same audio frame contained in the input MPEG-2 transport streams are supposed to arrive at.

It is a still further object of the present invention to provide an apparatus of transcoding a coded multiplexed sound and moving picture sequence, which sets the time stamp (PCR) contained in output MPEG-2 transport streams to a value in a certain range, for instance, to the initial value of the input MPEG-2 transport streams, so that the output MPEG-2 transport streams do not cause the breakdown of a MPEG-2 decoder buffer when the output MPEG-2 transport streams are inputted to the MPEG-2 decoder.

It is a yet further object of the present invention to provide an apparatus of transcoding a coded multiplexed sound and moving picture sequence, which makes it possible for a video frame of video bit streams and an audio frame of audio bit streams contained in input MPEG-2 transport streams to share the same PTSs and DTSs with the same video frame of the video bit streams and the same audio frame of the audio bit streams contained in output MPEG-2 transport streams.

It is a yet further object of the present invention to provide an apparatus of transcoding a coded multiplexed sound and moving picture sequence, which makes it possible for bit streams constituting a video frame and an audio frame contained in the output MPEG-2 transport streams to arrive at the decoder at the same time at which bit streams constituting the same video frame and the same audio frame contained in the input MPEG-2 transport streams are supposed to arrive at.

It is a yet further object of the present invention to provide a computer program for transcoding a coded multiplexed sound and moving picture sequence, which sets the time stamp (PCR) contained in output MPEG-2 transport streams to a value in a certain range, for instance, to the initial value of the input MPEG-2 transport streams, so that the output MPEG-2 transport streams do not cause the breakdown of a MPEG-2 decoder buffer when the output MPEG-2 transport streams are inputted to the MPEG-2 decoder.

It is a yet further object of the present invention to provide a computer program for transcoding a coded multiplexed sound and moving picture sequence, which makes it possible for a video frame of video bit streams and an audio frame of audio bit streams contained in input MPEG-2 transport streams to share the same PTSs and DTSs with the same video frame of the video bit streams and the same audio frame of the audio bit streams contained in output MPEG-2 transport streams.

It is a yet further object of the present invention to provide a computer program for transcoding a coded multiplexed sound and moving picture sequence, which makes it possible for bit streams constituting a video frame and an audio frame contained in the output MPEG-2 transport streams to arrive at the decoder at the same time at which bit streams constituting the same video frame and the same audio frame contained in the input MPEG-2 transport streams are supposed to arrive at.

In accordance with a fist aspect of the present invention, there is provided a method of transcoding a coded multiplexed sound and moving picture sequence, comprising the steps of:
(a) inputting a first coded signal through a first transmitting path at an input bit rate;
(b) demultiplexing the first coded signal inputted in the inputting step (a) into one or more first data strings, one or more second data strings, and one or more third data strings, the one or more first data strings each having a number of real inputting bits;
(c) transforming the one or more first data strings demultiplexed in the demultiplexing step (b) into one or more first data strings having a number of real outputting bits less than the number of real inputting bits of the one or more first data strings, respectively;
(d) multiplexing the one or more transformed first data strings transformed in the transforming step (c), the one or more second data strings demultiplexed in the demultiplexing step (b), and one or more corrected third data strings to generate a second coded signal;
(e) correcting the one or more third data strings demultiplexed in the demultiplexing step (b), on the basis of the first coded signal, in accordance with a change of the second coded signal to generate the one or more corrected third data strings having a number of real inputting bits when the one or more transformed first data strings, the one or more second data, and the one or more corrected third data strings are multiplexed in the multiplexing step (d); and
(f) outputting the second coded signal through a second transmitting path at a target bit rate lower than the input bit rate of the first coded signal.

In the aforesaid method, the inputting step (a) may have the step of (a2) inputting MPEG-2 transport streams. Furthermore, the demultiplexing step (b) may have the step of (b2) demultiplexing the MPEG-2 transport streams inputted in the inputting step (a2) into one or more transport stream packets having a coded video signal having a number of real inputting bits as one or more first data strings. The outputting step (f) may have the step of (f2) outputting MPEG-2 transport streams having a video signal having a number of real outputting bits less than the number of real inputting bits of the coded video signal.

Alternatively, in the aforesaid method, the inputting step (a) has the step of (a3) inputting coded multiplexed sound and moving picture sequence streams. The demultiplexing step (b) may have the step of (b3) demultiplexing the coded multiplexed sound and moving picture sequence streams inputted in the inputting step (a3) into one or more transport stream packets having a coded moving picture sequence signal having a number of real inputting bits as the one or more first data strings. Furthermore, the outputting step (f) may have the step of (f3) outputting coded multiplexed sound and moving picture sequence streams having a coded moving picture sequence signal having a number of real outputting bits less than the number of real inputting bits of the coded moving picture sequence signal.

Alternatively, the aforesaid method may further comprise the steps of: (g) computing a value of system clock indicative of a start time of the demultiplexing step (b), on the basis of a first reference time information element contained in the first coded signal; and (h) computing an initial value of the system clock for the second coded signal on the basis of the value of the system clock computed in the computing step (g).

Alternatively, in the aforesaid method, the transforming step (c) may further comprise the steps of: (c51) decoding the one or more transport stream packets having a coded video signal having a number of real inputting bits to reconstruct and output video PES packets; (c52) decoding the video PES packets decoded in the decoding step (c51) to reconstruct and output video elementary streams having a real inputting bits, decoding time management information element DTS and presentation time management information element PTS of the video elementary streams, and PTS_DTS flags indicative of presence of the decoding time management information element DTS and the presentation time management information element PTS; (c53) transforming the video elementary streams decoded and outputted in the decoding step (c52) into video elementary streams having a number of real outputting bits less than the number of real inputting bits of the video elementary streams; (c54) generating transformed video PES packets on the basis of the transformed video elementary stream transformed in the transforming step (c53), the decoding time management information element DTS, the presentation time management information element PTS and the PTS_DTS flags indicative of presence of the decoding time management information element DTS and the presentation time management information element PTS decoded in the decoding step (c52); and (c55) encoding the transformed video PES packets generated in the generating step (c54) to generate a transformed transport stream packets having a number of real outputting bits less than the number of real inputting bits of the transport stream packets.

Alternatively, in the aforesaid method, the demultiplexing step (b) may have the step of demultiplexing the first coded signal into transport stream packets having a coded audio signal as the one or more second data strings.

Alternatively, the demultiplexing step (b) may have the step of (b71) demultiplexing MPEG-2 transport streams inputted at a predetermined time interval in the inputting step (a) into the one or more first data strings, the one or more second data strings, and the one or more third data strings, each having a number of real inputting bits. The transforming step (c) may comprise the steps of: (c71) decoding the one or more first data strings to reconstruct video elementary streams having a number of real inputting bits and other information elementary streams, and separating the video elementary streams from the other information elementary streams; (c72) transforming the video elementary streams reconstructed and separated in the decoding step (c71) to generate output video elementary streams having a number of real outputting bits less than the number of real inputting bits of the video elementary streams; and (c73) generating one or more transformed first data strings having a number of real outputting bits less than the number of real inputting bits of the one or more first data strings demultiplexed in the demultiplexing step (b71) on the basis of the output video elementary streams generated in the transforming step (c72) and the other information elementary steams reconstructed and separated in the decoding step (c71). Also, the multiplexing step (d) may have the step of (d71) multiplexing the one or more transformed first data strings generated in the generating step (c73), the one or more second data strings demultiplexed in the demultiplexing step (b71), and the one or more corrected third data strings corrected in the correcting step (e) to generate a second coded signal to be outputted at the predetermined time interval.

Alternatively, in the aforesaid method, the transforming step (c) may comprise the steps of: (c81) assuming that a number of real outputting bits of the one or more second data strings contained in the second coded signal at the predetermined time interval is equal to a number of real inputting bits of the one or more second data strings contained in the first coded signal at the predetermined time interval; (c82) assuming that a number of real inputting bits of the one or more third data strings contained in the second coded signal at the predetermined time interval is equal to the number of real inputting bits of the one or more corrected third data strings generated in the correcting step at the predetermined time interval (e); (c83) subtracting the number of real inputting bits of the one or more second data strings contained in the first coded signal at the predetermined time interval and the number of real inputting bits of the one or more third data strings contained in the second coded signal at the predetermined time interval from a target number of outputting bits of all data strings contained in the second coded signal at the predetermined time interval to generate a value A; (c84) subtracting a total number of real outputting bits of one or more transformed first data strings generated in the generating step (c73) prior to the predetermined time interval from a total target number of outputting bits of one or more transformed first data strings generated in the generating step (c73) prior to the predetermined time interval to generate a value B; and (c85) computing a target number of outputting bits of the transformed first data strings generated at the predetermined time interval in the generating step (c73) by adding the value A and the value B.

Alternatively, in the aforesaid method, the transforming step (c72) comprises the steps of: (c91) computing a target number of outputting bits of the output video elementary streams on the basis of outputting bits of the second coded signal able to be outputted at the predetermined time interval; (c92) computing a reference ratio of outputting bits to inputting bits on the basis of the target number of outputting bits of the output video elementary streams computed in the computing step (c91) and the real inputting bits of the video elementary streams reconstructed in the decoding step (c71); and (c93) computing a quantization scaling factor required for transforming the video elementary streams to generate the output video elementary streams, on the basis of the reference ratio of outputting bits to inputting bits computed in the computing step (c92).

Alternatively, in the aforesaid method, the computing step (c91) comprises the steps of: (c101) computing a ratio of a total number of real outputting bits of the first one or more transformed data strings generated in the generating step (c73) prior to the predetermined time interval to a total number of real outputting bits of the output video elementary streams prior to the predetermined time interval; and (c102) computing a target number of outputting bits of the output video elementary streams at the predetermined time interval on the basis of the ratio computed in the computing step (c101), and the computing step (c92) has the step of (c103) computing a reference ratio of outputting bits to inputting bits on the basis of the target number of outputting bits of the output video elementary streams computed in the computing step (c102) and the real inputting bits of the video elementary streams decoded in the decoding step (c71).

Alternatively, in the aforesaid method, the transforming step (c) comprises the steps of: (c1101) computing a total number of real outputting bits of the output video elementary streams generated in the transforming step (c72); (c1102) computing a sum of a target number of outputting bits of the output video elementary streams at the predetermined time interval and a total number of real outputting bits of the output video elementary streams which have been generated until the time when video elementary streams inputted prior to the predetermined time interval into a video ES buffer are consumed; (c1103) judging upon whether the total number of real outputting bits of the output video elementary streams computed in the computing step (c1101) is greater than the sum computed in the computing step (c1102); and (c1104) terminating the transforming step (c) and starting the multiplexing step (d) for processing the one or more transformed first data strings when it is judged that the sum is greater than the total number of real outputting bits in the judging step (c1103).

Alternatively, in the aforesaid method, the multiplexing step (d) may comprise the steps of: computing a difference by subtracting a value of lastly past presentation time management information element PTS of the first coded signal from a value of a synchronous time information element PCR located in a head position of a data string of the one or more second data strings; (d1202) computing a difference between passing time of the data string of the one or more second data strings in the first coded signal and passing time of the data string of the one or more second data strings in the second coded signal; (d1203) judging upon whether the difference computed in the computing step (d1201) is smaller than the difference computed in the computing step (d1202); and (d1204) locating the data string of the one or more second data strings in a rearward position of a data string of the one or more first data strings to be located in a rearward position of the data string of the one or more second data strings when it is judged that the difference computed in the computing step (d1201) is smaller than the difference computed in the computing step (d1202) in the judging step (d1203), and the outputting step (f) has the step of (f1201) outputting the second coded signal at the predetermined time interval.

Alternatively, in the aforesaid method, the multiplexing step (d) may comprise the steps of: (d1301) computing a difference by subtracting a value of a synchronous time information element PCR to be past subsequently in the first coded signal from a value of a presentation time management information element PTS of a just past data string of the one or more second data strings; (d1302) computing a difference between passing time of the data string of the one or more second data strings in the first coded signal and passing time of the data string of the one or more second data strings in the second coded signal; (d1303) judging upon whether the difference computed in the computing step (d1301) is smaller than the difference computed in the computing step (d1302); and (d1304) locating the data string of the one or more second data strings in a forward position of a data string of the one or more first data strings to be located in a forward position of the data string of the one or more second data strings when it is judged that the difference computed in the computing step (d1301) is smaller than the difference computed in the computing step (d1302) in the judging step (d1303), and the outputting step (f) has the step of (f1301) outputting the second coded signal at the predetermined time interval.

In accordance with a second aspect of the present invention, there is provided an apparatus of transcoding a coded multiplexed sound and moving picture sequence, comprising: inputting means for inputting a first coded signal through a first transmitting path at an input bit rate; demultiplexing means for demultiplexing the first coded signal inputted by the inputting means into one or more first data strings, one or more second data strings, and one or more third data strings, the one or more first data strings each having a number of real inputting bits; transforming means for transforming the one or more first data strings demultiplexed by the demultiplexing means into one or more first data strings having a number of real outputting bits less than the number of real inputting bits of the one or more first data strings, respectively; multiplexing means for multiplexing the one or more transformed first data strings transformed by the transforming means, the one or more second data strings demultiplexed by the demultiplexing means, and one or more corrected third data strings to generate a second coded signal; correcting means for correcting the one or more third data strings demultiplexed by the demultiplexing means, on the basis of the first coded signal, in accordance with a change of the second coded signal to generate the one or more corrected third data strings having a number of real inputting bits when the one or more transformed first data strings, the one or more second data, and the one or more corrected third data strings are multiplexed by the multiplexing means; and outputting means for outputting the second coded signal through a second transmitting path at a target bit rate lower than the input bit rate of the first coded signal.

In the aforesaid apparatus, the inputting means for inputting a first coded signal through a first transmitting path may be operable to input MPEG-2 transport streams, the demultiplexing means may be operable to demultiplex the MPEG-2 transport streams inputted by the inputting means into one or more transport stream packets having a coded video signal having a number of real inputting bits as one or more first data strings, and the outputting means may be operable to output MPEG-2 transport streams having a video signal having a number of real outputting bits less than the number of real inputting bits of the coded video signal.

Alternatively, in the aforesaid apparatus, the inputting means for inputting a first coded signal through a first transmitting path is operable to input coded multiplexed sound and moving picture sequence streams, the demultiplexing means is operable to demultiplex the coded multiplexed sound and moving picture sequence streams inputted by the inputting means into one or more transport stream packets having a coded moving picture sequence signal having a number of real inputting bits as the one or more first data strings, and the outputting means is operable to output coded multiplexed sound and moving picture sequence streams having a coded moving picture sequence signal having a number of real outputting bits less than the number of real inputting bits of the coded moving picture sequence signal.

Alternatively, the aforesaid apparatus may further comprise reference time setting means for computing a value of system clock indicative of a start time of the demultiplexing means, on the basis of a first reference time information element contained in the first coded signal, and compute an initial value of the system clock for the second coded signal on the basis of the value of the system clock.

Alternatively, in the aforesaid apparatus the transforming means may further comprise: a video transport stream packet decoding unit for decoding the one or more transport stream packets having a coded video signal having a number of real inputting bits to reconstruct and output video PES packets; a video PES packet decoding unit for decoding the video PES packets decoded by the video transport stream packet decoding unit to reconstruct and output video elementary streams having a real inputting bits, decoding time management information element DTS and presentation time management information element PTS of the video elementary streams, and PTS_DTS flags indicative of presence of the decoding time management information element DTS and the presentation time management information element PTS; a transforming unit for transforming the video elementary streams decoded and outputted by the video PES packet decoding unit into video elementary streams having a number of real outputting bits less than the number of real inputting bits of the video elementary streams; a video PES packet generating unit for generating transformed video PES packets on the basis of the transformed video elementary stream transformed by the transforming unit, the decoding time management information element DTS, the presentation time management information element PTS and the PTS_DTS flags indicative of presence of the decoding time management information element DTS and the presentation time management information element PTS decoded by the video PES packet decoding unit; and a video transport stream packet generating unit for encoding the transformed video PES packets generated by the video PES packet generating unit to generate a transformed transport stream packets having a number of real outputting bits less than the number of real inputting bits of the transport stream packets.

Alternatively, in the aforesaid apparatus, the demultiplexing means may be operative to demultiplex the first coded signal into transport stream packets having a coded audio signal as the one or more second data strings.

Alternatively, in the aforesaid apparatus, the demultiplexing means may be operative to demultiplex MPEG-2 transport streams inputted at a predetermined time interval by the inputting means into the one or more first data strings, the one or more second data strings, and the one or more third data strings, each having a number of real inputting bits, and the transforming means may comprise: a video elementary stream decoding unit for decoding the one or more first data strings to reconstruct video elementary streams having a number of real inputting bits and other information elementary streams, and separating the video elementary streams from the other information elementary streams; a video elementary stream transforming unit for transforming the video elementary streams reconstructed and separated by the video elementary stream decoding unit to generate output video elementary streams having a number of real outputting bits less than the number of real inputting bits of the video elementary streams; and a transformed first data string generating unit for generating one or more transformed first data strings having a number of real outputting bits less than the number of real inputting bits of the one or more first data strings demultiplexed by the demultiplexing means on the basis of the output video elementary streams generated by the video elementary stream transforming unit and the other information elementary steams reconstructed and separated by the video 5 elementary stream decoding unit, whereby the multiplexing means is operable to multiplex the one or more transformed first data strings generated by the transformed first data string generating unit, the one or more second data strings demultiplexed by the demultiplexing means, and the one or more corrected third data strings corrected by the correcting means to generate a second coded signal to be outputted at the predetermined time interval.

Alternatively, in the aforesaid apparatus may further comprise a computing unit (A) being operative to: assume that a number of real outputting bits of the one or more second data strings contained in the second coded signal at the predetermined time interval is equal to a number of real inputting bits of the one or more second data strings contained in the first coded signal at the predetermined time interval; assume that a number of real inputting bits of the one or more third data strings contained in the second coded signal at the predetermined time interval is equal to the number of real inputting bits of the one or more corrected third data strings generated by the correcting means at the predetermined time interval; subtract the number of real inputting bits of the one or more second data strings contained in the first coded signal at the predetermined time interval and the number of real inputting bits of the one or more third data strings contained in the second coded signal at the predetermined time interval from a target number of outputting bits of all data strings contained in the second coded signal at the predetermined time interval to generate a value A; subtract a total number of real outputting bits of one or more transformed first data strings generated by the transformed first data string generating unit prior to the predetermined time interval from a total target number of outputting bits of one or more transformed first data strings generated by the transformed first data string generating unit prior to the predetermined time interval to generate a value B; and compute a target number of outputting bits of the transformed first data strings generated at the predetermined time interval by the transformed first data string generating unit by adding the value A and the value B.

Alternatively, in the aforesaid apparatus may comprise: computing unit (B) being operative to compute a target number of outputting bits of the output video elementary streams on the basis of outputting bits of the second coded signal able to be outputted at the predetermined time interval; computing unit (C) being operative to compute a reference ratio of outputting bits to inputting bits on the basis of the target number of outputting bits of the output video elementary streams computed and the real inputting bits of the video elementary streams reconstructed by the video elementary stream decoding unit; and computing unit (D) being operative to compute a quantization scaling factor required for transforming the video elementary streams to generate the output video elementary streams on the basis of the reference ratio of outputting bits to inputting bits.

Alternatively, in the aforesaid apparatus, which may further comprise: computing unit (E) being operative to compute a ratio of a total number of real outputting bits of the first one or more transformed data strings generated by the transformed first data string generating unit prior to the predetermined time interval to a total number of real outputting bits of the output video elementary streams prior to the predetermined time interval; computing unit (F) being operative to compute a target number of outputting bits of the output video elementary streams at the predetermined time interval on the basis of the ratio computed by the computing unit (E); and computing unit (G) being operative to compute a reference ratio of outputting bits to inputting bits on the basis of the target number of outputting bits of the output video elementary streams and the real inputting bits of the video elementary streams decoded by the video elementary stream decoding unit.

Alternatively, in the aforesaid apparatus, the transforming means may comprise: computing unit (H) being operative to compute a total number of real outputting bits of the output video elementary streams generated by the video elementary stream transforming unit; computing unit (I) being operative to compute a sum of a target number of outputting bits of the output video elementary streams at the predetermined time interval and a total number of real outputting bits of the output video elementary streams which have been generated until the time when video elementary streams inputted prior to the predetermined time interval into a video ES buffer are consumed; judging unit (A) being operative to judge upon whether the total number of real outputting bits of the output video elementary streams computed by the computing unit (H) is greater than the sum computed by the computing unit (I); and control unit being operative to terminate the transforming means and starting the multiplexing means for processing the one or more transformed first data strings when it is judged that the sum is greater than the total number of real outputting bits by the judging unit (A).

Alternatively, in the aforesaid apparatus, the multiplexing means may comprise: computing unit (J) being operative to compute a PTS to PCR difference by subtracting a value of lastly past presentation time management information element PTS of the first coded signal from a value of a synchronous time information element PCR located in a head position of a data string of the one or more second data strings; computing unit (K) being operative to compute a passing time difference between passing time of the data string of the one or more second data strings in the first coded signal and passing time of the data string of the one or more second data strings in the second coded signal; judging unit (B) being operative to judge upon whether the PTS to PCR difference computed by the computing unit (J) is smaller than the passing time difference computed by the computing unit (K); and locating unit (A) being operative to locate the data string of the one or more second data strings in a rearward position of a data string of the one or more first data strings to be located in a rearward position of the data string of the one or more second data strings when it is judged tat the PTS to PCR difference computed by the computing unit (J) is smaller than the passing time difference computed by the computing unit (K) by the judging unit (B), and the outputting means is operative to output the second coded signal at the predetermined time interval.

Alternatively, in the aforesaid apparatus, the multiplexing means may comprise: computing unit (L) being operative to compute a PCR to PTS difference by subtracting a value of a synchronous time information element PCR to be past subsequently in the first coded signal from a value of a presentation time management information element PTS of a just past data string of the one or more second data strings; computing unit (M) being operative to compute a passing time difference between passing time of the data string of the one or more second data strings in the first coded signal and passing time of the data string of the one or more second data strings in the second coded signal; judging unit (C) being operative to judge upon whether the PCR to PTS difference computed by the computing unit (L) is smaller than the passing time difference computed by the computing unit (M); and locating unit (B) being operative to locate the data string of the one or more second data strings in a forward position of a data string of the one or more first data strings to be located in a forward position of the data string of the one or more second data strings when it is judged that the PCR to PTS difference computed by the computing unit (L) is smaller than the passing time difference computed by the computing unit (M), and the outputting means may be operative to output the second coded signal at the predetermined time interval.

In accordance with the third aspect of the present invention, there is provided a computer program product comprising a computer usable storage medium having computer readable code embodied therein for transcoding a coded multiplexed sound and moving picture sequence, comprising: (a) computer readable program code for inputting a first coded signal through a first transmitting path at an input bit rate; (b) computer readable program code for demultiplexing the first coded signal inputted by the computer readable program code (a) into one or more first data strings, one or more second data strings, and one or more third data strings, the one or more first data strings each having a number of real inputting bits; (c) computer readable program code for transforming the one or more first data strings demultiplexed by the computer readable program code (b) into one or more first data strings having a number of real outputting bits less than the number of real inputting bits of the one or more first data strings, respectively; (d) computer readable program code for multiplexing the one or more transformed first data strings transformed by the computer readable program code (c), the one or more second data strings demultiplexed by the computer readable program code (b), and one or more corrected third data strings to generate a second coded signal; (e) computer readable program code for correcting the one or more third data strings demultiplexed by the computer readable program code (b), on the basis of the first coded signal, in accordance with a change of the second coded signal to generate the one or more corrected third data strings having a number of real inputting bits when the one or more transformed first data strings, the one or more second data, and the one or more corrected third data strings are multiplexed by the computer readable program code (d); and (f) computer readable program code for outputting the second coded signal through a second transmitting path at a target bit rate lower than the input bit rate of the first coded signal.

Alternatively, in the aforesaid computer program product, the computer readable program code (a) may have computer readable program code (a2) for inputting MPEG-2 transport streams. The computer readable program code (b) may have computer readable program code (b2) for demultiplexing the MPEG-2 transport streams inputted by the computer readable program code (a2) into one or more transport stream packets having a coded video signal having a number of real inputting bits as one or more first data strings. Also, the computer readable program code (f) may have computer readable program code (f2) for outputting MPEG-2 transport streams having a video signal having a number of real outputting bits less than the number of real inputting bits of the coded video signal.

Alternatively, in the aforesaid computer program product, the computer readable program code (a) may have computer readable program code (a3) for inputting coded multiplexed sound and moving picture sequence streams. The computer readable program code (b) may have computer readable program code (b3) for demultiplexing the coded multiplexed sound and moving picture sequence streams inputted by the computer readable program code (a3) into one or more transport stream packets having a coded moving picture sequence signal having a number of real inputting bits as the one or more first data strings. Also, the computer readable program code (f) may have computer readable program code (f3) for outputting coded multiplexed sound and moving picture sequence streams having a coded moving picture sequence signal having a number of real outputting bits less than the number of real inputting bits of the coded moving picture sequence signal.

Alternatively, the aforesaid computer program product may further comprises: (g) computer readable program code for computing a value of system clock indicative of a start time of the computer readable program code (b), on the basis of a first reference time information element contained in the first coded signal; and (h) computer readable program code for computing an initial value of the system clock for the second coded signal on the basis of the value of the system clock computed by the computer readable program code (g).

Alternatively, in the aforesaid computer program product, the computer readable program code (c) may further comprise: (c51) computer readable program code for decoding the one or more transport stream packets having a coded video signal having a number of real inputting bits to reconstruct and output video PES packets; (c52) computer readable program code for decoding the video PES packets decoded by the computer readable program code (c51) to reconstruct and output video elementary streams having a real inputting bits, decoding time management information element DTS and presentation time management information element PTS of the video elementary streams, and PTS_DTS flags indicative of presence of the decoding time management information element DTS and the presentation time management information element PTS; (c53) computer readable program code for transforming the video elementary streams decoded and outputted by the computer readable program code (c52) into video elementary streams having a number of real outputting bits less than the number of real inputting bits of the video elementary streams; (c54) computer readable program code for generating transformed video PES packets on the basis of the transformed video elementary stream transformed by the computer readable program code (c53), the decoding time management information element DTS, the presentation time management information element PTS and the PTS_DTS flags indicative of presence of the decoding time management information element DTS and the presentation time management information element PTS decoded and outputted by the computer readable program code (c52); and (c55) computer readable program code for encoding the transformed video PES packets generated by the computer readable program code (c54) to generate a transformed transport stream packets having a number of real outputting bits less than the number of real inputting bits of the transport stream packets.

Alternatively, in the aforesaid computer program product, the computer readable program code (b) may have computer readable program code for demultiplexing the first coded signal into transport stream packets having a coded audio signal as the one or more second data strings.

Alternatively, in the aforesaid computer program product, the computer readable program code (b) may have computer readable program code (b71) for demultiplexing MPEG-2 transport streams inputted at a predetermined time interval by the computer readable program code (a) into the one or more first data strings, the one or more second data strings, and the one or more third data strings, each having a number of real inputting bits. The computer readable program code (c) may comprises: (c71) computer readable program code for decoding the one or more first data strings to reconstruct video elementary streams having a number of real inputting bits and other information elementary streams, and separating the video elementary streams from the other information elementary streams; (c72) computer readable program code for transforming the video elementary streams reconstructed and separated by the computer readable program code (c71) to generate output video elementary streams having a number of real outputting bits less than the number of real inputting bits of the video elementary streams; and (c73) computer readable program code for generating one or more transformed first data strings having a number of real outputting bits less than the number of real inputting bits of the one or more first data strings demultiplexed by the computer readable program code (b71) on the basis of the output video elementary streams reconstructed by the computer readable program code (c72) and the other information elementary steams reconstructed and separated by the computer readable program code (c71). The computer readable program code (d) may have computer readable program code (d71) for multiplexing the one or more transformed first data strings generated by the computer readable program code (c73), the one or more second data strings demultiplexed by the computer readable program code (b71), and the one or more corrected third data strings corrected by the computer readable program code (e) to generate a second coded signal to be outputted at the predetermined time interval.

Alternatively, in the aforesaid computer program product, the computer readable program code (c) may comprise: (c81) computer readable program code for assuming that a number of real outputting bits of the one or more second data strings contained in the second coded signal at the predetermined time interval is equal to a number of real inputting bits of the one or more second data strings contained in the first coded signal at the predetermined time interval; (c82) computer readable program code for assuming that a number of real inputting bits of the one or more third data strings contained in the second coded signal at the predetermined time interval is equal to the number of real inputting bits of the one or more corrected third data strings generated by the computer readable program code (e) at the predetermined time interval; (c83) computer readable program code for subtracting the number of real inputting bits of the one or more second data strings contained in the first coded signal at the predetermined time interval and the number of real inputting bits of the one or more third data strings contained in the second coded signal at the predetermined time interval from a target number of outputting bits of all data strings contained in the second coded signal at the predetermined time interval to generate a value A; (c84) computer readable program code for subtracting a total number of real outputting bits of one or more transformed first data strings generated by the computer readable program code (c73) prior to the predetermined time interval from a total target number of outputting bits of one or more transformed first data strings generated by the computer readable program code (c73) prior to the predetermined time interval to generate a value B; and (c85) computer readable program code for computing a target number of outputting bits of the transformed first data strings generated at the predetermined time interval by the computer readable program code (c73) by adding the value A and the value B.

Alternatively, in the aforesaid computer program product, the computer readable program code (c72) may comprise: (c91) computer readable program code for computing a target number of outputting bits of the output video elementary streams on the basis of outputting bits of the second coded signal able to be outputted at the predetermined time interval; (c92) computer readable program code for computing a reference ratio of outputting bits to inputting bits on the basis of the target number of outputting bits of the output video elementary streams computed by the computer readable program code (c91) and the real inputting bits of the video elementary streams reconstructed by the computer readable program code (c71); and (c93) computer readable program code for computing a quantization scaling factor required for transforming the video elementary streams to generate the output video elementary streams, on the basis of the reference ratio of outputting bits to inputting bits computed by the computer readable program code (c92).

Alternatively, in the aforesaid computer program product, the computer readable program code (c91) may comprise: (c101) computer readable program code for computing a ratio of a total number of real outputting bits of the first one or more transformed data strings generated by the computer readable program code (c73) prior to the predetermined time interval to a total number of real outputting bits of the output video elementary streams prior to the predetermined time interval; and (c102) computer readable program code for computing a target number of outputting bits of the output video elementary streams at the predetermined time interval on the basis of the ratio computed by the computer readable program code (c101). The computer readable program code (c92) may have computer readable program code (c103) for computing a reference ratio of outputting bits to inputting bits on the basis of the target number of outputting bits of the output video elementary streams computed by the computer readable program code (c102) and the real inputting bits of the video elementary streams reconstructed by the computer readable program code (c71).

Alternatively, in the aforesaid computer program product, the computer readable program code (c) may comprise: (c1101) computer readable program code for computing a total number of real outputting bits of the output video elementary streams reconstructed by the computer readable program code (c72); (c1102) computer readable program code for computing a sum of a target number of outputting bits of the output video elementary streams at the predetermined time interval and a total number of real outputting bits of the output video elementary streams which have been generated until the time when video elementary streams inputted prior to the predetermined time interval into a video ES buffer are consumed; (c1103) computer readable program code for judging upon whether the total number of real outputting bits of the output video elementary streams computed by the computer readable program code (c1101) is greater than the sum computed by the computer readable program code (c1102); and (c1104) computer readable program code for terminating the computer readable program code (c) and starting the computer readable program code (d) for processing the one or more transformed first data strings when it is judged that the sum is greater than the total number of real outputting bits by the computer readable program code (c1103).

Alternatively, in the aforesaid computer program product, the computer readable program code (d) comprises: (d1201) computer readable program code for computing a difference by subtracting a value of lastly past presentation time management information element PTS of the first coded signal from a value of a synchronous time information element PCR located in a head position of a data string of the one or more second data strings; (d1202) computer readable program code for computing a difference between passing time of the data string of the one or more second data strings in the first coded signal and passing time of the data string of the one or more second data strings in the second coded signal; (d1203) computer readable program code for judging upon whether the difference computed by the computer readable program product (d1201) is smaller than the difference computed by the computer readable program code (d1202); and (d1204) computer readable program code for locating the data string of the one or more second data strings in a rearward position of a data string of the one or more first data strings to be located in a rearward position of the data string of the one or more second data strings when it is judged that the difference computed by the computer readable program product (d1201) is smaller than the difference computed by the computer readable program code (d1202) by the computer readable program product (d1203). The computer readable program code (f) may have computer readable program code (f1201) for outputting the second coded signal at the predetermined time interval.

Alternatively, in the aforesaid computer program product, the computer readable program code (d) may comprise: (d1301) computer readable program code for computing a difference by subtracting a value of a synchronous time information element PCR to be past subsequently in the first coded signal from a value of a presentation time management information element PTS of a just past data string of the one or more second data strings; (d1302) computer readable program code for computing a difference between passing time of the data string of the one or more second data strings in the first coded signal and passing time of the data string of the one or more second data strings in the second coded signal; (d1303) computer readable program code for judging upon whether the difference computed by the computer readable program code (d1301) is smaller than the difference computed by the computer readable program code (d1302); and (d1304) computer readable program code for locating the data string of the one or more second data strings in a forward position of a data string of the one or more first data strings to be located in a forward position of the data string of the one or more second data strings when it is judged that the difference computed by the computer readable program code (d1301) is smaller than the difference computed by the computer readable program code (d1302) by the computer readable program code (d1303). The computer readable program code (f) may have computer readable program code (f1301) for outputting the second coded signal at the predetermined time interval.

BRIEF DESCRIPTION OF THE DRAWINGS

The present invention and many of the advantages thereof will be better understood from the following detailed description when considered in connection with the accompanying drawings, wherein:

FIG. 7 is a table for PAT and PMT parameters;

DESCRIPTION OF THE PREFERRED EMBODIMENTS

Figure 1:
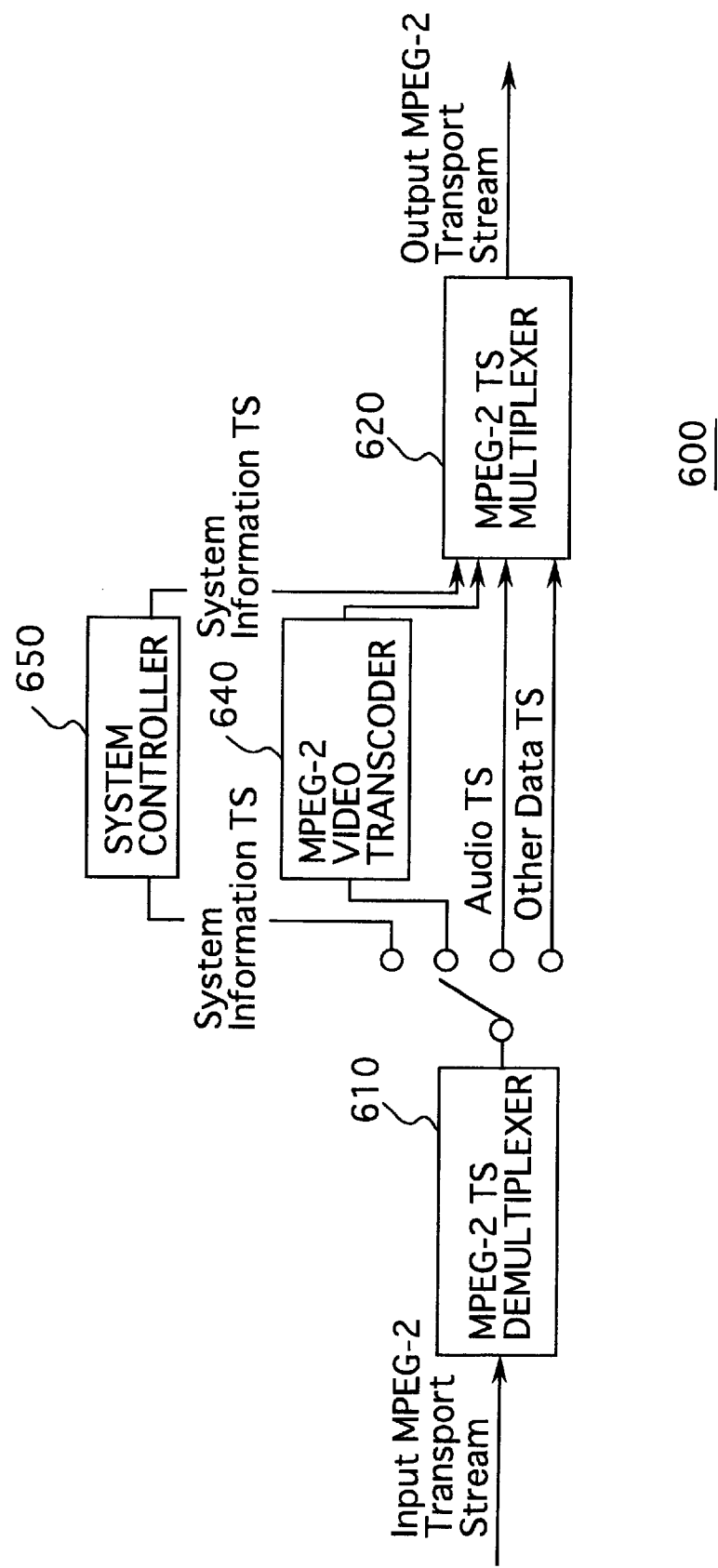
FIG. 1 is a schematic block diagram of a rate converter for describing the basic guideline of the present invention.

Referring now to FIG. 1 of the drawings, the basic concept of the present invention will be described hereinlater.

The rate converter 600 is shown in FIG. 1 as comprising a MPEG-2 transport stream demultiplexer 610, hereinlater referred to as "MPEG-2 TS demultiplexer 610", a MPEG-2 transport stream multiplexer 620, hereinlater referred to as "MPEG-2 TS multiplexer", a MPEG-2 video transcoder 640, and a system controller 650.

The MPEG-2 TS demultiplexer 610 is operated to input MPEG-2 transport stream and demultiplex the inputted MPEG-2 transport streams into video transport streams, hereinlater referred to as "video TS", audio transport streams, hereinlater referred to as "audio TS", and system information transport streams, hereinlater referred to as "system information TS", and output the video TS, the audio TS, and the system information TS.

From the foregoing description, it will be understood that the MPEG-2 TS demultiplexer 610 comprises the inputting means and the multiplexing means to perform two functions consisting of inputting operation and demultiplexing operation. The video TS, the audio TS, and the system information TS constitute one or more first data strings, one or more second data strings, and one or more third data strings, respectively.

The MPEG-2 TS multiplexer 620 is operated to multiplex the video TS, the audio TS, and the system information TS into MPEG-2 transport streams, and output the thus multiplexed MPEG-2 transport streams The MPEG-2 TS multiplexer 620 constitutes the multiplexing means.

The MPEG-2 video transcoder 640 is operated to input the video TS, transcode the video TS, and output the video TS having the number of bits less than that of the inputted video TS. The MPEG-2 video transcoder 640 constitutes the transforming means.

The system controller 650 is operated to input the system information TS, modify or not modify part of fixed codes of the system information TS in accordance with the output MPEG-2 transport streams, and output the partly modified or not modified system information TS. The system controller 650 constitutes the correcting means.

The rate converter 600 is operated to compress only the video bit streams, which have extremely large information volume. The compression operation is carried out through the steps of (a) operating the MPEG-2 TS demultiplexer 610 to demultiplex the input MPEG-2 transport streams into video TS, audio TS, and system information TS; (b) operating the MPEG-2 video transcoder 640 to transcode the video TS to generate output video TS having information volume less than the video TS; (c) operating the system controller 650 to modify or not modify part of fixed codes of the system information TS in accordance with the output MPEG-2 transport streams; (d) operating the MPEG-2 TS multiplexer to multiplex the video TS thus transcoded, the audio TS, and the eventually partly-modified or not modified system information TS into output MPEG-2 transport streams, and output the output MPEG-2 transport streams. As will be understood from the description, the system controller 650 is operated, instead of the system information decoder 917 and the system information encoder 937 of the apparatus 900, to modify or not modify part of fixed codes of the system information bit streams in response to the output MPEG-2 transport streams, and eventually replace the thus partly-modified system information bit streams with the original system information bit streams. The rate converter 600 is simplified in comparison with the conventional art such as the apparatus 900.

As will be understood from the foregoing descriptions, the rate converter 600 ensures that the following problems (1) to (3) are solved with respect to the apparatus 900 of the simple combination of the MPEG-2 TS decoder and the MPEG-2 TS encoder.

(1) Amount of process is increased.
(2) Quality of pictures is deteriorated.
(3) Frame realignment causes delay.

Figure 2:
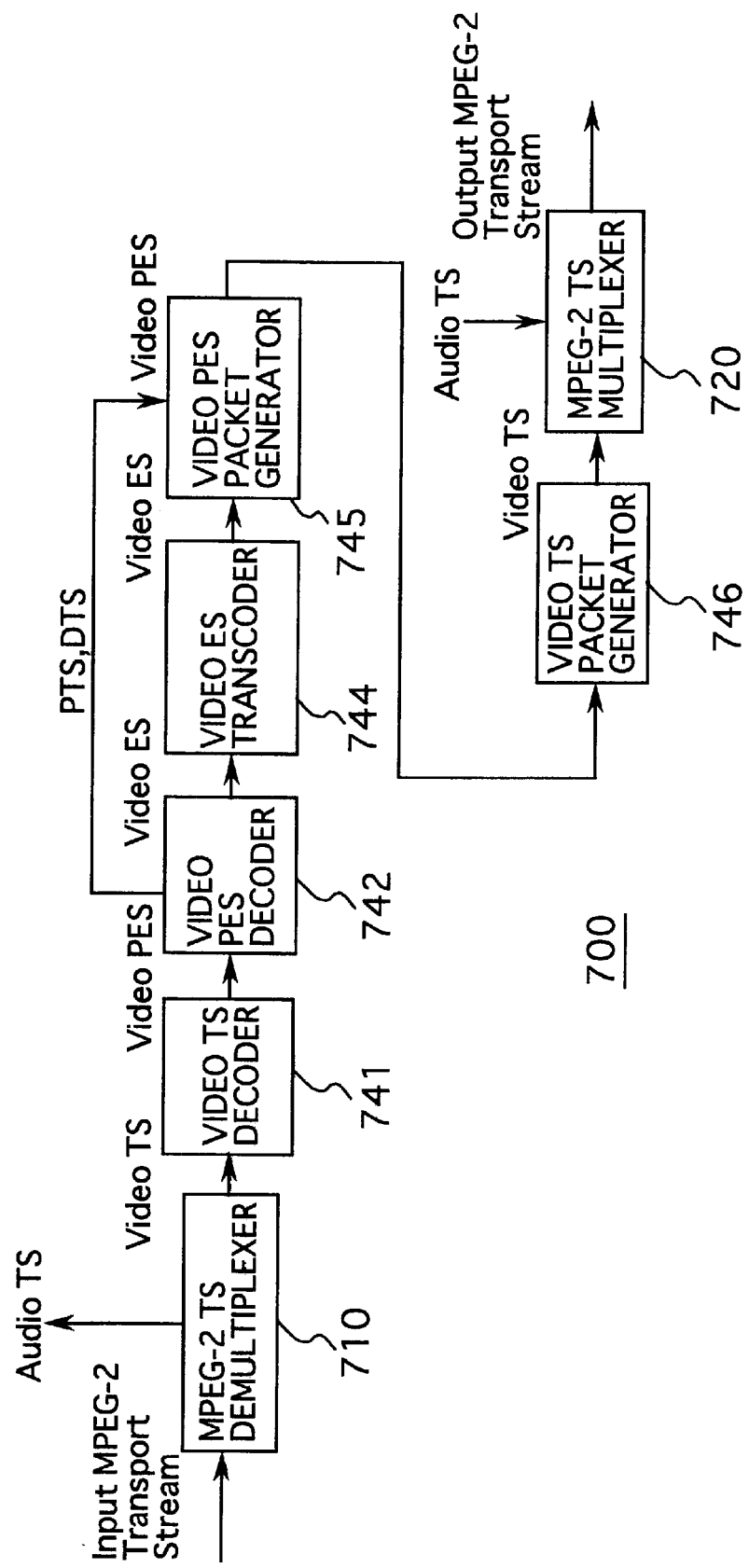
FIG. 2 is a schematic block diagram of a rate converter, which ensures to synchronize the output video bit streams with the input video bit streams on the basis of PTS and DTS contained in the input MPEG-2 transport streams.

FIG. 2 shows a rate converter 700, which ensures to synchronize the output video bit streams with the input video bit streams on the basis of PTS (Presentation Time Stamp: presentation time management information element) and DTS (Decoding Time Stamp: decoding time management information element) contained in the input MPEG-2 transport streams.

The rate converter 700 is shown in FIG. 2 as comprising a MPEG-2 TS demultiplexer 710, a MPEG-2 TS multiplexer 720, a video TS decoder 741, a video PES decoder 742, a video ES transcoder 744, a video PES packet generator 745, a video TS packet generator 746.

The MPEG-2 TS demultiplexer 710 is operated to demultiplex the inputted MPEG-2 transport streams into video TS and other TS and to output the video TS and the other TS.

The MPEG-2 TS multiplexer 720 is operated to input the video TS and the other TS and to output the output MPPEG-2 TS transport streams.

The video TS decoder 741 is operated to input the video TS, to decode the video TS into video PES, and to output the video PES. The video TS decoder 741 constitutes the video transport stream packet decoding unit.

The video PES decoder 742 is operated to input the video PES, to decode the video PES into the PTS, the DTS, other information element, and video ES (ES: elementary stream), and to output the PTS, the DTS and the video ES. The video PES decoder 742 constitutes the video PES packet decoding unit.

The video ES transcoder 744 is operated to input the video ES, to transcode the video ES to generate transcoded video ES having the number of bits less than the number of bits of the video ES. The video ES transcoder 744 constitutes the transforming unit.

The video PES packet generator 745 is operated to input the PTS, DTS, the other information element and the transcoded video ES to generate and output the output video PES. The video PES packet generator 745 constitutes the video PES packet generating unit.

The video TS packet generator 746 is operated to input the output video PES to generate and output the output video TS having the number of bits less than that of the inputted video TS. The video TS packet generator 746 constitutes the video transport stream generating unit.

The rate converter 700 is operable to ensure the synchronization of the output video bit streams with the input video bit streams through the steps of: (a) decoding the video PES into the video ES, the corresponding PTS, the corresponding DTS and other information element; (b) temporally storing the PTS and the DTS; and (c) generating the output video PES from the transcoded video ES, the corresponding PTS, the corresponding DTS, and the other information element so that the PTSs and the DTSs in the input video elementary streams of the video bit streams contained in the input MPEG-2 transport streams are matched with those in the corresponding video elementary streams of the output video bit streams contained in the output MPEG-2 transport streams as well as the PTSs and the DTSs in the audio frames of the audio bit streams contained in the input MPEG-2 transport streams are matched with those in the corresponding audio frames of the audio bit streams contained in the output MPEG-2 transport streams.

Figure 3:
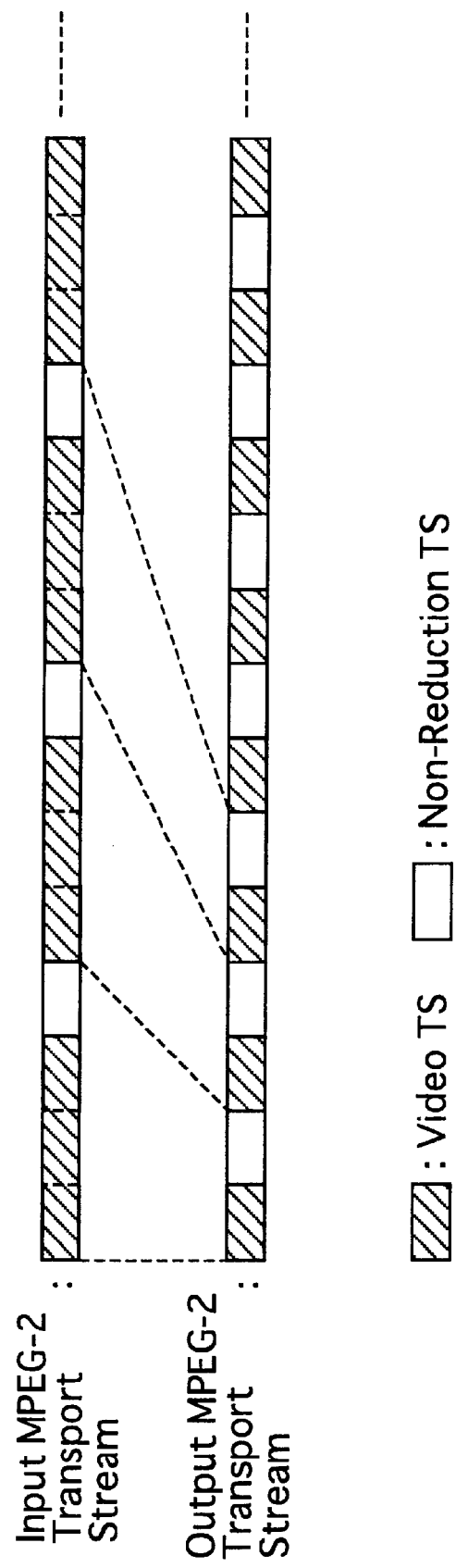
FIG. 3 is a block diagram showing a relationship between the video TS and the non-reduction TS contained in the input MPEG-2 transport stream and the output MPEG-2 transport stream.

Referring to FIG. 3 of the drawings, there is shown a relationship between video TS and non-reduction TS contained in the input MPEG-2 transport stream and the output MPEG-2 transport stream. In FIG. 3, the bit rate of the output MPEG-2 transport stream is reduced to the half of that of the input MPEG-2 transport stream.

Here, "non-reduction TS packets" are all the TS packets excluding two types of packets consisting of transport packets including video bit streams contained in the input MPEG-2 transport stream, and TS packets apt to change in accordance with the control state in the system such as PAT and PMT.

As will be understood from FIG. 3, the non-reduction TS packets are interposed between the packets to be reduced, hereinlater referred to as "reduction-object packets", in accordance with a ratio of the output bit rate to the input bit rate, thereby making it possible that the non-reduction TS packets contained in the output MPEG-2 transport streams arrive at the decoder at the same time at which the non-reduction TS packets contained in the input MPEG-2 transport streams are supposed to arrive at.

Figure 4:
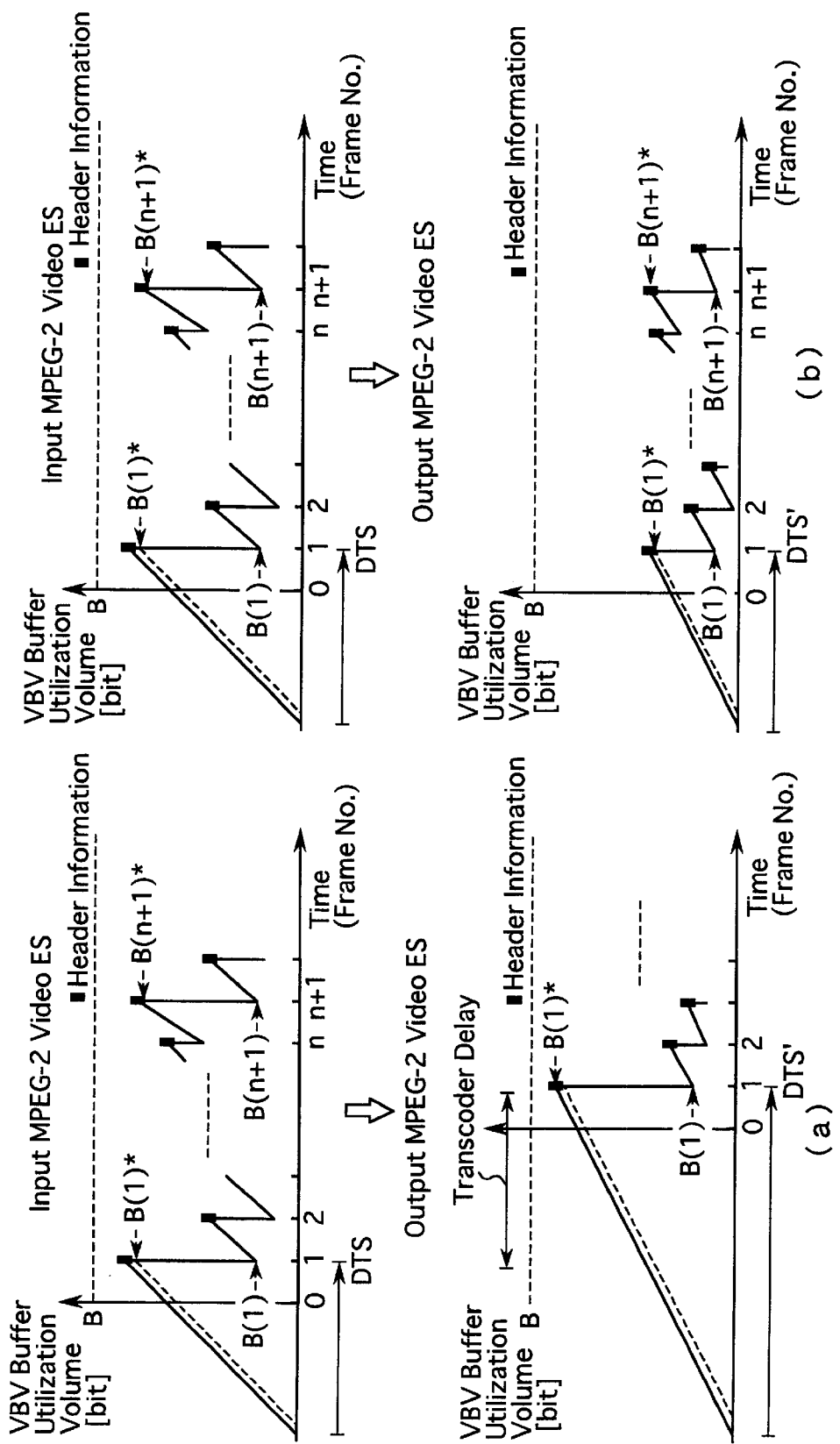
FIGS. 4(a) and 4(b) are sets of graphs respectively showing the transitions of utilization volume of VBV buffer for the input MPEG-2 video ES and output MPEG-2 video ES while the input MPEG-2 video ES is transcoded.

Referring to FIG. 4 of the drawings, the transition of utilization volume of a Video Buffering Verifier buffer, hereinlater referred to as "VBV buffer" (Video Buffering Verifier: a parameter indicative of the size of the virtual buffer used for controlling the number of generating bits) and DTS (Decoding Time Stamp: decoding time management information) while the bit rate of video bit streams contained in the output MPEG-2 transport streams is reduced to the half of that of video bit streams contained in the input MPEG-2 transport streams in the case of (a) and the case of (b).

In the case of (a), the number of bits of I-pictures are not reduced while the number of bits of P-pictures and B-pictures are reduced. In the case of (b), on the other hand, the bit numbers of I-pictures, P-pictures, and B-pictures are evenly reduced. This means that the ratio of I-pictures, P-pictures, and B-pictures in the input video bit streams remains the same as that in the output video bit streams. This means that the ratio of the number of bits constituting a frame in the output bit streams to the number of bits constituting the same frame in the output bit streams is equal to the ratio of the output bit rate to the input bit rate.

In FIG. 4, the upper graph shows the transition of utilization volume of the VBV buffer for the video elementary streams contained in the input bit streams before the transcoding operation, and the lower graph shows the transition of utilization volume of the VBV buffer for the video elementary streams contained in the output bit streams after the transcoding operation. "B" indicates the size of a receiving buffer, "B(n)*" indicates the VBV buffer utilization volume just before the n-th picture is decoded, and "B(n)" indicates the VBV buffer utilization volume just after the n-th picture is decoded and the number of bits for the size of the picture frame is removed from the buffer. The VBV buffer utilization volume must fluctuate within a range of 0 and B. The slope of a line segment indicates a bit rate.

The receiving buffer waits until the time indicated by DTS to start decoding a picture frame consisting of input video elementary streams while the receiving buffer waits until the time indicated by DTS' to start decoding the picture frame consisting of the output video elementary streams.

In the case of (a), DTS' is greater than DTS. As will be understood in FIG. 4(a), a delay of (DTS'−DTS) occurs. The difference of (DTS'−DTS) causes not only the delay in the output MPEG-2 transport streams, but also disables the synchronization with the audio bit streams. On the other hand, if the DTS is attached to the output bit streams as an information element indicative of the starting time of the decoding operation, some of the video elementary streams constituting one picture frame may not arrive at the MPEG-2 transport stream decoder before the time indicated by the DTS, thus, the MPEG-2 transport stream decoder must wait until all of the video elementary streams constituting the picture frame arrive so as to decode the whole picture frame.

In the case of (b), DTS' is equal to DTS. This means that all of the video elementary streams constituting one picture frame will arrive at the MPEG-2 transport stream decoder until the time indicated by the DTS, thereby making it possible to start decoding the picture frame at the time indicated by the DTS.

As will be understood from the foregoing descriptions, the rate control method must satisfy the condition of DTS'=DTS, that is to say, the ratio of the number of bits constituting one frame in the output bit streams to the number of bits constituting the same frame in the input bit streams must be equal to the ratio of the output bit rate to the input bit rate.

Figure 5:
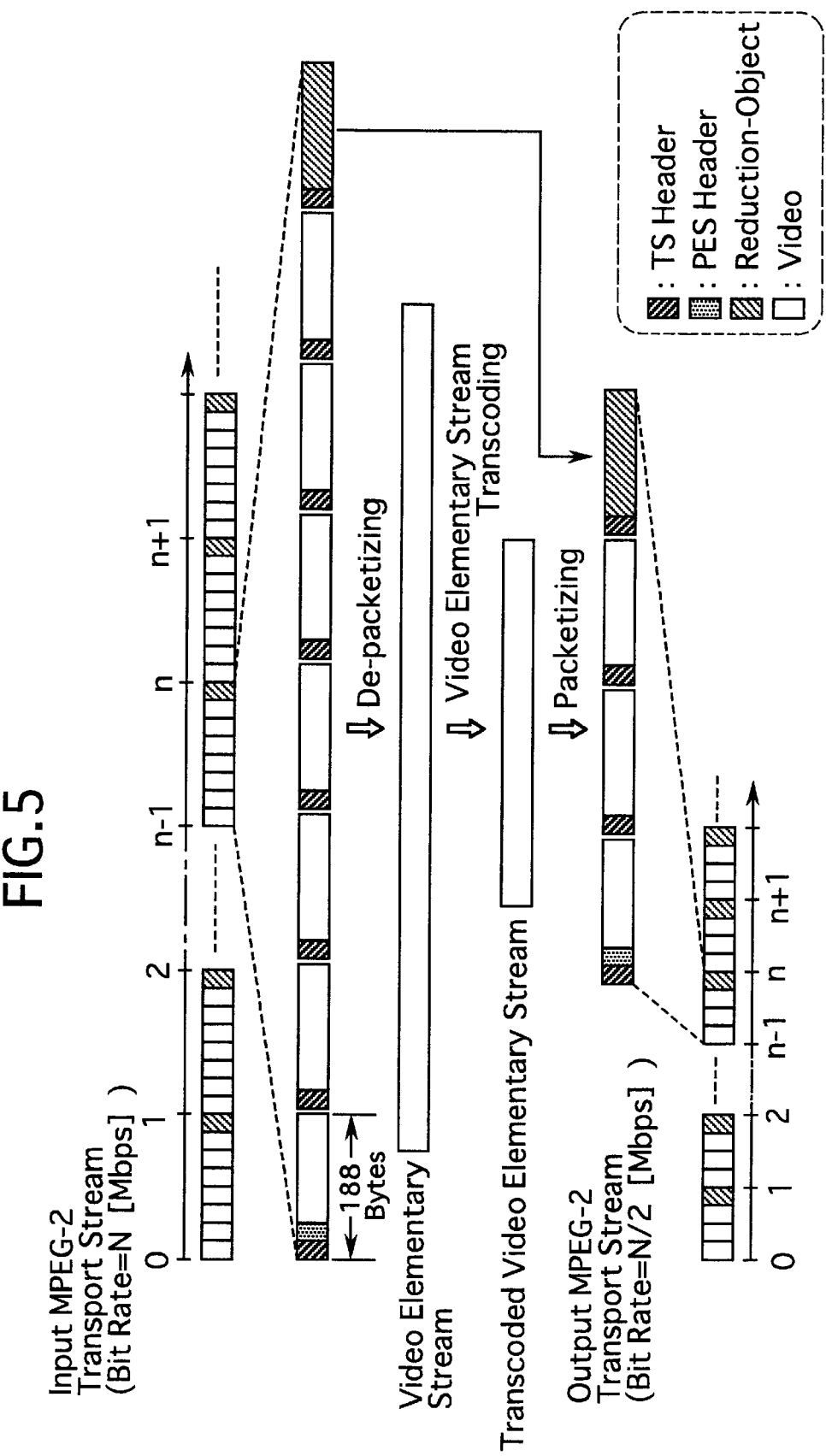
FIG. 5 is a block diagram indicating the concept of the rate control method for controlling the output bit rate of video bit streams in the VBR (Variable Bit Rate) format performed during the transcoding process.

FIG. 5 is a block diagram indicating the concept of the rate control method for controlling the output bit rate of video bit streams in the VBR (Variable Bit Rate) format performed during the transcoding process. In FIG. 5, the input MPEG-2 transport streams at an input bit rate is converted into the output MPEG-2 transport streams at the target bit rate, which is the half of the input bit rate.

Each of the MPEG-2 transport stream consists of packets of 188 bytes. The number of packets to be inputted at time interval of a predetermined duration is always the same. This means that the number of packets inputted at time interval of a predetermined duration can be computed on the basis of the product of the input bit rate and the predetermined time duration. This leads to the fact that a target number of packets to be outputted at time interval of the predetermined duration can be computed in the similar manner of computing the number of packets to be inputted at time interval of the predetermined duration.

Furthermore, the number of video TS and the number of non-reduction TS contained in the input MPEG-2 transport streams can be computed on the basis of information elements acquired when the input MPEG-2 transport steams are demultiplexed. Provided that the non-reduction transport streams are not to be compressed, the target number of output video TS packets at time interval of a predetermined duration (n) can be computed by subtraction of the number of packets of the non-reduction TS and the number of PAT and PMT packets to be outputted at time interval of the predetermined duration (n) from the target number of the total packets to be outputted at time interval of the predetermined duration (n).

As will be understood from the foregoing descriptions, the rate control for controlling the output bit rate of video bit streams in the VBR format can be performed basically by transcoding the video elementary streams decoded from the input video TS to reconstruct the output video elementary streams so as to output the target number of the output video TS packets.

There is another problem which makes it difficult to determine the target number of the output video TS packets. While transcoding the MPEG-2 transport streams, the video elementary streams are converted to PES (PES: Packetized Elementary Stream) packets and TS (TS: Transport Stream) packets, and as a consequence, new packet headers are generated and attached to the PES packets and TS packets, thereby causing overhead. The exact number of packet headers thus newly generated, however, cannot be estimated beforehand. The target bit number of the output video elementary streams to be outputted at time interval of the predetermined duration (n), therefore, is determined through the steps of (1) computing the overhead generated and accumulated through the process of converting the video elementary streams to PES packets and TS packets from the time interval of the predetermined duration (0) to the time interval of the predetermined duration (n−1); and (2) computing the target bit number of the output video elementary streams at time interval of the predetermined duration (n) in consideration of the overhead generated and accumulated from the time interval of the predetermined duration (0) to the time interval of the predetermined duration (n−1) computed in the step (1).

The basic guideline of the MPEG-2 TS transcoder algorithm for controlling the target bit rate based on the method according to the present invention will be described hereinlater.

Basic Guideline:

The number of bits contained in the input MPEG-2 transport stream must be reduced in order to control the output bit rate.

The MPEG-2 transport stream, hereinlater referred to as "MPEG-2 TS", comprises a system control signal and a code signal. The code signal includes the video bit stream and the audio bit stream. The system control signal is constituted by a PAT (Program Association Table), a PMT (Program Map Table), PID (Packet Identification), CAT (Conditional Access Table), and NIT (Network Information Table). The PAT is part of the service information. For each program accessible on the current transport stream, a PAT gives the PID of its PMT, which will be described hereinlater. The PMT is part of the service information. A PMT gives information about a program within the current transport stream and makes the mapping between program components and elementary streams. PMTs contain a list of elementary streams that may be identified by a stream type and a track value. A PMT also contains the Program Clock Reference (PCR) PID. The PID is an integer used by the kernel to uniquely identify a process or a packet. The CAT is part of the service information. A CAT provides conditional access systems information and the Entitlement Management Messages (EMM) stream PID and description. Each CAT contains one loop of descriptors. The NIT is part of the service information. An NIT contains information about the network and the physical medium.

As will be understood, the system control signal is directly related to the service. The reduction of the system control signal will result in the failure or degradation of the actual service. This means that the system control system cannot be reduced. Accordingly, the video bit stream or the audio bit streams are considered to be reduced.

MP@ML (a "conformance point" that the MPEG committee determined to adopt for consumer quality standard) indicates that the size of the video bit stream is in a range of 4 Mbps to 15 Mbps, and the size of the audio bit stream is less than 384 kbps. Because of the fact that the video bit stream has the extremely large number of bit rate, the basic guideline of the MPEG-2 transcoder algorithm is targeted for compressing only the video bit stream, which is regarded to occupy extremely large information volume in the MPEG-2 transport stream.

The predetermined duration (n) is computed by dividing the total number of bits of the MPEG-2 TS packets inputted to the MPEG-2 TS transcoder by the input MPEG-2 transport stream bit rate, hereinlater referred to as, "TSB_in" [bps]. The time interval of the predetermined duration (n) expires at the time when the total number of the input MPEG-2 TS packets, hereinlater referred to as, "All_TS_in" satisfies the equation (32) as follows:

$$AllTS_{in} = \frac{TSB_{in} \times bf\_time}{188 \times 8} \times n \qquad \text{equation (32)}$$

where "188" is a packet length [byte/packet], and "8" is the number of bits per byte [bit/byte].

The transcoder, however, does not immediately start transcoding the inputted MPEG-2 transport streams if already started MPEG-2 transport streams are inputted, for instance, continuous bit streams such as bit streams carrying the continuous digital broadcast data elements are inputted. In the case, the transcoder firstly detects the first PAT and PMT in the inputted bit streams, sets the time when the first PAT and PMT are detected as the initial time of the predetermined duration.

Figure 6:
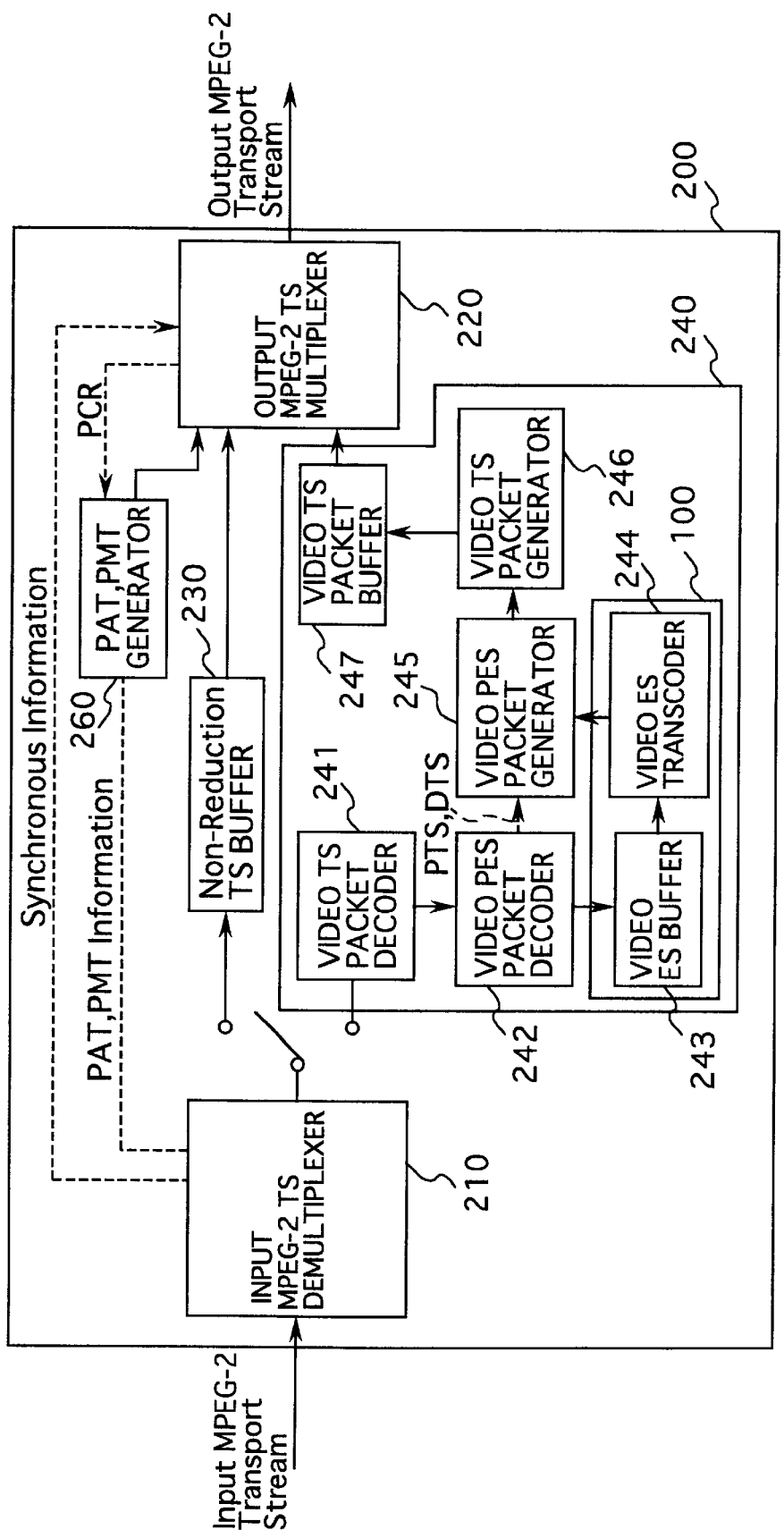
FIG. 6 is a schematic block diagram of a first preferred embodiment of the apparatus for transcoding the coded multiplexed sound and moving picture sequence according to the present invention.

Referring to FIG. 6 of the drawings, there is shown a schematic block diagram of a first preferred embodiment of the transcoder for transcoding the coded multiplexed sound and moving picture sequence according to the present invention.

The transcoder 200 is as shown in FIG. 6 as comprising an input MPEG-2 TS demultiplexer 210, an output MPEG-2 TS multiplexer 220, a non-reduction TS buffer 230, a PAT, PMT generator 260, and a video TS processor 240. The video TS processor 240 comprises a video TS packet decoder 241, a video PES packet decoder 242, a video PES packet generator 245, a video TS packet generator 246, a video TS packet buffer 247. and a video transcoding unit 100. The video transcoding unit 100 has a video ES buffer 243 and a video ES transcoder 244.

The input MPEG-2 TS demultiplexer 210 constitutes the inputting means and the demultiplexing means, the output MPEG-2 TS multiplexer 220 constitutes the multiplexing means, the PAT, PMT generator 260 constitutes the correcting means, and the video transcoding unit 100 constitutes the transforming means. Every constitutional element is operated in parallel and synchronization with one another to perform the real time operation.

The operation of the video transcoding unit 100 will be described hereinlater.

The input MPEG-2 TS demultiplexer 210 is adapted to identify a first reference time information element, i.e., PCR (Program Clock Reference), contained in the input MPEG-2 transport stream to compute the initial value of the system clock, i.e., PCR_offset, indicative of the start time of the demultiplexing operation on the basis of PCR, and output PCR_offset to the output MPEG-2 TS multiplexer 220. The output MPEG-2 TS multiplexer 220 is operated to compute the initial value of the system clock used for the output MPEG-2 transport stream on the basis of PCR_offset.

As will be understood from the foregoing descriptions, the input MPEG-2 TS demultiplexer 210 and the output MPEG-2 TS multiplexer 220 is designed to perform the function of the reference time setting means, and PCR serves as the value of system clock indicative of the start time of the demultiplexing means.

The input MPEG-2 transport stream consists of TS packets. There are three types of the TS packets such as the PAT, PMT packets, the non-reduction TS packet, and the video TS packets.

The TS packet of the same type has the similar payload. The input MPEG-2 TS demultiplexer 210 is adapted to input the input MPEG-2 transport stream consisting of TS packets, identifying PIDs of TS packet headers, and demultiplex the TS packets into the PAT, PMT packets, the non-reduction TS packets, and the video TS packets at time interval of the predetermined duration (n) on the basis of the PIDs. The video TS packets, the non-reduction TS packet, and the PAT, PMT packets serve as one or more first data strings, one or more second data strings, and one or more third data strings, respectively.

The input MPEG-2 TS demultiplexer 210 is adapted to identify the type of the TS packets on the basis of the PIDs and the payloads of the TS packets, and carry out three different operations according to the type of the TS packets as follows.

(1) PAT, PMT packets

The input MPEG-2 TS demultiplexer 210 is adapted to decode the PAT, PMT packets, extract PAT, PMT data information elements (see FIG. 7) from the PAT, PMT packets, and output the PAT, PMT data information elements thus extracted to the PAT, PMT generator 260. The PAT, PMT packets may be modified or not modified in accordance with the transmitting path which the output MPEG-2 transport stream flows at the target bit rate.

(2) Non-reduction TS packets such as the audio TS packets, the system control TS packets excluding the above PAT, PMT packets, and null packets (invalid packets)

The input MPEG-2 TS demultiplexer 210 is adapted to store the positions of the non-reduction TS packets at time interval of the predetermined duration (n), and output the non-reduction TS packets to the non-reduction TS buffer 230. The output MPEG-2 TS multiplexer 220 is adapted to read the stored positions of the non-reduction TS packets while multiplexing TS packets of the three types into the output MPEG-2 transport stream so that the non-reduction TS packets contained in the output MPEG-2 transport stream arrive at the time at which the non-reduction TS packets contained in the input MPEG-2 transport stream are supposed to arrive at.

Figure 8:
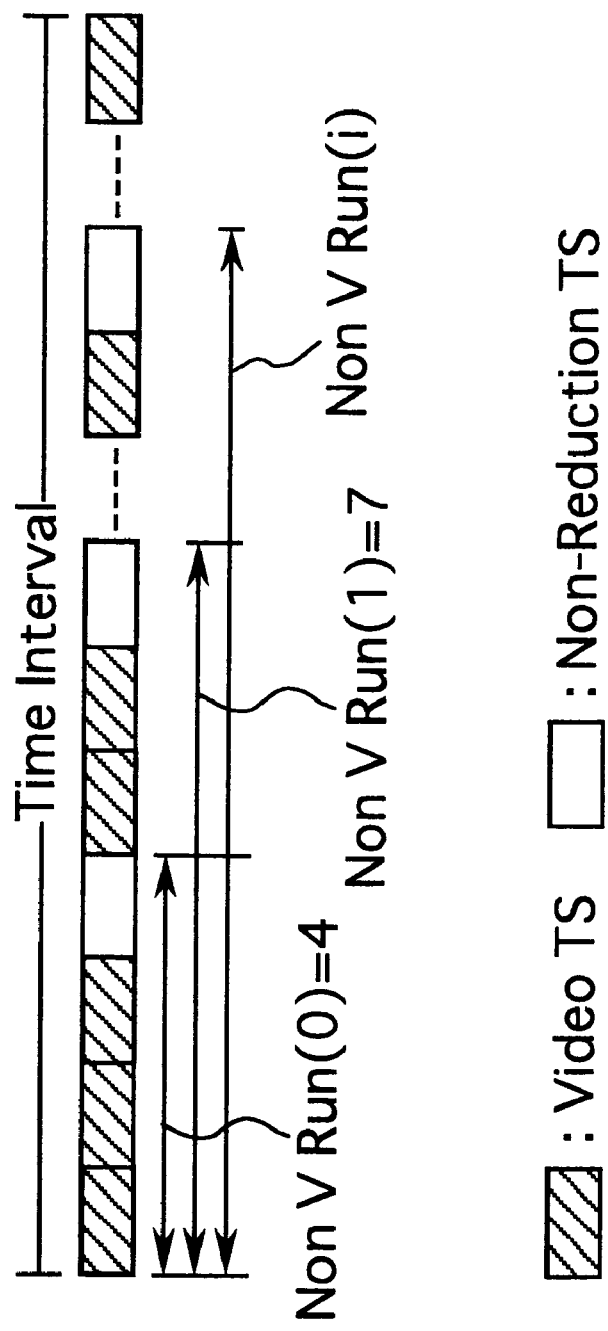
FIG. 8 is a block diagram showing the positions of non-reduction TS packets in the input MPEG-2 transport stream at time interval of the predetermined duration (n)

FIG. 8 shows positions of the non-reduction TS packets in the input MPEG-2 transport stream at time interval of the predetermined duration (n). NonV_Run(i) indicates the position of the i-th non-reduction TS packet, i.e., the number of TS packets interposed between the first TS packet and the i-th non-reduction TS packet at time interval of the duration (n).

(3) Video TS packets

The input MPEG-2 TS demultiplexer 210 is adapted to delete the video TS packets having no payload, and output the video TS packets to the video TS packet decoder 241.

The input MPEG-2 TS demultiplexer 210 is adapted to send a signal indicative of the end of the time interval of the duration (n), to the non-reduction TS buffer 230 and the video TS packet buffer 247 at the time when the number of the input MPEG-2 TS packets satisfies the aforesaid equation (32).

Furthermore, the input MPEG-2 TS demultiplexer 210 is adapted to decode the PCR-PID TS packet indicated by PMT in the input MPEG-2 transport stream to reconstruct the PCR at time interval for the predetermined duration (0), compute the total byte number of the input MPEG-2 transport stream inputted to the input MPEG-2 TS demultiplexer 210 prior to the PCR, and compute the PCR_offset of the system clock, i.e., the start time of the demultiplexing operation at which the first byte is inputted to the input MPEG-2 TS demultiplexer 210 on the basis of the bit rate of the input MPEG-2 transport stream and the total byte number of the input MPEG-2 transport stream inputted prior to the PCR in accordance with the equation (33) as follows:

$$PCR_{offset} = firstPCR - \frac{27000000 \times ((TS_{cnt} - 1) \times 188 \times 8 + PCR\_point \times 8)}{TSB_{in}} \quad \text{equation (33)}$$

where "first_PCR" is the first PCR, TS_cnt is the total number of the input MPEG-2 TS packets inputted prior to the first_PCR, including the TS packet which contained the encoded first_PCR, PCR_point is the total byte number from the head byte to the byte which contains the end bit of program_clock_reference_base in the TS packet which contains the encoded first_PCR, TSB_in is the bit rate of the input MPEG-2 transport stream, and "27000000" is the MPEG-2 reference clock, which is 27 MHz.

The PAT, PMT generator 260 is operated to generate PAT, PMT packets for the output MPEG-2 TS on the basis of the PAT, PMT data information elements (see FIG. 7) received from the input MPEG-2 TS demultiplexer 210 when the total number of the output TS packets outputted at time interval of the predetermined duration (n), i.e., TS_out, satisfies the equation (34) as follows;

$$188 \times 8 \times \left(TS_{out} + \sum_{i=0}^{n-1} AllTS_{out}(i)\right) \geq freq \times TSB_{out} \times S_{out} \quad \text{equation (34)}$$

where all_TS_out(i) is the number of the output TS packets at time interval for the predetermined duration (i), S_out is the total number of times PAT, PMT has been outputted until the time when the total number of the output TS packets satisfies the equation (34), and TSB_out[bps] is the bit rate of the output MPEG-2 transport stream. freq is a time interval that PAT, PMT is transmitted. The transcoder 200 is designed to set PCR to PMT. It is stipulated that PCR should be transmitted at time intervals of 0.1 second or less. As a result, freq shall be 0.1 second or less, i.e., freq$\leq$0.1.

The initial value of PCR is PCR_offset, which is computed by the input MPEG-2 TS demultiplexer 210 in accordance with the equation (35).

$$PCR = \frac{27000000 \times \left(\left(TS_{out} + \sum_{i=0}^{n-1} AllTS_{out}(i)\right) \times 188 + PCR\_Point\right) \times 8}{TSB_{out} + PCR_{offset}} \quad \text{equation (35)}$$

The output MPEG-2 TS multiplexer 220 is operated to start inputting the TS packets at time interval of the predetermined duration (n) upon receiving a signal indicative that non-reduction TS buffer 230 and video TS packet buffer 247 are filled up. Here, the number of video TS packets inputted at time interval of the predetermined duration (n) will be referred to as "Video_TS_out(n)", the number of non-reduction TS packets inputted at time interval of the predetermined duration (n) will be referred to as "NonV_TS_out(n)", and the number of the PAT, PMT packets to be outputted at time interval of the predetermined duration (n) will be referred to as "PATPMT_out(n)", hereinlater. PATPMT_out(n) is determined to be 2 if the equation (36) is satisfied, otherwise 0. The equation (36) is as follows:

$$188 \times 8 \times \sum_{i=0}^{n} tAllTS_{out}(i) \geq freq \times TSB_{out} \times S_{out} \quad \text{equation (36)}$$

where tall_TS_out(i) is the target number of TS packets to be outputted at time interval of the predetermined duration (i).

The number of the video TS packets contained in the buffer at time interval of the predetermined duration (n), hereinlater referred to as "Video_TS_buff(n)", is computed in accordance with the equation (37), and the number of the non-reduction TS packets contained in the buffer at time interval of the predetermined duration (n), hereinlater referred to as "NonV_TS_buff(n)", is computed in accordance with the equation (38) as follows:

$$Video\_TS\_buff(n)=Video\_TS\_out(n)+diff\_TS\_out(n) \quad \text{equation (37)}$$

$$NonV\_TS\_buff(n)=NonV\_TS\_out(n)+PATPMT\_out(n) \quad \text{equation (38)}$$

where diff_TS_out(n) will be described hereinlater.

The output MPEG-2 TS multiplexer 220 is designed to control input and output synchronization on the basis of the synchronization information element, i.e., NonV_Run(i) inputted from the input MPEG-2 TS demultiplexer 210. The output MPEG-2 TS demultiplexing process is carried out through the three following steps.

Step 1

Compute the target number of the TS packets to be outputted at time interval of the predetermined duration (n), i.e., target_TS_out, in consideration of the difference between the total of the target numbers of the TS packets to be outputted at time interval from the 0-th, i.e., duration (0) to the (n)-th, i.e., duration (n) and the total number of TS packets outputted at time interval from 0-th duration (0) to the (n−1)-th, i.e., duration (n−1) in accordance with the equation (39) as follows:

$$targetTS_{out} = \sum_{i=0}^{n} tAllTS_{out}(i) - \sum_{i=0}^{n-1} AllTS_{out}(i) \quad \text{equation (39)}$$

where all_TS out(i) is the number of the TS packets outputted at time interval of the i-th duration (i).

Step 2

Judge upon whether the total number of the output TS packets outputted at time interval of the predetermined duration (n), i.e., TS_out, satisfies the equation (34). PAT, PMT is generated and outputted by the PAT, PMT generator 260, and T S_out and S_out are incremented by two if it is judged that the total number of the output TS packets outputted at time interval of the predetermined duration (n), i.e., TS_out, satisfies the equation (34).

Step 3

Output one video TS packet if the below-stated equation (40) is satisfied. Otherwise, one non-reduction TS packet is outputted and i is incremented by one. i is the number of the non-reduction TS packets to be outputted at time interval of the predetermined duration. The equation (40) is as follows:

$$TS_{out} \leq \frac{NonVRun(i) \times TSB_{out}}{TSB_{in}} - 1 \quad \text{equation (40)}$$

where the number of the outputted TS packets is added to TS_out whenever the TS packets are outputted.

Step 4

The output MPEG-2 TS multiplexing operation is terminated if a termination condition, which will be described below is satisfied. Otherwise, go back to the step 2 and repeat the step 2 and step 3 until the termination condition is satisfied.

The termination condition is as follows:
If Video_TS-buff(n)+NonV_TS_buff(n) is greater than target_T S_out, TS_out=target_TS_out.
Otherwise,
TS_out=Video_TS_buff(n)+NonV_TS-buff(n)

If Video_TS_buff(n)+NonV_TS_buff(n) is greater than target_TS_out, compute diffVTS_out(n+1) in accordance with the equation (41) after the output MPEG-2 TS multiplexing operation is terminated:

$$diffVTS\_out(n+1)=Video\_TS\_buff(n)+NonV\_TS\_buff(n)-target\_TS\_out \quad \text{equation (41)}$$

where diffVTS_out(n+1) is the difference between the number of TS packets actually outputted to the output MPEG-2 TS multiplexer 220 at time interval of the duration (n) and the target number of TS packets to be outputted the output MPEG-2 TS multiplexer 220 at time interval of the duration (n). In other words, diffVTS_out(n+1) is the difference between the number of video TS packets actually outputted at time interval of the duration (n) and the target number of video TS packets to be outputted at time interval of the duration (n). This means that all of the TS packets to be outputted at time interval of the predetermined duration (n+1) for the mount of diffVTS_out(n+1) are video TS packets. The output MPEG-2 TS multiplexer 220 is operated to perform stuffing operation, i.e., output null packets (invalid packets) to the output MPEG-2 TS so that the output bit rate of the output MPEG-2 TS comes closer to the target bit rate if the following equation (42) is satisfied:

$$\sum_{i=0}^{n} tAllTS_{out}(i) - \left(TS_{out} + \sum_{j=0}^{n-1} AllTS_{out}(i)\right) > STUFF\_TH \quad \text{equation (42)}$$

where STUFF_TH is a threshold value. If the number of the actually outputted packets is smaller than the target number of the TS packets to be outputted by more than STUFF_TH, the stuffing process is performed.

Figure 9:
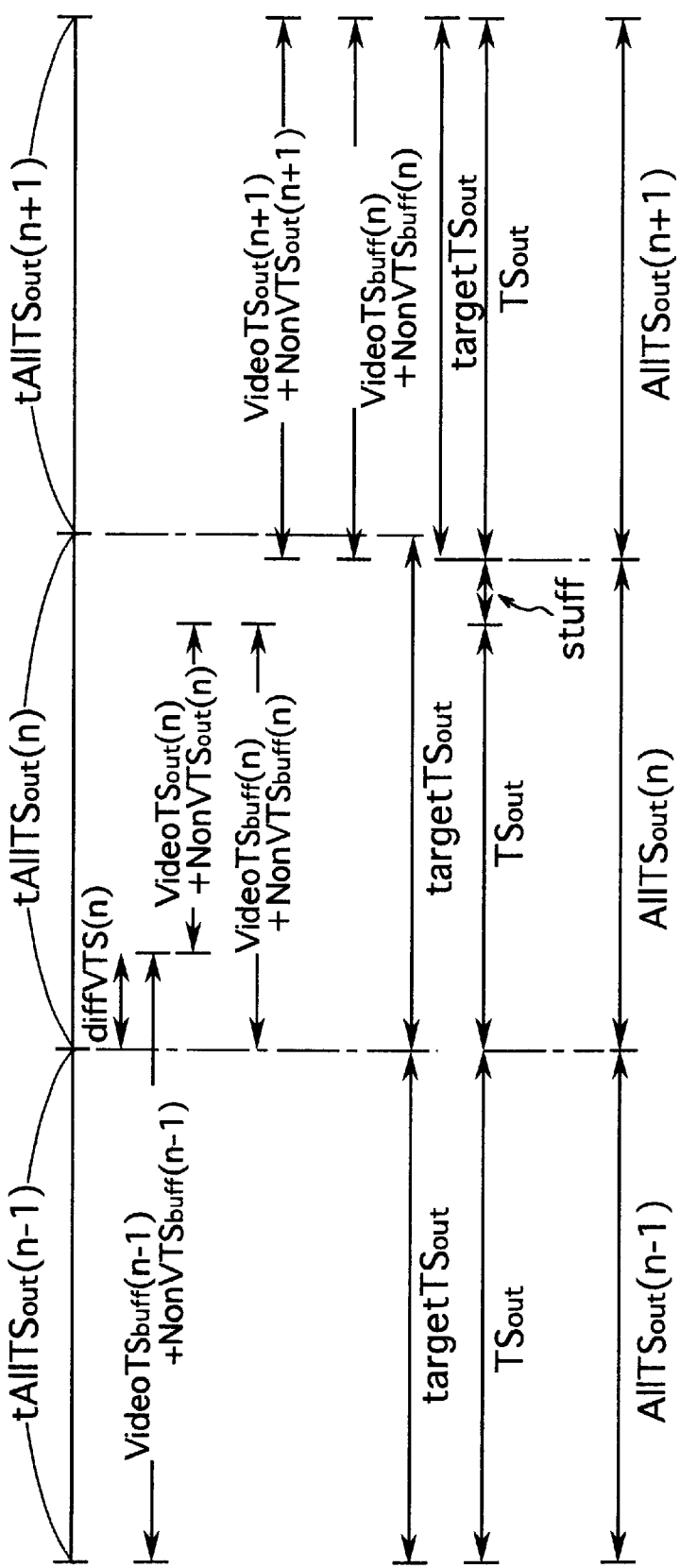
FIG. 9 is a diagram showing the transition of the number of TS packets outputted at time interval of the predetermined duration.

FIG. 9 shows transitions of the target number of TS packets to be outputted at time interval of the predetermined duration, i.e., target TS out with respect to diff V_TS_out (n). The video TS packet buffer 247 is adapted to store the video TS transcoded by the video transcoding unit 100. The non-reduction TS buffer 230 is adapted to store the non-reduction TS packets demultiplexed by the input MPEG-2 TS demultiplexer 210, and output the stored non-reduction TS packets to the output MPEG-2 TS multiplexer 220 in synchronous with the video TS packet buffer 247 in the video TS processor 240.

The video TS processor 240 is adapted to decode the video TS inputted by the input MPEG-2 TS demultiplexer 210 to reconstruct the video ES, transcode the video ES to generate the output video ES, which has information volume less than the video ES, to generate the output video TS, and output the output video TS thus generated to the output MPEG-2 TS multiplexer 220.

The constitutional elements of the video TS processor 240 will be described hereinlater.

The video TS packet decoder 241 is designed to decode the video TS inputted by the input MPEG-2 demultiplexer 210 to generate the video PES, and output the video PES thus generated to the video PES packet decoder 242. The video TS packet decoder 241 constitutes the video transport stream packet decoding unit.

The video PES packet decoder 242 is designed to decode the video PES received from the video TS packet decoder 241 to generate the video ES, and output the video ES thus generated to the video ES buffer 243. The video PES packet decoder 242 is adapted to detect a first sequence header upon starting the transcoding operation, and delete bit streams prior to the first sequence header if there are provided bit streams prior to the first sequence header.

The video PES packet decoder 242 is designed to output the video ES to the video ES buffer 243 in response upon receiving a signal indicative that the video ES buffer 243 is empty from the video transcoding unit 100 at time interval of the predetermined duration (n).

Furthermore, the video PES packet decoder 242 is designed to output PTS (i), DTS (i) and PTS_DTS_flag (i), which are synchronous information elements obtained at the time when the video PES is decoded, to the video PES packet generator 245. Here, i is a picture number starting from the first picture inputted at the time when the transcoding operation started. Thus decoded synchronous information elements, i.e., PTS (i), DTS (i) and PTS_DTS_flag (i) make it possible to match the synchronization information elements of pictures in the input MPEG-2 transport streams with those of the corresponding pictures in the output MPEG-2 transport streams, respectively. The video PES packet decoder 242 constitutes the video PES packet decoding unit.

The operation of the video PES packet generator 245 and the video TS packet generator 246 will be described hereinlater.

The video PES packet generator 245 is adapted to input and encode the PTS (i), DTS (i) and PTS_DTS-flag (i) and the video ES to generate the output video PES. The video PES packet generator 245 constitutes the video PES packet generating unit.

The video TS packet generator 246 is adapted to input the video PES and output the output video TS. The video TS packet generator 246 constitutes the video transport stream packet generating unit.

Figure 10:
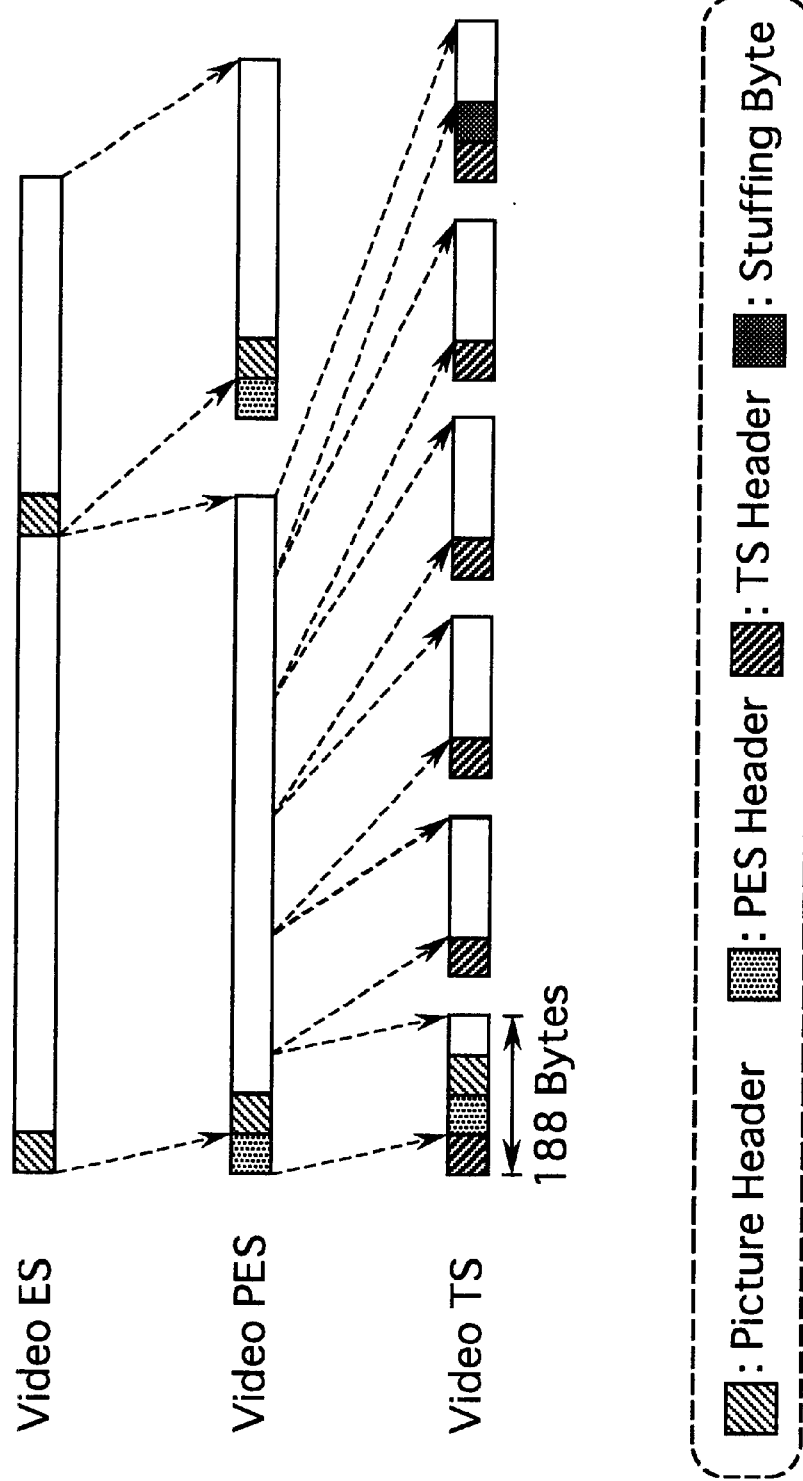
FIG. 10 is a block diagram showing constructions of the video PE, the video PES and the video TS.

Whenever video ES constituting one TS is generated by the video transcoding unit 100, the video PES packet generator 245 and the video TS packet generator 246 are collectively adapted to packetize the video ES to generate the video TS and store the video TS thus generated in the video TS packet buffer 247. FIG. 10 shows constructions of the video ES packet, the video PES packet and the video TS packet. As shown in FIG. 10, each of PES packets consists of one picture information element of the video ES packet.

The PTS (i), DTS (i) and PTS_DTS_flag (i) inputted from the video PES packet decoder 242 are attached to the PES header of the corresponding picture i as the synchronization information elements PTS, DTS, and PTS_DTS_flag so as to ensure that the bit streams which have been transcoded and thus compressed will be synchronized with the bit streams which have not been transcoded nor compressed.

The video TS packet decoder 241 constitutes the video elementary stream decoding unit, the video PES packet decoder 242, the video transcoding unit 100 and the video PES packet generator 245 collectively constitutes the video elementary stream transforming unit, and the video TS packet generator 246 constitutes the transformed first data srring generating unit.

The synchronous information elements, i.e., PTS and DTS are, however, time stamps to be firstly accessed in the PES packet. If a PES packet having two or more pictures of video frame is inputted, the second or later pictures of the video frame in the PES packet cannot have their own PTS and DTS.

The ARIB specification stipulates that one video PES should consist of video data elements of one frame. According to the ARIB specification, the PTS (i) and DTS (i) must be generated and attached to the aforesaid second or later pictures of the video frame in the PES packet. The PTS (i) and DTS (i) are computed in accordance with the equations as follows:

$$PTS(i)=PTS(i-1)+90000/FrameRate$$

$$DTS(i)=DTS(i-1)+90000/FrameRate$$

Provided that an inputted non-ARIB conformable MPEG-2 transport stream does not have to be outputted in the ARIB format, the output MPEG-2 transport stream may contain two frames in one PES.

Come back to FIG. 6, the video transcoding unit 100 is assumed to terminate the transcoding operation at time interval of the predetermined duration (n), and all the video TS packets contained in the video TS packet buffer 247 are outputted to the output MPEG-2 TS multiplexer 220 at the time when the number of bytes of the output video elementary stream generated at time interval of the predetermined duration (n), i.e., VES-out, satisfies the equation (43) as follows;

$$VES_{out} + \sum_{i=0}^{n-1} VideoES_{out}(i) \geq TH_{out}(n) \qquad \text{equation (43)}$$

where TH_out(n) is a reference threshold value of the transcoding operation and, here, an expected value of the total byte number of the video elementary streams outputted from the time interval of the predetermined duration (0) to the time interval of the predetermined duration (n). Beside the expected value of the total byte number of the video elementary streams outputted from the time interval of the predetermined duration (0) to the time interval of the predetermined duration (n), other values can be considered to be the reference threshold value, TH out(n), which will be described hereinlater. When the equation (43) is satisfied, VES_out is assumed to be Video_E S_out(n).

The video TS packet buffer 247 is adapted to store the video TS packets generated by the video TS packet generator 246, and output the video TS packets to the output MPEG-2 TS multiplexer 220 in synchronous with the non-reduction TS buffer 230, which stores the non-reduction TS packets.

VBR Video ES Rate Conversion Control Method:

The construction of the video transcoding unit 100 in the MPEG-2 TS transcoder 200 and the VBR video stream rate conversion algorithm will be described hereinlater.

Figure 11:
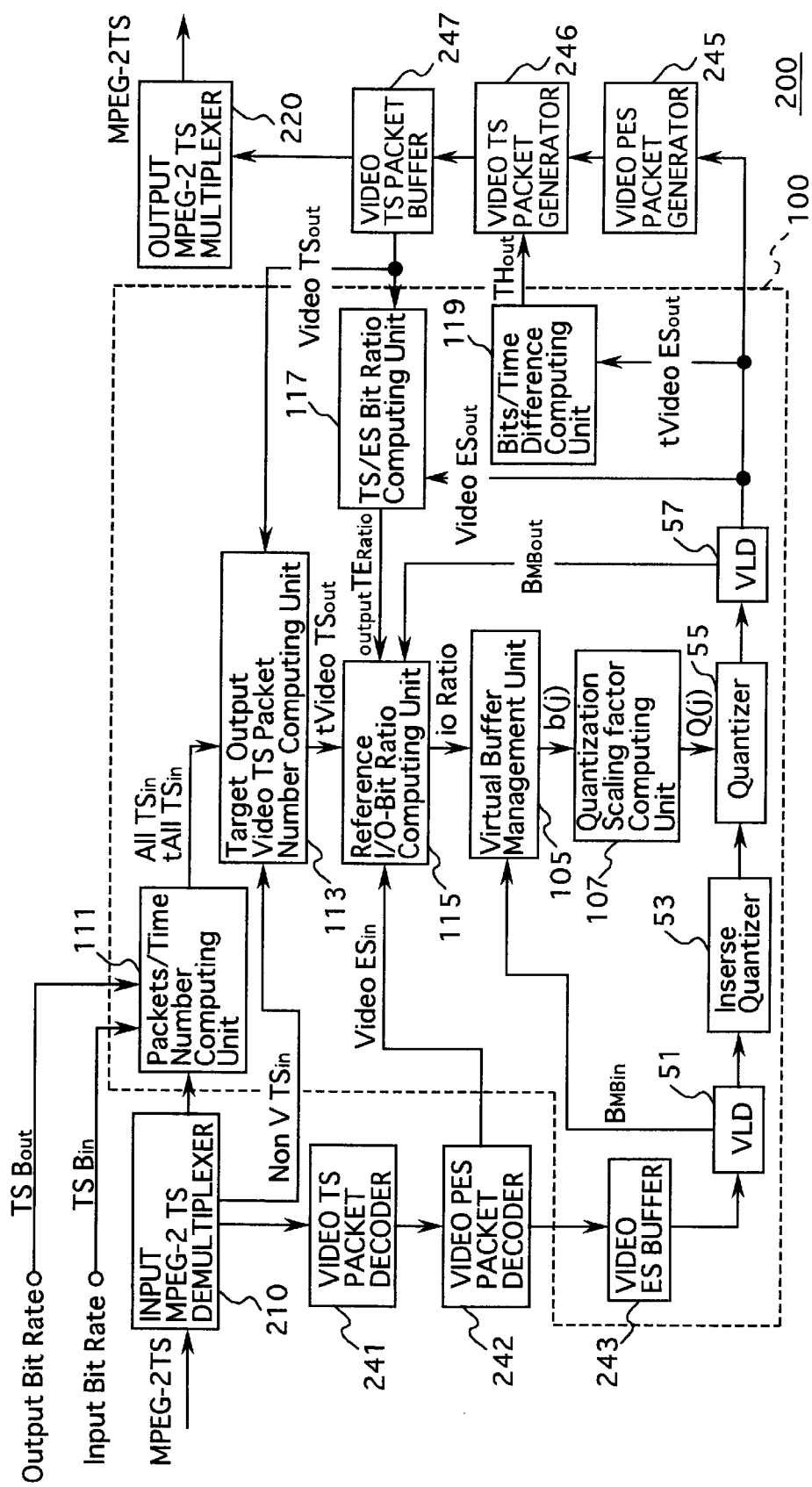
FIG. 11 is a schematic block diagram of a MPEG-2 TS transcoder used to describe the function and construction of a video transcoding unit.

FIG. 11 shows a schematic diagram of the MPEG-2 TS transcoder 200 used to describe the function and construction of the video transcoding unit 100. The constitutional elements enclosed by the broken line is the video transcoding unit 100 in FIG. 6.

The video transcoding unit 100 is as shown in FIG. 11 comprising a VLD (Variable Length Decoder) 51, an inverse quantizer 53, a quantizer 55, a VLC (Variable Length Encoder) 57, a virtual buffer management unit 105, a quantization scaling factor computing unit 107, a packets/time number computing unit 111, a target output video TS packet number computing unit 113, a reference I/O-bit ratio computing unit 115, a TS/ES bit ratio computing unit 117, a bits/time difference computing unit 119 and a video ES buffer 243.

The rate conversion method performed by the video transcoding unit 100 comprises the steps of:
(1) computing a reference ratio of outputting bits to inputting bits;
(2) computing a reference quantization scaling factor; and
(3) computing a quantization scaling factor in consideration of the re-quantization rate-distortion performance.

Step (1): Computing a Reference Ratio of Outputting Bits to Inputting Bits

The reference ratio of outputting bits to inputting bits at time interval of the predetermined duration (n), hereinlater referred to as "ioRatio(n)" is computed on the basis of the target number of outputting bits of the output video elementary streams to be outputted at time interval of the predetermined duration (n) and the number of real inputting bits of the video elementary streams actually inputted at time interval of the predetermined duration (n).

The number of real inputting bits of the video elementary streams inputted at time interval of the predetermined duration (n), hereinlater referred to as "Video_E S_in(n)", the number of the video TS packets inputted at time interval of the predetermined duration (n), hereinlater referred to as "Video_TS_in(n)", the number of non-reduction TS packets, hereinlater referred to as "NonV_TS_in(n)", the total number of the input MPEG-2 TS packets inputted at time interval of the predetermined duration (n), hereinlater referred to as "All_TS_in(n)", and the target number of the output video TS packets to be outputted at time interval of the predetermined duration (n), hereinlater referred to as "tVideo_T S_out(n)", the target number of the non-reduction TS packets to be outputted at time interval of the predetermined duration (n), hereinlater referred to as, tNonV_TS_out(n), the target number of the output MPEG-2 TS packets to be outputted at time interval of the predetermined duration (n), hereinlater referred to as "tAll_TS_out(n)", All_TS_in(n) and tAll_TS_out(n) are computed as follows:

$$AllTS_{in}(n) = \frac{TSB_{in} \times bf\_time \cdot (n+1)}{188 \times 8} - \sum_{i=0}^{n-1} AllTS_{in}(i) \quad \text{equation (44)}$$

$$tAllTS_{out}(n) = \frac{TSB_{out} \times bf\_time \cdot (n+1)}{188 \times 8} - \sum_{i=0}^{n-1} tAllTS_{out}(i) \quad \text{equation (45)}$$

where bf_time (n) is time interval of he predetermined time duration (n), TSBin and TSBout are input and output bit rates, respectively.

Accordingly, the initial value of All_TS_in and tAll_TS_out i.e., All_TS_Sin(O) and tAll_TS_out(O) are the first term of the right side in the equations (44) and (45), respectively.

All_TS_in(n) and tAll_TS_out(n) may not result in integers if calculated in accordance with only the first term of the right sides in the equations (44) and (45) with variables, i.e., TSBin and TSBout.

Substitute, for instance, 4 [Mbps], for TSBout and, substitute, for instance, 1 [second], for bf_time (n) in the equation (45) to calculate tAll_S_out(n);

4000000/(188×8)=2659.57

2659.57 is rounded down to 2659.

Thus, tAll_TS-out(n) results in 2659 [/second]

This means;

$$tAll\_TS\_out(n) \text{ is } 2659 \times 60 = 159540[/minute] \quad \text{(A)}$$

On the other hand, substitute 4 [Mbps] for TSBout and, substitute 1 [minute] for bf_time (n) in the equation (45) to calculate tAll_TS_out(n);

(4000000×60)/(188×8)=159574

Thus, $$tAll\_TS\_out(n) \text{ results in } 159574[/minute] \quad \text{(B)}$$

Subtract the result (A) from the result (B)

$$15974 - 159540 = 34 \quad \text{(C)}$$

This means that the target number of the TS packets to be outputted at time interval of 1 [second], i.e., tAll_TS_out (n) is computed in accordance with the first term of the right sides in the equation (45) alone, an error of 34 [packets/minute] results for every one minute. If the transcoder 200 is operated to transcode the MPEG-2 TS packets for a two-hour movie, the error of 34 [packets] increases to 2040 [packets/hour], which is critical for the operation. To eliminate such error, the equations (44) and (45) have the second terms in the right side, respectively.

Video_TS_in(n) and NonV_TS_in(n) can be obtained when the input TS packets are demultiplexed.

As described hereinbefore, newly generated PAT, PMT may be transmitted from the PAT, PMT generator 260 to the output MPEG-2 TS multiplexer 220 at time interval of the predetermined duration (n). tNonV_TS_out(n) can be calculated as follows:

$$tNonV\_TS\_out(n) = NonV\_TS\_in(n) + PATPMT\_out(n) \quad \text{equation (46)}$$

where PATPMT_out(n) has been described in the aforesaid equation (38).

The difference between the target number of the video TS packets and the number of real outputted video TS from the time interval of the predetermined duration (0) to the time interval of the predetermined duration (n−1), hereinlater referred to as "dVideo_TS(n)", tVideo_TS_out(n) is calculated as follows:

$$tVideo\_TS\_out(n) = tAll\_TS\_out(n) - tNonV\_TS\_out(n) + dVideo\_TS(n) \quad \text{equation (47)}$$

dVideo_TS(n) is calculated as follows:

$$dVideoTS(n) = \sum_{i=0}^{n-1} tVideoTS_{out}(i) - totalVideoTS_{out} \quad \text{equation (48)}$$

where the initial value of dVideo_TS, i.e., dVideo_TS (0)=0, tVideo_TS_out(i) is the number of TS packets actually generated at time interval of the predetermined duration (i), total_Video_TS_out is the total number of TS packets which have been generated by the video TS packet generator 246 until the time when the video ES buffer 243 consumes all the video elementary streams inputted from (0) to (n−1).

tVideo_TS_out(n) is computed in accordance with the equation (47) by a target output video TS packet number computing unit 113, which is shown in FIG. 1. The target output video TS packet number computing unit 113 constitutes the computing units (A) and (B). Here, tNonV_TS_out(n) serves as the value A, and dVideo_TS(n) serves as the value B, tVideo_TS_out(n) serves as the target number of outputting bits of the transformed first data string.

Accordingly, the reference ratio of outputting bits to inputting bits at time interval of the predetermined duration (n), i.e., ioRatio(n), is calculated as follows:

$$ioRatio(n) = \frac{\frac{tVideoTS_{out}(n) \times 188}{outputTERatio(n)}}{VideoES_{in}(n)} \qquad \text{equation (49)}$$

where output_TE_Ratio(n) is a bit ratio between the number of real outputting bits of the video elementary streams, i.e., the video ES packets, and the number of real outputting TS packets. ioRatio(n) is calculated in accordance with the equation (49) by the reference I/O-bit ratio computing unit 115, which is shown in FIG. 11. The reference I/O-bit ratio computing unit 115 constitutes the computing units (C), (E), (F), and (G).

Overhead is generated while the video PES packet generator 245 and the video TS packet generator 246 is operated to packetize the video elementary streams to generate the video transport streams from time interval of the predetermined duration (0) to time interval of the predetermined duration (n−1). It is difficult to calculate the exact overhead. Accordingly, tVideo_T S out(n) is divided by output_TE_Ratio(n) in the equation (49) to minimize the overhead.

Output_TE_Ratio(n) is calculated as follows:

$$outputTERatio(n) = \frac{\sum_{j=0}^{n-1} VideoTS_{out}(i) \times 188}{\sum_{i=0}^{n-1} VideoES_{out}(i)} \qquad \text{equation (50)}$$

output_TE_Ratio(n) is computed in accordance with the equation (50) by the reference I/O bit ratio computing unit, which is shown in FIG. 11. The reference I/O bit ratio computing unit constitutes the computing unit (F).

The initial value of output_TE_Ratio, i.e., output_TE_Ratio(0) cannot be calculated with the equation (50). output_TE_Ratio(0) is specified in the following manner. The transcoder starts transcoding the video bit streams with the sequence header. As described hereinbefore, the video PES packet decoder 242 is operated to detect the first sequence header upon transcoding the video bit streams and delete bit streams prior to the first sequence header if there are provided bit streams prior to the first sequence header. This means that the I-picture is firstly processed. If bf_time is small, the I-picture may not arrive at the video ES buffer 243. Provided that the I-picture does not arrive at the video ES buffer 243, the overhead thus resulted consists of the TS packet header (4 bytes) of each TS packet, the PES packet header of the head PES packet (9 bytes), the PTS (5 bytes) and the DTS (5 bytes). The overhead is calculated as follows:

$$outputTERatio(0) = \frac{tVideoTS_{out}(0) \times 188}{tVideoTS_{out}(0) \times 184 - 19} \qquad \text{equation (51)}$$

Otherwise, output_TE_Ratio(0) can be specified to be, for instance, 1.03 by experiments.

The target number of bits of the output video elementary stream, hereinlater referred to as "tVideo_ES_out(n)", is calculated as follows:

$$tVideoES_{out} = \frac{tVideoTS_{out}(n) \times 188}{outputTERatio(n)} \qquad \text{equation (52)}$$

tVideo_ES_out(n) is computed in accordance with the equation (42) by the reference I/O bit ratio computing unit, which is shown in FIG. 11. The reference I/O bit ratio computing unit constitutes the computing unit (F).

Threshold value, i.e., TH out(n) is calculated as follows:

$$TH_{out}(n) = tVideoES_{out}(n) + totalVideoES_{Out} \qquad \text{equation (53)}$$

where total_Video_ES_out is the total bit number of the video elementary streams which have been generated until the time when video elementary streams inputted at time interval of (n−1) into the video ES buffer 243 are consumed. TH_out (n) is substituted in the equation (43). TH_out(n) is calculated by the bits/time difference computing unit 119, which is shown in FIG. 11. The bits/time difference computing unit 119 constitutes the computing units (H) and (I), the judging unit (A) and the control unit.

As described hereinbefore, TH_out(n) is the reference threshold value of the transcoding operation and, here, the expected value of the total byte number of the video elementary streams outputted from the time interval of the predetermined duration (0) to the time interval of the predetermined duration (n). Beside the expected value of the total byte number of the video elementary streams outputted from the time interval of the predetermined duration (0) to the time interval of the predetermined duration (n), other values can be considered to be the reference threshold value, TH_out(n). As the reference threshold value of the transcoding operation, i.e., TH_out(n), following two values can be assumed.

Case (1):

Assume the time at which the video ES buffer 243 consumes all the input video elementary streams inputted at time interval of the predetermined duration (n) as the reference threshold value of the transcoding operation, i.e., TH out(n).

The drawback of the Case (1):

If the bit rate is not exactly controlled at time interval of the predetermined duration (n), an error between the target number of outputting video TS packets and the number of real outputting video TS packets at time interval of the predetermined duration (n) may increase.

Case (2):

Assume the time at which the target number of outputting video TS packets matches the number of real outputting video TS packets as the reference threshold value of the transcoding operation, i.e., TH-out(n).

The drawback of the Case (2):

If the bit ratio between the number of the video ES packets and the number of the video TS packets at time interval of the predetermined duration (n) is smaller than the bit ratio between the number of real outputting bits of the video ES packets and the number of real outputting TS packets, i.e., output_TE_Ratio(n) at time interval of the predetermined duration (n), part of the video ES packets may delay, and in such case time interval of the predetermined duration (n) elapses before the target number of the video ES packets are outputted.

The equation (53) has merits of being able to: (1) tolerate the error of the bit rate control; and (2) perform the time-base compensation.

Step (2): Computing a Reference Quantization Scaling Factor

Compute the quantization scaling factor required for transforming the video elementary streams to generate said output video elementary streams, on the basis of the reference ratio of outputting bits to inputting bits at time interval of the predetermined duration (n), i.e., ioRatio(n) calculated by the equation (49).

The quantization scaling factor is computed while MBs are sequentially encoded at time interval of the duration (n). The number of bits and the total number of bits are referred to as the "bit number" and the "total bit number", respectively.

The quantization scaling factor is computed through the steps of:
(a) computing the total bit number of MB inputted and decoded at time interval of the predetermined duration (n);
(b) computing the estimated total bit number of encoded MB, i.e., the estimated bit number of encoded MB to be stored in the virtual buffer, hereinlater referred to estimated "utilization volume" of the virtual buffer on the basis of the product of the total bit number of MB and ioRatio(n) calculated by the equation (49); and
(c) compute the quantization scaling factor in consideration of the difference between the estimated utilization volume of the virtual buffer and the total bit number of real outputting encoded MB, i.e., utilization volume of the output buffer.

Before transcoding a j-th MB at time interval of the predetermined duration (n), the utilization volume of the virtual buffer is computed as follows:

$$b(j) = b(0) + rc \times \sum_{k=1}^{j-1} \{B_{MBout(k)} - B_{MBin(k)} \times ioRatio(n)\} \quad \text{equation (54)}$$

where B_MB_out(k) is the bit number of k-th MB (k) in the output bit stream at time interval of the predetermined duration (n) and B_MB_in(k) is the bit number of k-th MB (k) in the input bit stream at time interval of the predetermined duration (n), rc is a delay control parameter.

The reference quantization scaling factor is computed as follows:

$$Q(j) = 31 \times b(j)/r \quad \text{equation (55)}$$

In the equation (54), b(O) is the initial utilization volume of the virtual buffer. The total number of MBs is hereinlater referred to as "MB_cnt". b(MB_cnt) at time interval of the predetermined duration (n) is substituted for b(O) of the virtual buffer at time interval of the predetermined duration (n+1). The reference quantization scaling factor is computed in accordance with the equation (55) by the reference I/O-bit ratio computing unit 115, which is shown in FIG. 11. The reference I/O-bit ratio computing unit 115 constitutes the computing unit (D).

In the equation (55), r is calculated as follows:

$$r = 2 \times tVideo\_ES\_out(n) \quad \text{equation (56)}$$

The initial value of the b(0), i.e., b(0) at time interval of the predetermined duration (0) is calculated as follows:

$$b(0) = (10 \times r)/31 \quad \text{equation (57)}$$

Step (3): Computing the Quantization Scaling Factor in Consideration of the Rate-distortion Performance The quantization scaling factor is calculated on the basis of the reference quantization scaling factor, i.e., Q(j), computed in the Step (2) in consideration of the re-quantization rate-distortion performance so as to minimize the quantization error. The quantization scaling factor for the j-th macroblock, hereinlater referred to as "mq(j)", is calculated in the following equations. Here, the detailed description of the equation is omitted.

In the Case of Intra-MB:

$$mq(j) = 2 \times mq_{in}(i) \times \left\lfloor \frac{Q(j) - 1}{2 \times mq_{in}(j)} \right\rfloor + 1 \quad \text{equation (58)}$$

In the Case of Inter-MB:

$$mq(j) = mq_{in}(j) \times \left\lfloor \frac{Q(j) - 1}{mq_{in}(j)} + \frac{1}{2} \right\rfloor - \left\lfloor \frac{mq_{in}(j)}{2} \right\rfloor + 1 \quad \text{equation (59)}$$

where the symbol of is intended to mean the rounding operation, and mq_in(j) is the quantization scaling factor computed for the decoded j-th macroblock (j) in the input bit stream.

In the case of mQ(j)<mq_in(j): mQ(j)=mq_in(j)

The equations (58) and (59) minimize the re-quantization rate-distortion performance occurred while the re-quantization and quantization operations.

The j-th macroblock (j) is quantized with the mQ(j) thus computed.

The utilization volumes of video and audio buffers when the output MPEG-2 TS transcoded by the transcoder is inputted to a T-STD (System Target Decoder: avirtual decoder model) will be described hereinlater.

Experimental Simulation Result (1)

The transitions of utilization volumes of the video and audio buffers in the T-STD for the output bit streams and the intput bit streams were measured under the condition that the input MPEG-2 bit stream of "stream A" was transcoded by the transcoder 200 with the target bit rate of 4 [Mbps], and inputted to the T-STD, and under the condition that the same input MPEG-2 bit stream was directly inputted to the T-STD without the transcoding operation, respectively. The both measurements were performed at time interval of the predetermined duration (n), i.e., bf_time[sec] is 0.02.

The buffer utilization volume was always updated through the steps of (1) through (5) as follows:
(1) compute the current time on the basis of the PCR, the input bit rate, and the bit number in the input bit stream;
(2) detect the PTS (or DTS) of the oldest frame in the buffer;
(3) judge if the current time is equal to the PTS (or DTS) of the oldest:
(4) eliminate the oldest frame if it is judged that the current time is equal to the PTS (DTS) of the frame. and
(5) compute the number of bits contained in the buffer.

Figure 12:
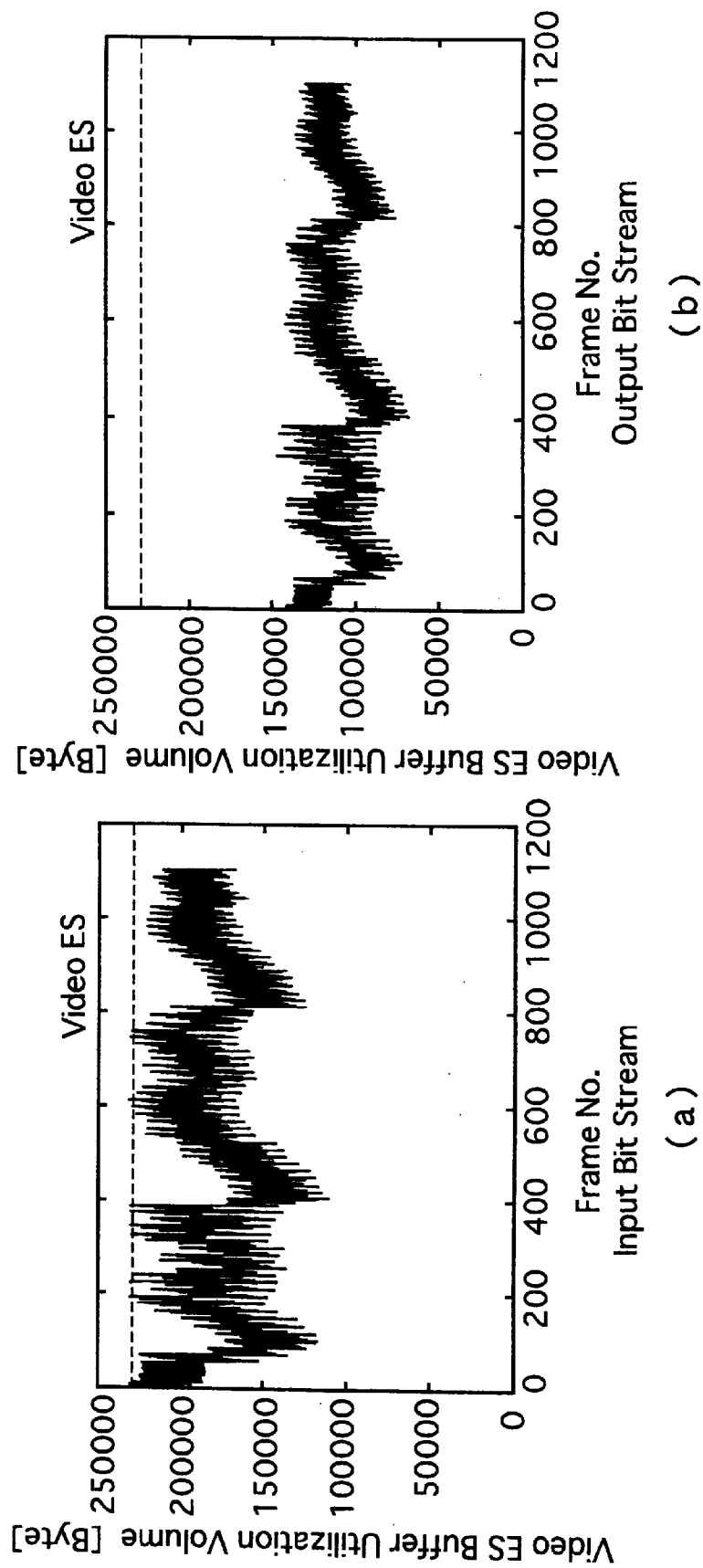
FIGS. 12(a) and 12(b) are a set of graphs respectively showing the transitions of the T-STD video elementary buffer utilization volume for input and output video ES.

FIG. 12 shows the transition of the T-STD video elementary buffer utilization volume. FIG. 12(a) shows the transition of the T-STD video elementary buffer utilization volume for the input bit streams and FIG. 12(b) shows the transition of the T-STD video elementary buffer utilization volume for the output bit streams.

The horizontal axis is intended to mean a frame number, i.e. frame No. in the order of the frame was decoded, and the vertical axis is intended to mean the utilization volume of the video elementary buffer. The dotted line is intended to mean the buffer size.

Figure 13:
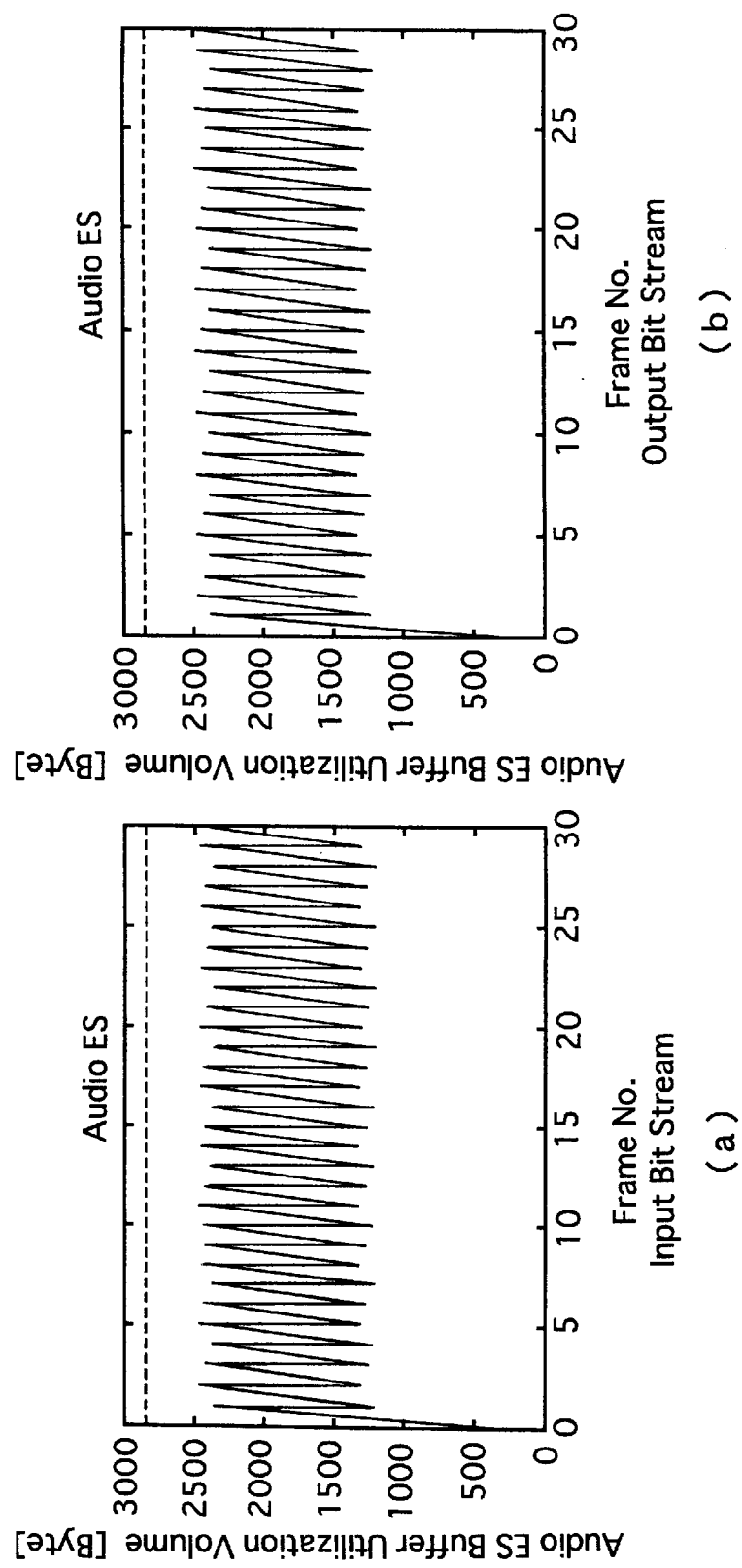
FIGS. 13(a) and 13(b) are a set of graphs respectively showing the transition of the utilization volume of the T-STD audio buffer for input and output audio ES.

FIG. 13 shows the transition of the utilization volume of the T-STD audio buffer. FIG. 13(a) shows the transition of the T-STD audio elementary buffer utilization volume for the input bit streams and FIG. 13(b) shows the transition of the T-STD audio elementary buffer utilization volume for the output bit streams.

The horizontal axis is intended to mean an audio frame number, i.e. audio frame No. in the order of the frame was decoded, and the vertical axis is intended to mean the utilization volume of the audio buffer. The dotted line is intended to mean the buffer size assigned to the audio elementary streams and PES packet header buffering. For the sake of clarity, the horizontal axis is in the range of frame No. 0 to frame No. 30 in FIG. 13 while it is in the range of frame No. to frame No. 1200.

As shown in FIG. 12, the transition of the T-STD video elementary buffer utilization volume for the output bit streams occurs in proportion to that of the T-STD video elementary buffer utilization volume for the input bit streams. This results from the fact that the bit number of one frame in the video ES contained in the input bit streams is proportional to that of the same frame in the video ES contained in the output bit streams.

As shown in FIG. 13, the transition of the T-STD audio elementary buffer utilization volume for the output bit streams occurs in proportion to that of the T-STD audio elementary buffer utilization volume for the input bit streams. This results from the fact that the bit streams constituting an audio frame contained in the bit streams arrive at the T-STD audio buffer at the same time at which bit streams constituting the same audio frame contained in the input bit streams are supposed to arrive at the T-STD audio buffer. This means that the output bit stream would not overflow the audio buffer unless the input bit stream does not overflow the audio buffer.

The foregoing Experimental simulation proves that the transcoder 200 is operated to successfully perform the demultiplexing operation on the basis of the synchronous information elements contained in the input MPEG-2 transport streams.

Experimental Simulation Result (2)

The transitions of utilization volumes of the video and audio buffers in the T-STD for the output bit streams and the intput bit streams were measured under the condition that the input MPEG-2 bit stream of "stream B" was transcoded by the transcoder 200 with the target bit rate of 4 [Mbps], and inputted to the T-STD, and under the condition that the same input MPEG-2 bit stream was directly inputted to the T-STD without the transcoding operation, respectively. The both measurements were performed at time interval of the predetermined duration (n), i.e., bf_time[sec] is 0.02.

Figure 14:
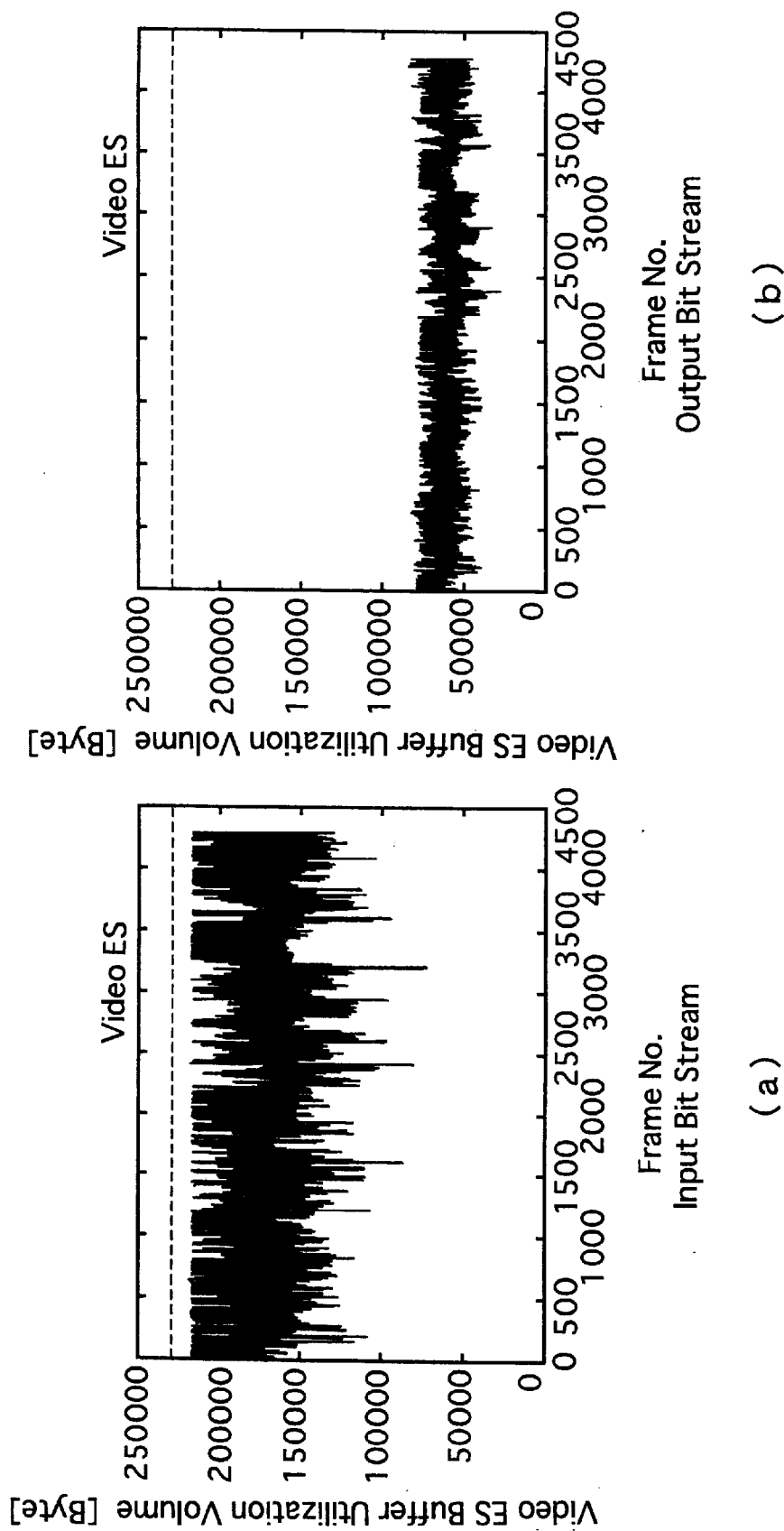
FIGS. 14(a) and 14(b) are a set of graphs respectively showing the transition of the T-STD video elementary buffer utilization volume for input and output video ES.

FIG. 14 is the transition of the T-STD video elementary buffer utilization volume. FIG. 14(a) shows the transition of the T-STD video elementary buffer utilization volume for the input bit streams and FIG. 12(b) shows the transition of the T-STD video elementary buffer utilization volume for the output bit streams. The meanings of the horizontal axis and vertical axis are same as those in FIG. 12.

Figure 15:
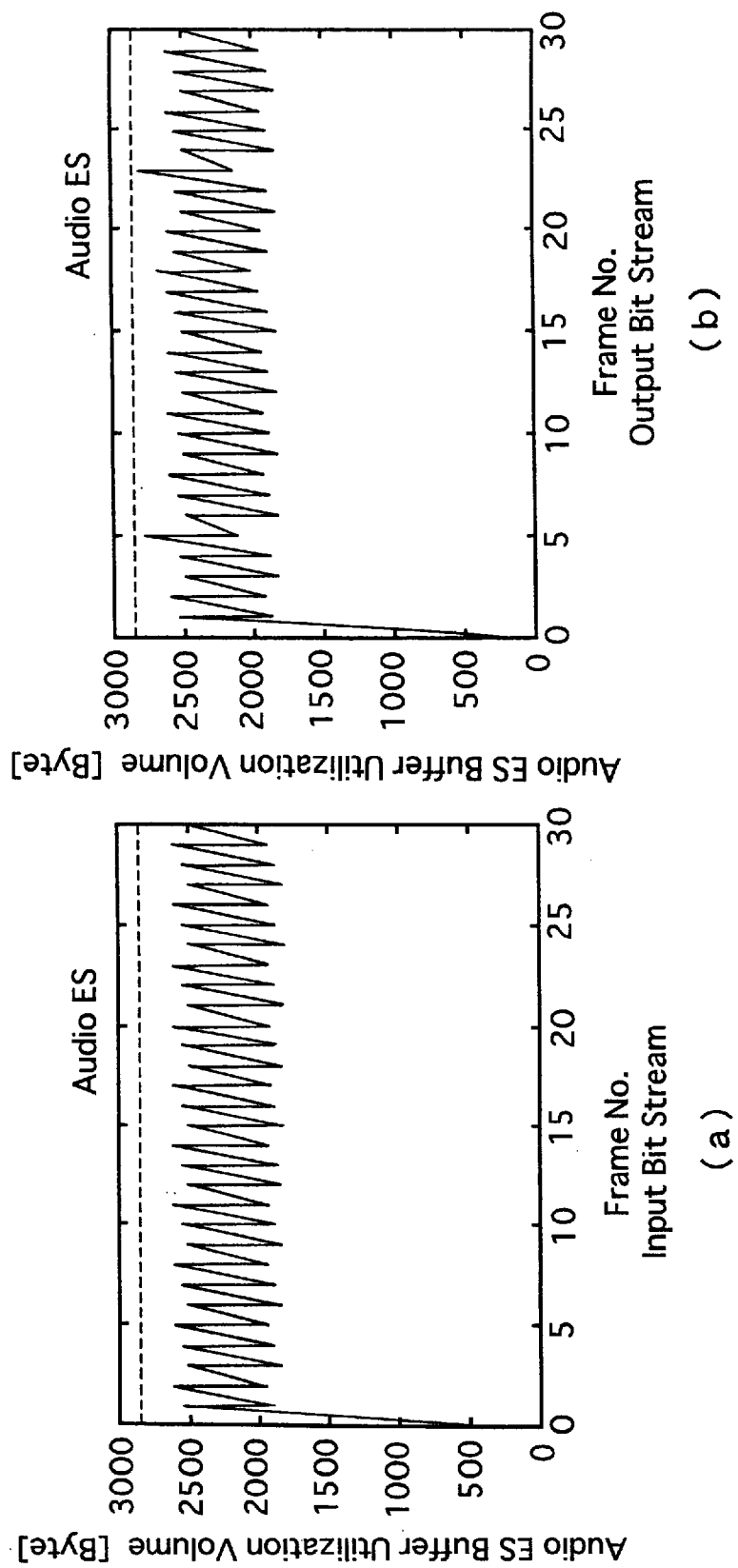
FIGS. 15(a) and 15(b) are a set of graphs respectively showing the transition of the utilization volume of the T-STD audio buffer for input and output audio ES.

FIG. 15 shows the transition of the utilization volume of the T-STD audio buffer. FIG. 15(a) shows the transition of the T-STD audio elementary buffer utilization volume for the input bit streams and FIG. 15(b) shows the transition of the T-STD audio elementary buffer utilization volume for the output bit streams. The meanings of the horizontal axis and vertical axis are same as those in FIG. 13.

As shown in FIG. 14, the transition of the T-STD video elementary buffer utilization volume for the output bit streams occurs in proportion to that of the T-STD video elementary buffer utilization volume for the input bit streams. This results from the fact that the bit number of one frame in the video ES contained in the input bit streams is proportional to that of the same frame in the video ES contained in the output bit streams.

As shown in FIG. 15, the transition of the T-STD audio elementary buffer utilization volume for the output bit streams occurs in proportion to that of the T-STD audio elementary buffer utilization volume for the input bit streams. FIG. 15(b), however, shows some audio frames having extremely high utilization volumes. The audio buffer may cause overflow with large audio frames contained in the input bit streams while the audio buffer do not overflow with those audio frames yet in this FIG. 15(b).

Figure 16:
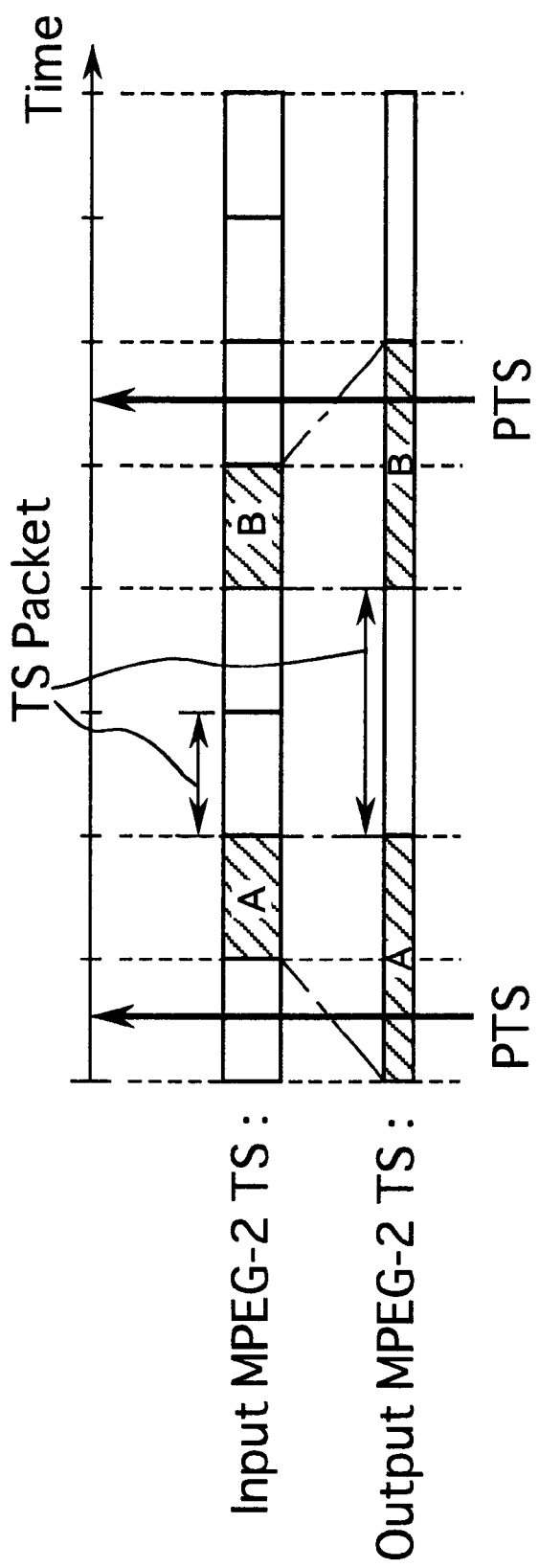
FIG. 16 is a diagram showing input and output MPEG-2 TS which may cause the buffer overflow.

FIG. 16 shows input and output MPEG-2 TS which may cause the buffer overflow. The horizontal axis is intended to mean the time axis. The input MPEG-2 TS packets and the output MPEG-2 TS packets are shown in the upper and lower sections, respectively. The output bit rate of the output MPEG-2 TS is reduced to the half of the input bit rate of the input MPEG-2 TS. The TS packets with sloped lines are intended to mean the audio TS packets.

The audio TS packets which may cause the buffer overflow are audio TS packets A and B in FIG. 16. The whole input audio TS packet A arrive at the audio buffer at the same time, i.e., t2 at which the whole output audio TS packet A arrives at the audio buffer. While on the contrary, the first byte of the output audio TS packet A arrives at the audio buffer at t0 earlier than t1 at which the input audio TS packet A arrives at the audio buffer. On the other hand, the first byte of the output audio TS packet B arrives at the audio buffer at the same time, i.e., t3 at which the first byte of the output TS packet B arrives at the audio buffer. While on the contrary, the whole input audio TS packet arrives at the audio buffer at t4 earlier than t5 at which the input audio TS packet A arrives at the audio buffer.

A seen from FIG. 16, although the audio buffer is full with bit streams before the first byte of the input audio TS packet A arrives at the audio buffer, the bit streams which contain the synchronous information element, i.e. PTS, are removed at time indicated by the PTS. This means that the whole input audio TS packet A arrives at the audio buffer after the bit streams which contain the PTS have been removed and, therefore, does not cause the buffer overflow. On the contrary, the first byte of the output audio TS packet A arrives at the audio buffer at t0 i.e., before the time indicated by PTS. This means that the whole output audio TS packet A arrives at the audio buffer before the bit streams which contain the PTS have not been removed and, therefore, may cause the buffer overflow.

In the case of the audio TS packet B, bit streams which contain the synchronous information element, i.e., PTS' are located posterior to the audio TS packet B. The whole input audio TS packet B arrives at the audio buffer at t4, prior to the time indicated by PTS' and will be decoded by the time indicated by PTS'. On the contrary, the whole output audio TS packet B does not arrive yet at the time indicated by PTS', but arrives at the audio buffer at t, posterior to the time indicated by PTS'. This means that some parts of the output audio TS packet B may remain not be decoded at the time indicated by PTS'. The phenomenon of the audio TS packet B is hereinlater referred to "underflow", and can take place more likely as the bit rate ratio of the target bit rate to the input bit rate increases.

In FIG. 15(b), some audio frames have extremely high utilization volumes. This results from the fact that the input bit stream B contains audio TS packets of the type such as the audio TS packet shown in FIG. B, which increase buffer utilization volumes.

In order to prevent the buffer overflow from taking place, there is provided a packet relocating method comprising the steps of:
(1) computing a difference by subtracting a value of lastly past presentation time management information element, i.e., last PTS, of the first coded signal, i.e., input MPEG-2 transport streams, from a value of a synchronous time information element, i.e., PCR_current_audio, located in a head position of a data string of the one or more second data strings, i.e., an audio TS packet demultiplexed by the output MPEG-2 TS packet demultiplexer;
(2) computing a difference between passing time of said data string of said one or more second data strings, i.e. an audio TS packet, in the input MPEG-2 transport streams and passing time of the audio TS packet in the output MPEG-2 transport streams;
(3) judging upon whether said difference computed in step (1) is smaller than said difference computed in the step (2); and
(4) locating the audio TS packet in a rearward position of a data string of said one or more first data strings, i.e. a video TS packet, to be located in a rearward position of the audio TS when it is judged that the difference computed in the step (1) is smaller than the difference computed in the step (2).

The difference between last_PTS and PCR_current_audio is compared with the difference between the passing time of the audio TS packet in the input MPEG-2 transport streams and the passing time of the audio TS packet in the output MPEG-2 transport streams in accordance with the equation as follows:

$$PCRcurrent\_audio-last\_PTS<audio\_th \qquad \text{equation (60)}$$

where audio_th is the difference between the passing time of the audio TS packet in the input MPEG-2 transport streams and the passing time of the audio TS packet in the output MPEG-2 transport streams and is computed as follows:

$$audio\_th = \frac{\left(\frac{TSB_{in}}{TSB_{out}}-1\right)\times 188 \times 8}{TSB_{in}} \times 27000000 \qquad \text{equation (61)}$$

On the other hand, in order to prevent the buffer underflow, there is provided a method comprising the steps of:
(1) computing a difference by subtracting a value of a synchronous time information element to be past subsequently in the input MPEG-2 transport streams, i.e., PCR_current_audio, from a value of a presentation time management information element of a just past audio TS packet in said second coded signal, i.e., next_PTS;
(2) computing a difference between passing time of said data string of said one or more second data strings, i.e. an audio TS packet, in the input MPEG-2 transport streams and passing time of the audio TS packet in the output MPEG-2 transport streams;
(3) judging upon whether the difference computed in the step (1) is smaller than the difference computed in the step (2); and
(4) locating the video TS packet in a forward position of a data string of said one or more first data strings, i.e. a video TS packet, to be located in a forward position of the audio TS packet when it is judged that the difference computed in the step (1) is smaller than the difference computed in the step (2).

The difference between PCR_current_audio and next_PTS is compared with the difference the passing time of the audio TS packet in the input MPEG-2 transport streams and the passing time of the audio TS packet in the output MPEG-2 transport streams in accordance with the equation as follows:

$$next\_PTS-PCR\_current\_audio<audio\_th \qquad \text{equation (62)}$$

where audio_th is computed with the equation (61).

PCRcurrent_audio serves as a value of a synchronous time information element PCR located in a head position, last_PTS serves as a value of lastly past presetntation time management information element PTS. PCRcurrent_audio−last_PTS is computed by the computing unit (J). next_PTS serves as a value of a presentation time management information element PTS of a just past data string, and PCR_current_audio serves as a synchronous time information element PCR to be past subsequently. next_PTS-PCR_current_audio is computed by the computing unit (L). audio_th is computed by the computing units (K) and (M). Computing units (J), (K), (L), and (M) are constituted by the bit/time difference computing unit 119. The Judging units (B) and (C), and locating unit (A) and (B) are constituted by the output MPEG-2 TS multiplexer 220.

Experimental Simulation Result (3)

The transitions of utilization volumes of the video and audio buffers in the T-STD for the output bit streams were measured under the condition that the input MPEG-2 bit stream of the stream B was transcoded by the transcoder 200 which implements the aforesaid packet relocating method, with the target bit rate of 4 [Mbps], and inputted to the T-STD.

Figure 17:
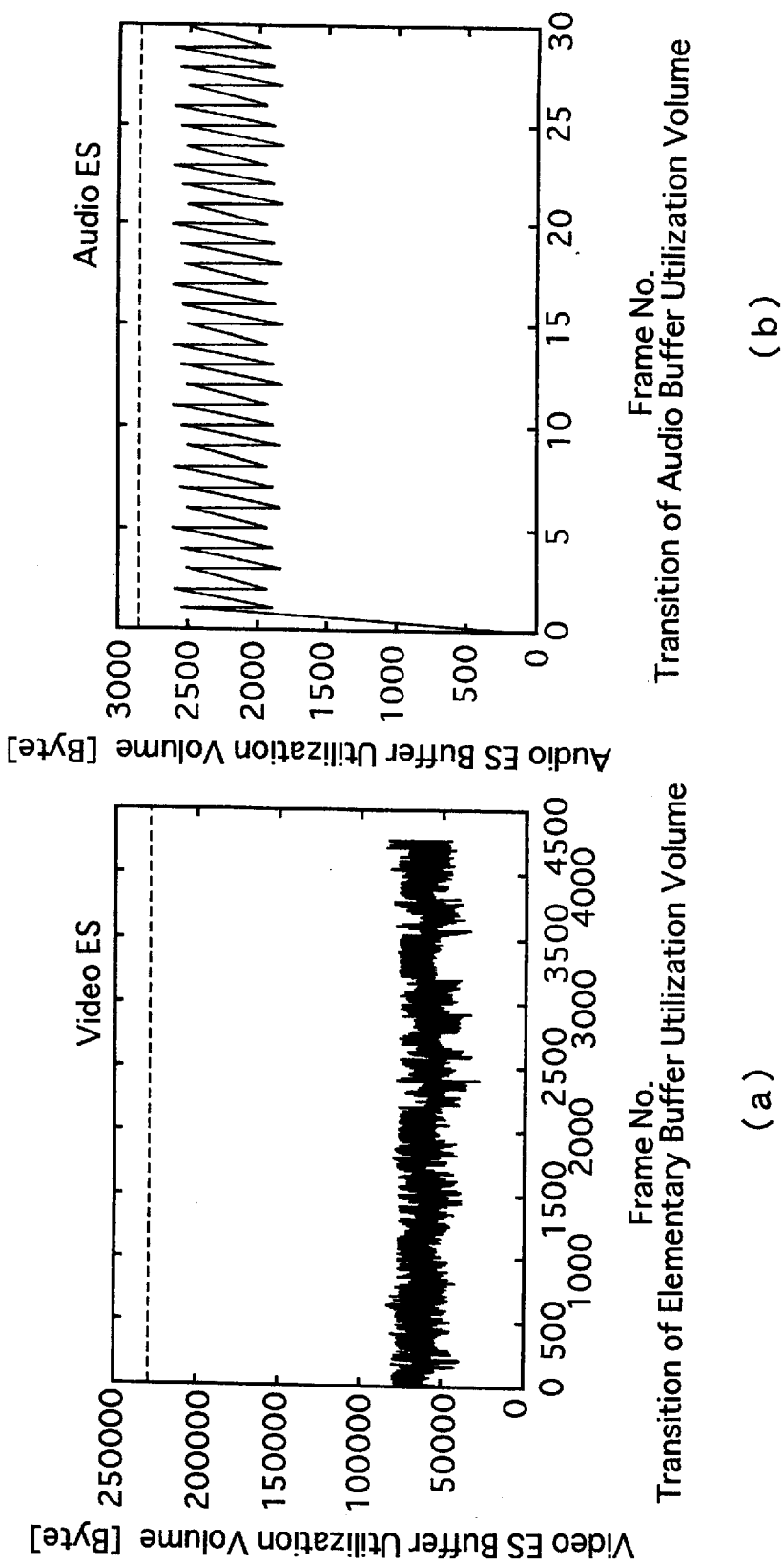
FIG. 17 is a set of graphs showing the transition of the utilization volume of the T-STD video buffer and the T-STD audio buffer.
Figure 18:
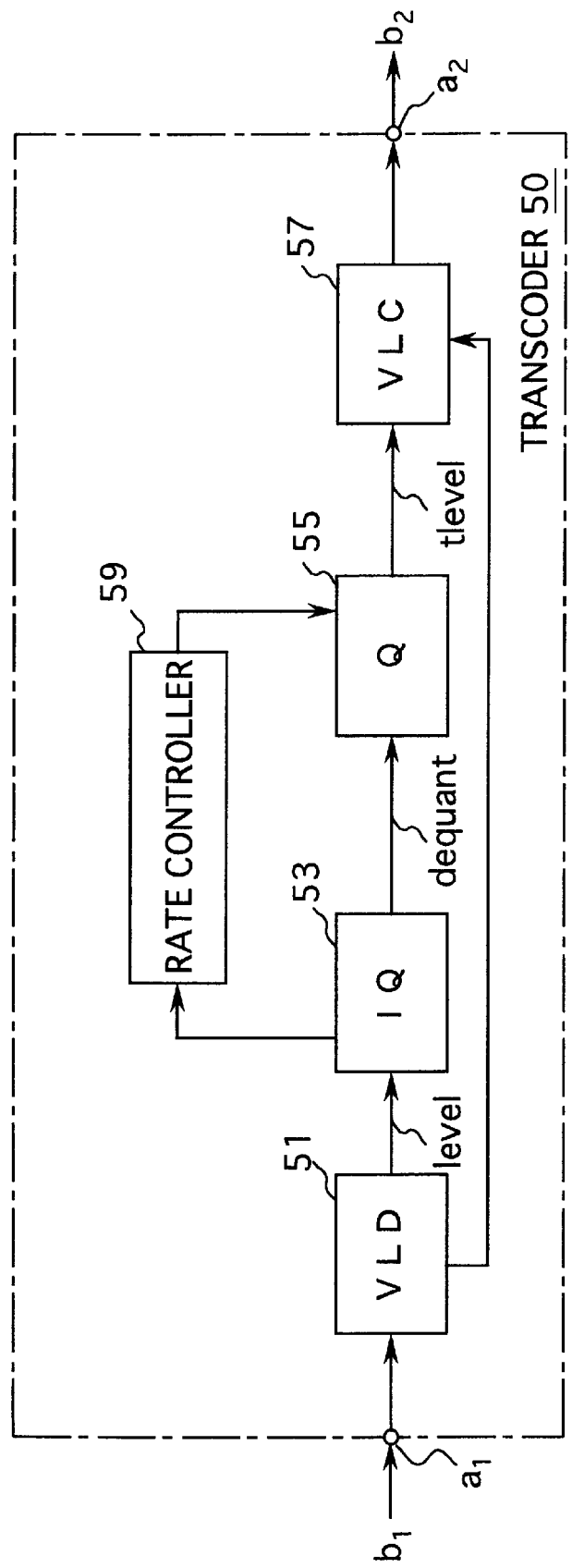
FIG. 18 is a schematic block diagram showing a conventional transcoder.
Figure 19:
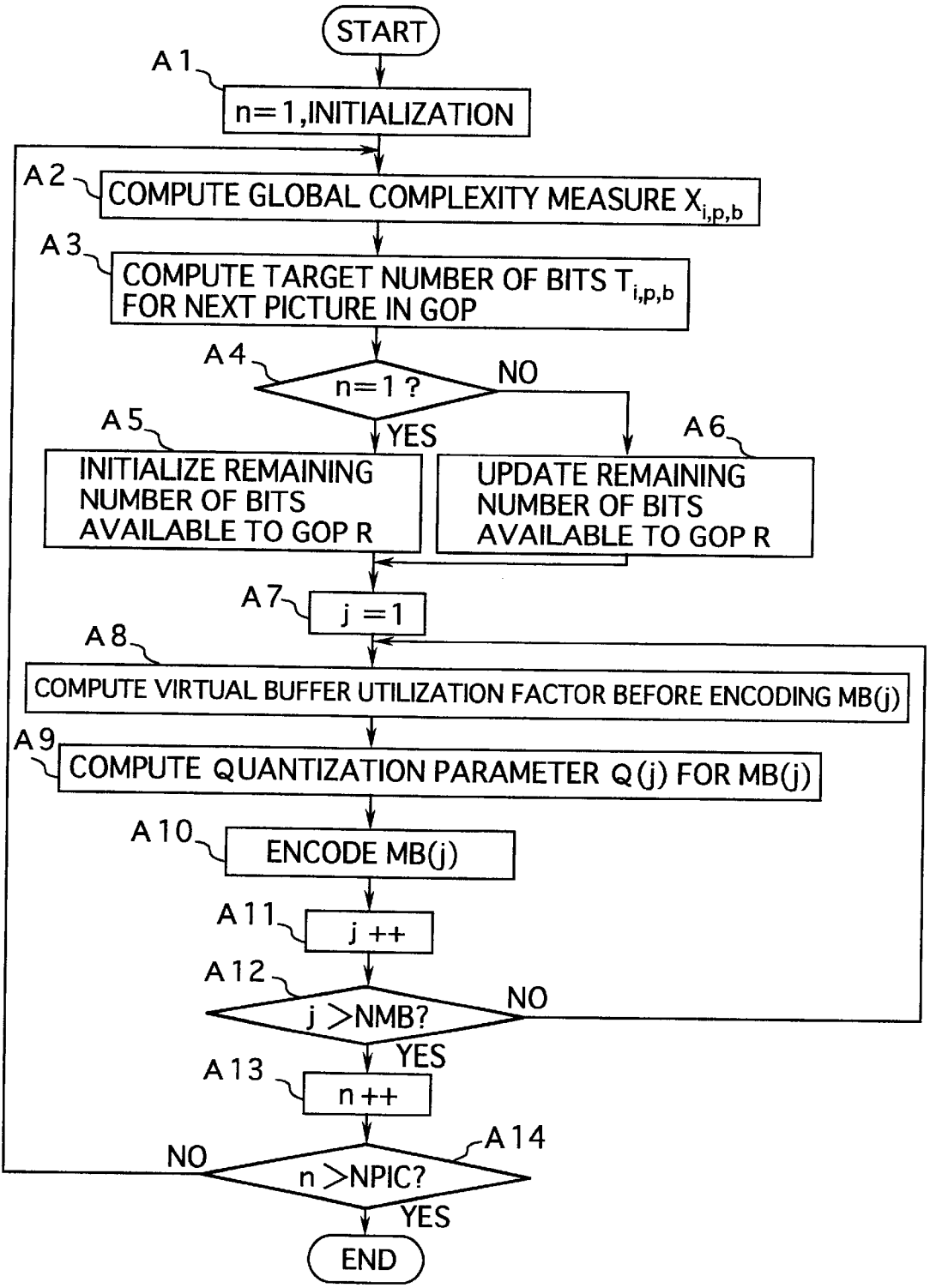
FIG. 19 is a flowchart showing the flow of the rate control operation of MPEG-2 performed by the conventional transcoder shown in FIG. 18.
Figure 20:
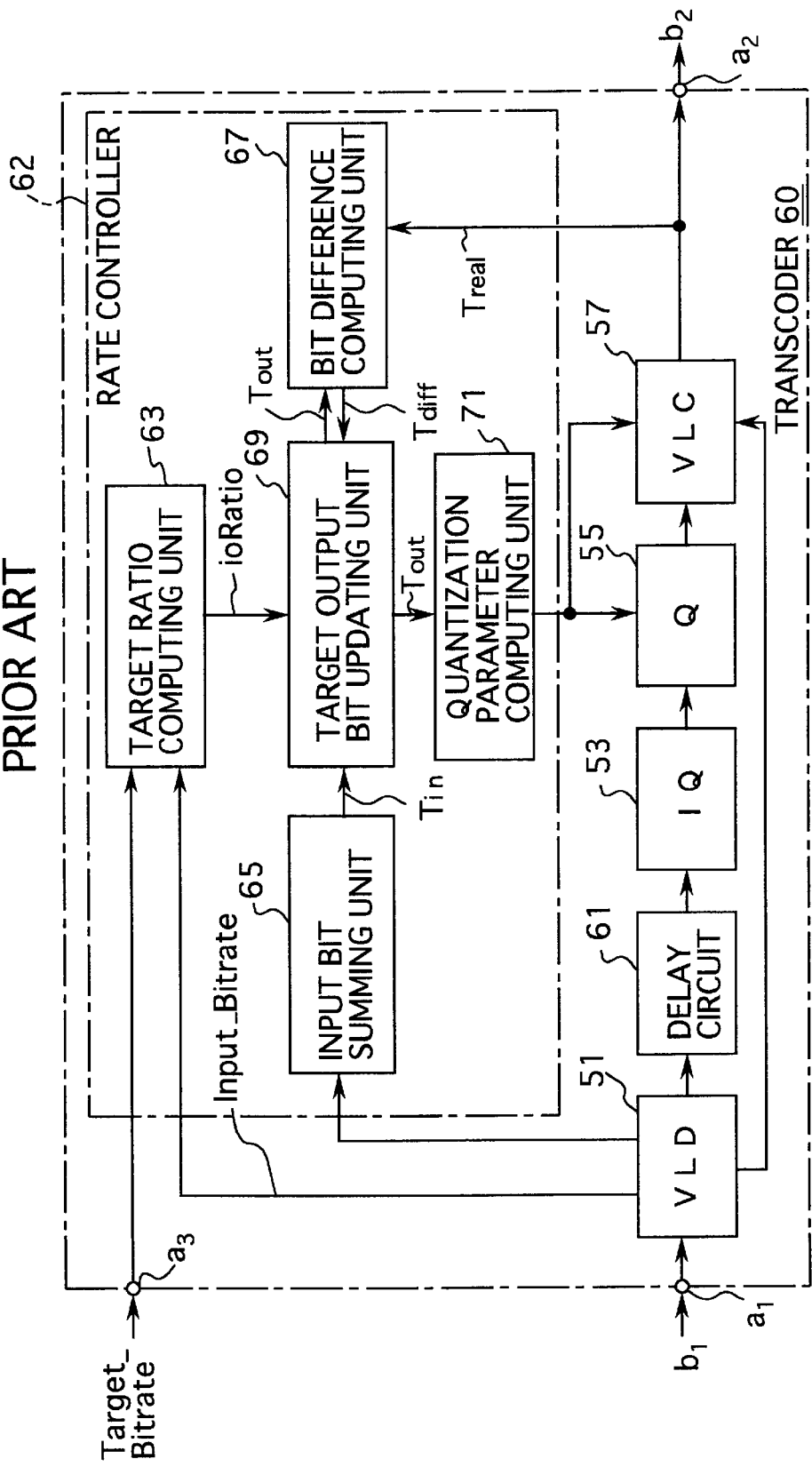
FIG. 20 is a schematic block diagram showing a conventional transcoder.
Figure 21:
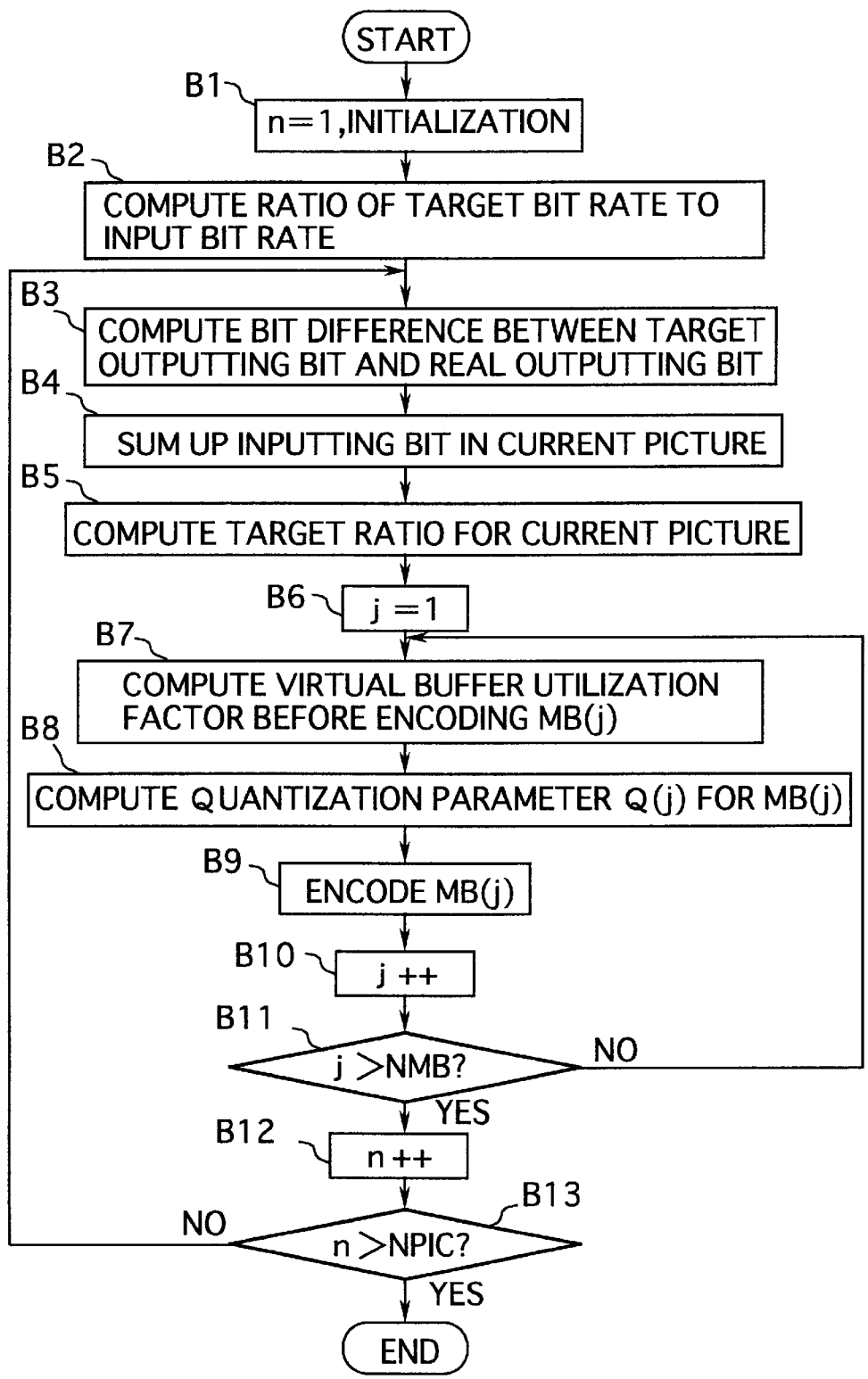
FIG. 21 is a flowchart showing the flow of the rate control operation of MPEG-2 performed by the conventional transcoder shown in FIG. 20.
Figure 22:
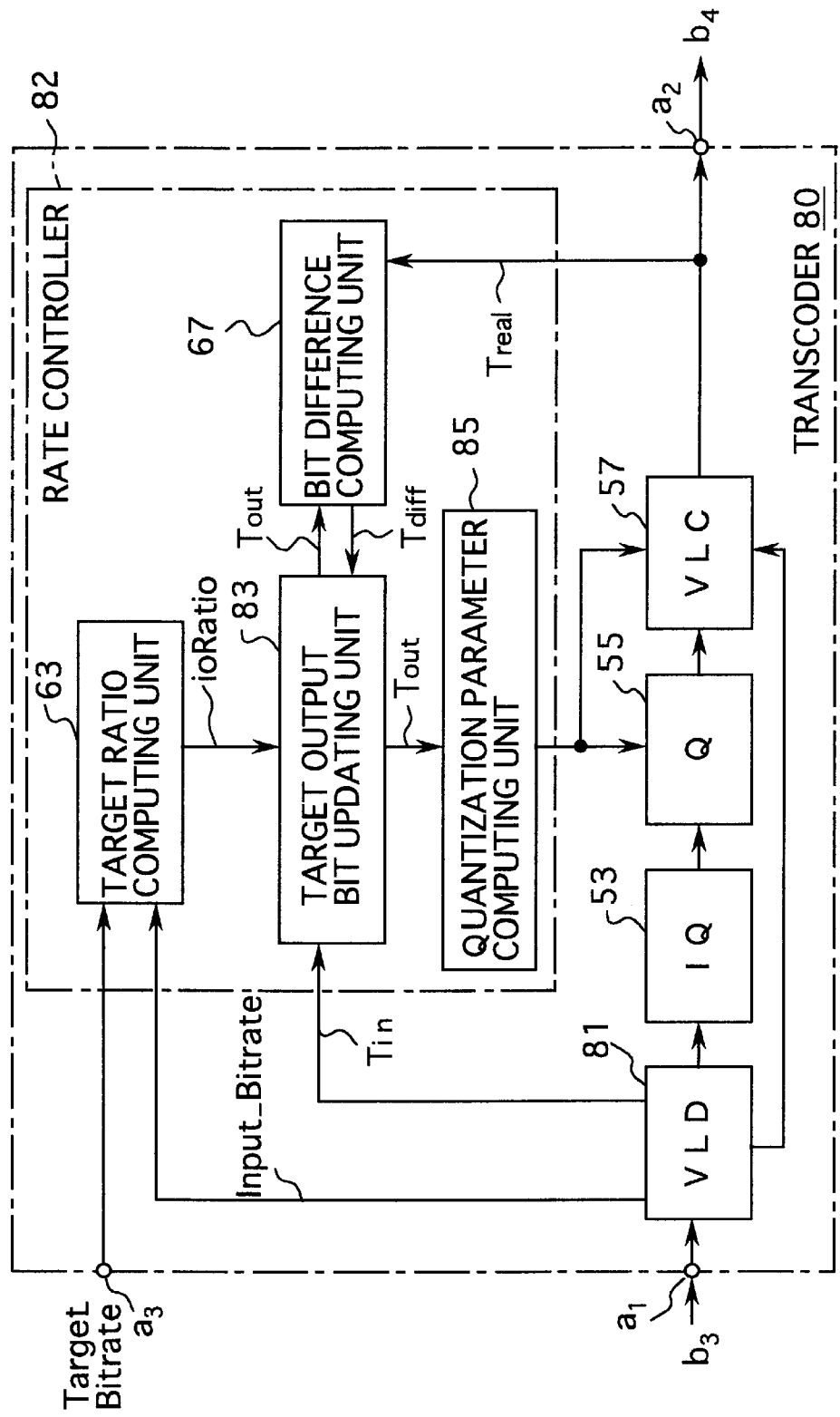
FIG. 22 is a schematic block diagram showing a conventional transcoder.
Figure 23:
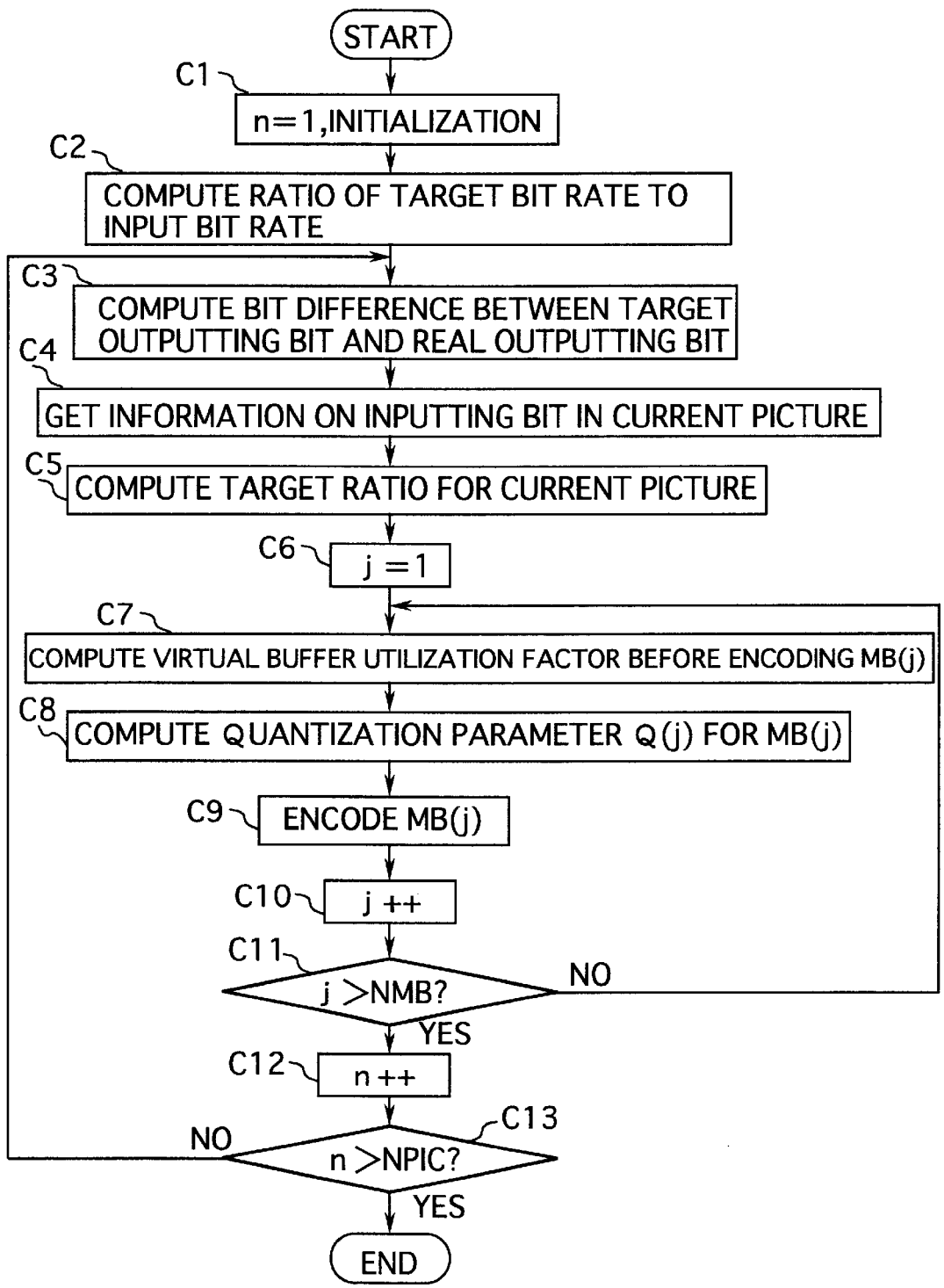
FIG. 23 is a flowchart showing the flow of the rate control operation of MPEG-2 performed by the conventional transcoder shown in FIG. 22.
Figure 24:
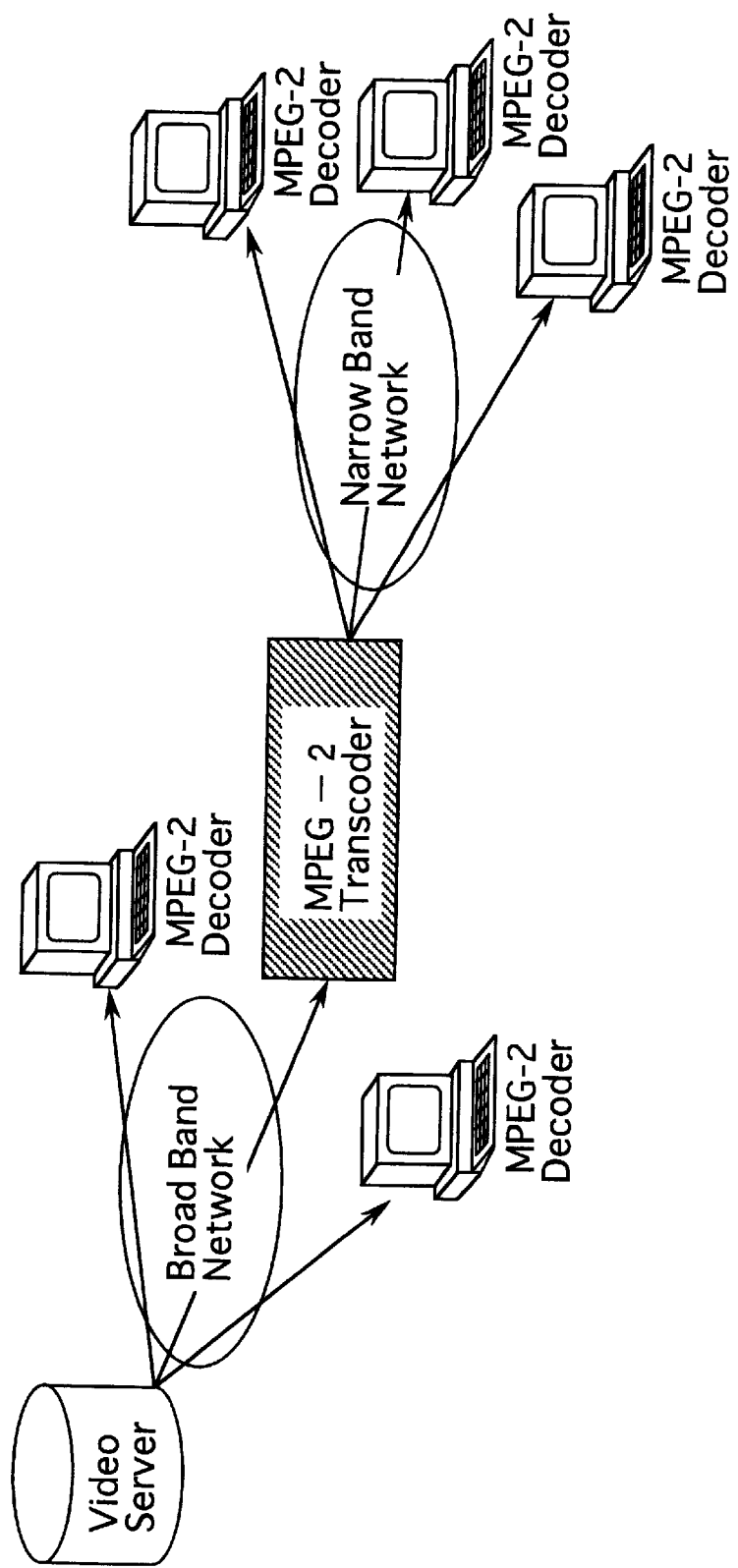
FIG. 24 is a diagram showing renderings of an environment in which the present invention is utilized.
Figure 25:
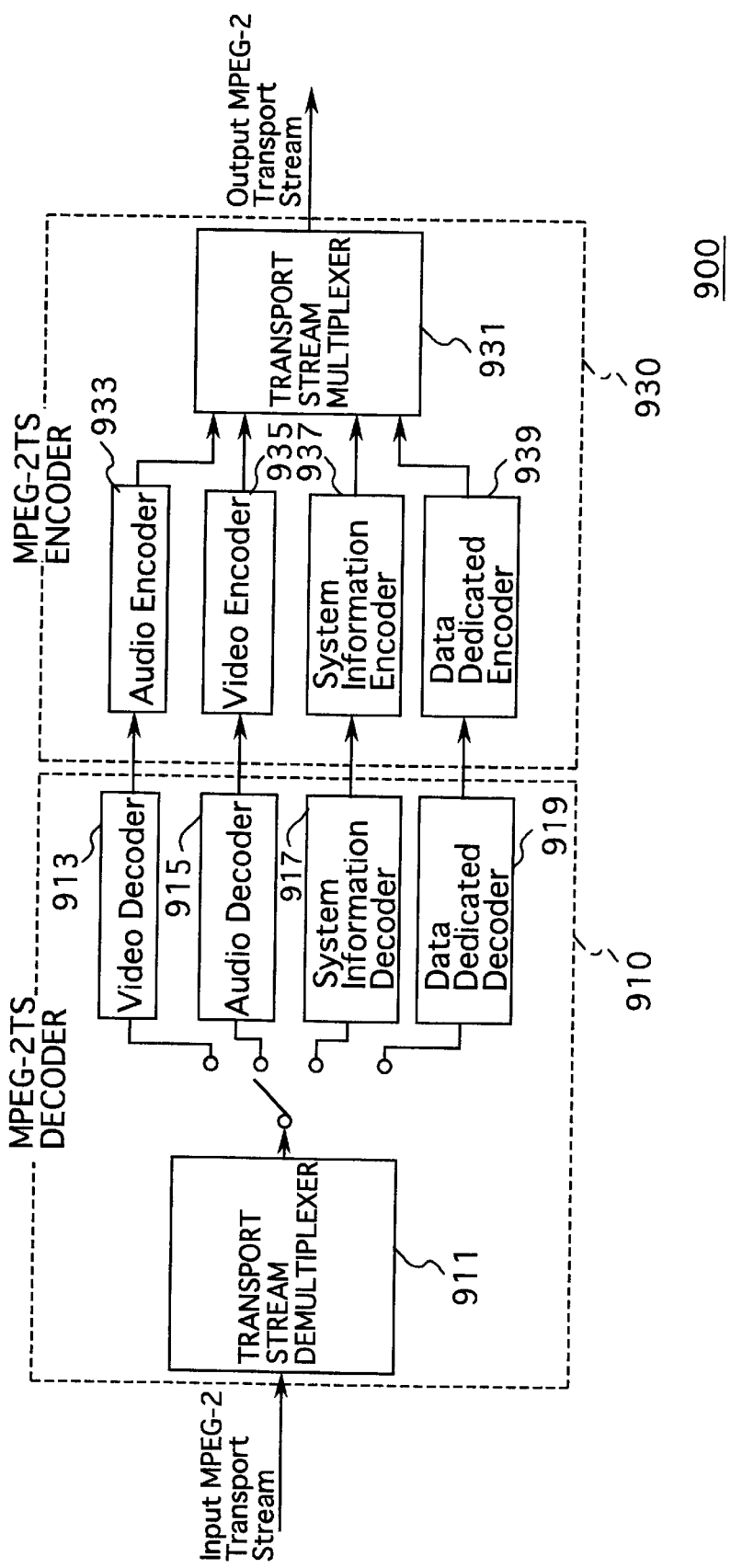
FIG. 25 is a schematic block diagram showing an apparatus of the simple combination of the MPEG-2 transport stream decoder and the MPEG-2 transport stream encoder.
Figure 26:
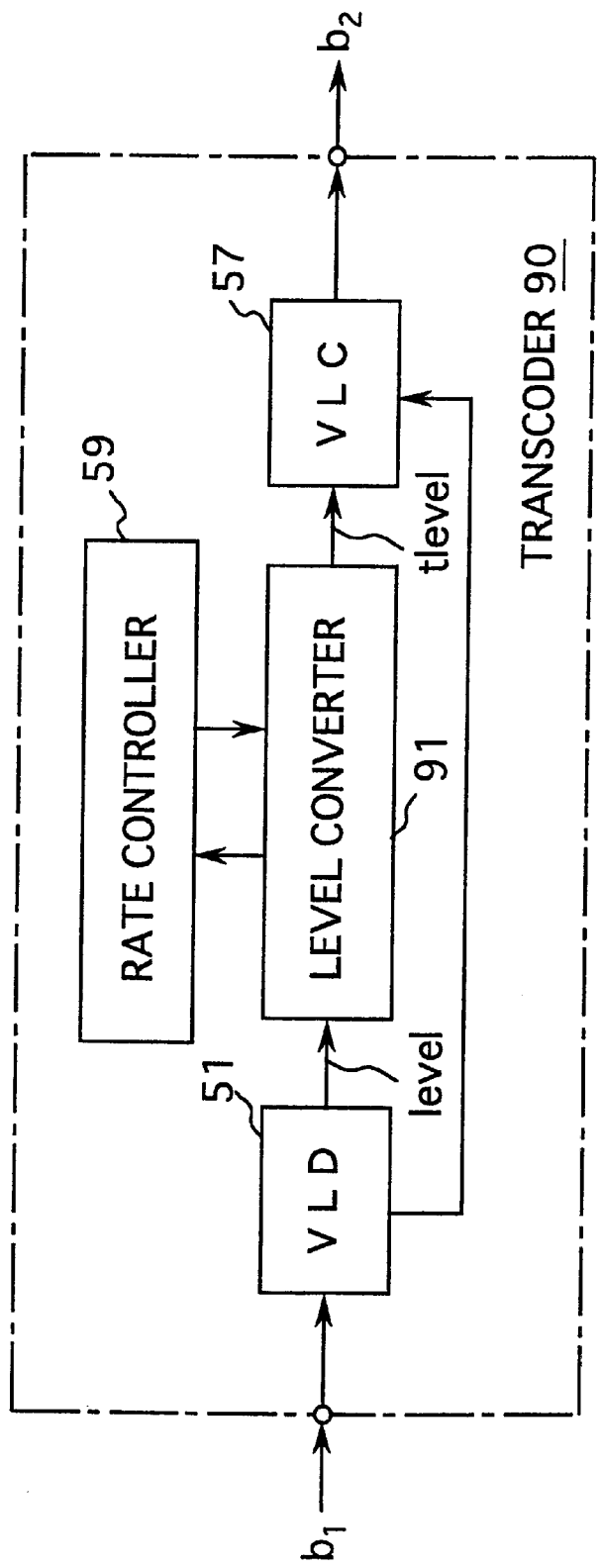
FIG. 26 is a schematic block diagram showing a conventional transcoder.

FIG. 17 shows the transition of the utilization volume of the T-STD video buffer and the T-STD audio buffer. FIG. 17(*a*) shows the transition of the T-STD video elementary buffer utilization and FIG. 17(*b*) shows the transition of the T-STD audio elementary buffer utilization volume.

As will be understood from FIG. 17(*b*) and FIG. 15, the audio frames having extremely high utilization volumes (shown in FIG. 15) are eliminated in FIG. 17(*b*). Furthermore, the transition of the T-STD video and audio elementary buffer utilization volume for the output bit streams occurs in proportion to that of the T-STD video and audio elementary buffer utilization volume for the input bit streams. Accordingly, the effectiveness of the packet relocating method is verified.

The present invention provide an apparatus, a method, and a computer program product for transcoding a coded multiplexed sound and moving picture sequence, which demultiplexs the first coded signal into one or more first data strings, one or more second data strings and one or more third data strings, and compresses only the one or more first data strings to generate one or more compressed first data strings, and multiplexes the one or more compressed first data strings, the one or more second data strings, and the one or more third data strings into the second coded signal, thereby making it possible to reduce the amount of the related operations, and the operation time.

The present invention provide an apparatus, a method, and a computer program product for transcoding a coded multiplexed sound and moving picture sequence, which is targeted for compressing only the video bit stream, which is regarded to have extremely large information volume in the MPEG-2 transport, thereby making it possible to effectively control the target bit rate.

The present invention provides an apparatus, a method, and a computer program product for transcoding a coded multiplexed sound and moving picture sequence, which sets the system clock indicative of the start time of the operation on the basis of the first reference time information element contained in the first coded signal, thereby making it possible to synchronize the system clock of the first coded signal with that of the second coded signal.

It will be apparent to those skilled in the art and it is contemplated that variations and/or changes in the embodiments illustrated and described herein may be without departure from the present invention. Accordingly, it is intended that the foregoing description is illustrative only, not limiting, and that the true spirit and scope of the present invention will be determined by the appended claims.

What is claimed is:

1. A method of transcoding a coded multiplexed sound and moving picture sequence, comprising the steps of:

(a) inputting a first coded signal through a first transmitting path at an input bit rate;

(b) demultiplexing said first coded signal inputted in said inputting step (a) into one or more first data strings, one or more second data strings, and one or more third data strings, said one or more first data strings each having a number of real inputting bits;

(c) transforming said one or more first data strings demultiplexed in said demultiplexing step (b) into one or more first data strings having a number of real outputting bits less than said number of real inputting bits of said one or more first data strings, respectively;

(d) multiplexing said one or more transformed first data strings transformed in said transforming step (c), said one or more second data strings demultiplexed in said demultiplexing step (b), and one or more corrected third data strings to generate a second coded signal;

(e) correcting said one or more third data strings demultiplexed in said demultiplexing step (b), on the basis of said first coded signal, in accordance with a change of said second coded signal to generate said one or more corrected third data strings having a number of real inputting bits when said one or more transformed first data strings, said one or more second data, and said one or more corrected third data strings are multiplexed in said multiplexing step (d); and (f) outputting said second coded signal through a second transmitting path at a target bit rate lower than said input bit rate of said first coded signal, wherein said inputting step (a) has the step of (a2) inputting MPEG-2 transport streams, said demultiplexing step (b) has the step of (b2) demultiplexing said MPEG-2 transport streams inputted in said inputting step (a2) into one or more transport stream rackets having a coded video signal having a number of real inputting bits as one or more first data strings, and said outputting step (f) has the step of (F2) outputting MPEG-2 transport streams having a video signal having a number of real outputting bits less than said number of real inputting bits of said coded video signal, wherein said demultiplexing step (b) has the step of (b71) demultiplexing MPEG-2 transport streams inputted at a predetermined time interval (n) in said inputting step (a) into said one or more first data strings, said one or more second data strings, and said one or more third data strings, each having a number of real inputting bits, and said transforming step (c) comprises the steps of:

(c71) decoding said one or more first data strings to reconstruct video elementary streams having a number of real inputting bits and other information elementary streams, and separating said video elementary streams from said other information elementary streams;

(c72) transforming said video elementary streams reconstructed and separated in said decoding step (c71) to generate output video elementary streams having a number of real outputting bits (Video ES out(n)) less than said number of real inputting bits of said video elementary streams (Video ES in(n)); and (c73) generating one or more transformed first data strings having a number of real outputting bits less than said number of real inputting bits of said one or more first data strings demultiplexed in said demultiplexing step (b71) on the basis of said output video elementary streams generated in said transforming step (c72) and said other information elementary streams (PAT, PMT) reconstructed and separated in said decoding step (c71), whereby said multiplexing step (d) has the step of (d71) multiplexing said one or more transformed first data strings generated in said generating step (c73), said one or more second data strings demultiplexed in said demultiplexing step (b71), and said one or more corrected third data strings corrected in said correcting step (e) to generate a second coded signal to be outputted at said predetermined time interval (n);

wherein said transforming step (c) comprises the steps of:

(c81) assuming that a number of real outputting bits of said one or more second data strings contained in said second coded signal at said predetermined time interval (n) is equal to a number of real inputting bits of said one or more second data strings (NonV_TS_in(n)) contained in said first coded signal at said predetermined time interval (n);

(c82) assuming that a number of real outputting bits of said one or more third data strings (PATPMT_out) contained in said second coded signal, at said predetermined time interval (n) is equal to said number of real inputting bits of said one or more corrected third data strings generated in said correcting step at said predetermined time interval (n) (e);

(c83) subtracting said number of real inputting bits of said one or more second data strings (NonV_TS_in(n)) contained in said first coded signal at said predetermined time interval (n) and said number of real outputting bits of said one or more third data strings (PATPMT_out) contained in said second coded signal at said predetermined time interval (n) from a target number of outputting bits of all data strings (tAll_TS_out(n)) contained in said second coded signal at said predetermined time interval (n) to generate a value A (tNon_TS_out(n));

(c84) subtracting a total number of real outputting bits of one or more transformed first data strings generated in said generating step (c73) prior to said predetermined time interval from a total target number of outputting bits of one or more transformed first data strings generated in said generating step (c73) prior to said predetermined time interval to generate a value B (dVideo_TS (n)); and (c85) computing a target number of outputting bits of said transformed first data strings (tVideo_TS_out(n)) generated at said predetermined time interval (n) in said generating step (c73) by adding said value A (tNon_TS_out(n)) and said value (dVideo_TS (n)).

2. The method as set forth in claim 1, which further comprises the steps of:

(g) computing a value of system clock (PCR) indicative of a start time of said demultiplexing step (b), on the basis of a first reference time information element (first_PCR) contained in said first coded signal; and (h) computing an initial value of said system clock (PCR_offset) for said second coded signal on the basis of said value of said system clock computed in said computing step (g).

3. The method as set forth in claim 1, wherein said transforming step (c) further comprises the steps of:

(c51) decoding said one or more transport stream packets having a coded video signal having a number of real inputting bits to reconstruct and output video PES packets;

(c52) decoding said video PES packets decoded in said decoding step (c51) to reconstruct and output video elementary streams having a real inputting bits, decoding time management information element DTS (DTS) and presentation time management information element PTS (PTS) of said video elementary streams, and PTS_DTS flags (PTS_DTS_flag) indicative of presence of said decoding time management information element DTS (DTS) and said presentation time management information element PTS (PTS);

(c53) transforming said video elementary streams decoded and outputted in said decoding step (c52) into video elementary streams having a number of real outputting bits less than said number of real inputting bits of said video elementary streams (Video ES in(n));

(c54) generating transformed video PES packets on the basis of said transformed video elementary stream transformed in said transforming step (c53), said decoding time management information element DTS (DTS), said presentation time management information element PTS (PTS) and said PTS_DTS flags (PTS_DTS_flag) indicative of presence of said decoding time management information element DTS (DTS) and said presentation time management information element PTS (PTS) decoded in said decoding step (c52); and (c55) encoding said transformed video PES packets generated in said generating step (c54) to generate a transformed video transport stream packets having a number of real outputting bits less than said number of real inputting bits of said video transport stream packets.

4. The method as set forth in claim 1, wherein said demultiplexing step (b) has the step of demultiplexing said first coded signal into transport stream packets having a coded audio signal as said one or more second data strings.

5. The method as set forth in claim 1, wherein said demultiplexing step (b) has the step of (b71) demultiplexing MPEG-2 transport streams inputted at a predetermined time interval (n) in said inputting step (a) into said one or more first data strings, said one or more second data strings, and said one or more third data strings, each having a number of real inputting bits, and said transforming step (c) comprises the steps of:

(c71) decoding said one or more first data strings to reconstruct video elementary streams having a number of real inputting bits and other information elementary streams, and separating said video elementary streams from said other information elementary streams;

(c72) transforming said video elementary streams reconstructed and separated in said decoding step (c71) to generate output video elementary streams having a number of real outputting bits (Video ES out(n)) less than said number of real inputting bits of said video elementary streams (Video ES in(n)); and (c73) generating one or more transformed first data strings having a number of real outputting bits less than said number of real inputting bits of said one or more first data strings demtiltiplexed in said demultiplexing step (b71) on the basis of said output video elementary streams generated in said transforming step (c72) and said other information elementary streams (PAT, PMT) reconstructed and separated in said decoding step (c71), whereby said multiplexing step (d) has the step of (d71) multiplexing said one or more transformed first data strings generated in said generating step (c73), said one or more second data strings demultiplexed in said demultiplexing step (b71), and said one or more corrected third data strings corrected in said correcting step (e) to generate a second coded signal to be outputted at said predetermined time interval (u).

6. A method of transcoding a coded multiplexed sound and moving picture sequence, comprising the steps of:

(a) inputting a first coded signal through a first transmitting path at an input bit rate;

(b) demultiplexing said first coded signal inputted in said inputting step (a) into one or more first data strings, one or more second data strings, and one or more third data strings, said one or more first data strings each having a number of real inputting bits;

(c) transforming said one or more first data strings demultiplexed in said demultiplexing step (b) into one or more first data strings having a number of real outputting bits less than said number of real inputting bits of said one or more first data strings, respectively;

(d) multiplexing said one or more transformed first data strings transformed in said transforming step (c), said one or more second data strings demultiplexed in said demultiplexing step (b), and one or more corrected third data strings to generate a second coded signal;

(e) correcting said one or more third data strings demultiplexed in said demultiplexing step (b), on the basis of said first coded signal, in accordance with a change of said second coded signal to generate said one or more corrected third data strings having a number of real inputting bits when said one or more transformed first data strings, said one or more second data, and said one or more corrected third data strings are multiplexed in said multiplexing step (d); and (f) outputting said second coded signal through a second transmitting path at a target bit rate lower than said input bit rate of said first coded signal, wherein said inputting step (a) has the step of (a2) inputting MPEG-2 transport streams, said demultiplexing step (b) has the step of (b2) demultiplexing said MPEG-2 transport streams inputted in said inputting step (a2) into one or more transport stream packets having a coded video signal having a number of real inputting bits as one or more first data strings, and said outputting step (f) has the step of (f2) outputting MPEG-2 transport streams having a video signal having a number of real outputting bits less than said number of real inputting bits of said coded video signal, wherein said demultiplexing step (b) has the step of (b71) demultiplexing MPEG-2 transport streams inputted at a predetermined time interval (n) in said inputting step (a) into said one or more first data strings, said one or more second data strings, and said one or more third data strings, each having a number of real inputting bits, and said transforming step (c) comprises the steps of:

(c71) decoding said one or more first data strings to reconstruct video elementary streams having a number of real inputting bits and other information elementary streams, and separating said video elementary streams from said other information elementary streams;

(c72) transforming said video elementary streams reconstructed and separated in said decoding step (c71) to generate output video elementary streams having a number of real outputting bits (Video ES out(n)) less than said number of real inputting bits of said video elementary streams (Video ES in(n)); and (c73) generating one or more transformed first data strings having a number of real outputting bits less than said number of real inputting bits of said one or more first data strings demultiplexed in said demultiplexing step (b71) on the basis of said output video elementary streams generated in said transforming step (c72) and said other information elementary streams (PAT, PMT) reconstructed and separated in said decoding step (c71), whereby said multiplexing step (d) has the step of (d71) multiplexing said one or more transformed first data strings generated in said generating step (c73), said one or more second data strings demultiplexed in said demultiplexing step (b71), and said one or more corrected third data strings corrected in said correcting step (e) to generate a second coded signal to be outputted at said predetermined time interval (n), wherein said transforming step (c72) comprises the steps of:

(c91) computing a target number of outputting bits of said output video elementary streams (tVideo TSout (n)) on the basis of outputting bits of said second coded signal able to be outputted at said predetermined time interval (n);

(c92) computing a reference ratio of outputting bits to inputting bits (ioRatio (n)) on the basis of said target number of outputting bits of said output video elementary streams (tVideo TSout (n)) computed in said computing step (c91) and said number of real inputting bits of said video elementary streams (Video ES in(n)) reconstructed in said decoding step (c71); and (c93) computing a quantization scaling factor (Q(j)) required for transforming said video elementary streams to generate said output video elementary streams, on the basis of said reference ratio of outputting bits to inputting bits (ioRatio (n)) computed in said computing step (c92).

7. The method as set forth in claim 6, wherein said computing step (c91) comprises the steps of:

(c101) computing a ratio of a total number of real outputting bits of said first one or more transformed data strings (outputTERatio (n)) generated in said generating step (c73) prior to said predetermined time interval to a total number of real outputting bits of said output video elementary streams (totalVideoESout) prior to said predetermined time interval; and (c102) computing a target number of outputting bits of said output video elementary streams (tVideo TSout (n)) at said predetermined time interval (n) on the basis of said ratio computed in said computing step (c101), and said computing step (c92) has the step of (c103) computing a reference ratio of outputting bits to inputting bits (ioRatio (n)) on the basis of said target number of outputting bits of said output video elementary streams (tVideo TSout (n)) computed in said computing step (c102) and said number of real inputting bits of said video elementary streams (Video ES in(n)) decoded in said decoding step (c71).

8. A method of transcoding a coded multiplexed sound and moving picture sequence, comprising the steps of:

(a) inputting a first coded signal through a first transmitting path at an input bit rate;

(b) demultiplexing said first coded signal inputted in said inputting step (a) into one or more first data strings, one or more second data strings, and one or more third data strings, said one or more first data strings each having a number of real inputting bits;

(c) transforming said one or more first data strings demultiplexed in said demultiplexing step (b) into one or more first data strings having a number of real outputting bits less than said number of real inputting bits of said one or more first data strings, respectively;

(d) multiplexing said one or more transformed first data strings transformed in said transforming step (c), said one or more second data strings demultiplexed in said demultiplexing step (b), and one or more corrected third data strings to generate a second coded signal;

(e) correcting said one or more third data strings demultiplexed in said demultiplexing step (b), on the basis of said first coded signal, in accordance with a change of said second coded signal to generate said one or more corrected third data strings having a number of real inputting bits when said one or more transformed first data strings, said one or more second data, and said one or more corrected third data strings are multiplexed in said multiplexing step (d); and (f) outputting said second coded signal through a second transmitting path at a target bit rate lower than said input bit rate of said first coded signal, wherein said inputting step (a) has the step of (a2) inputting MPEG-2 transport streams, said demultiplexing step (b) has the step of (b2) demultiplexing said MPEG-2 transport streams inputted in said inputting step (a2) into one or more transport stream packets having a coded video signal having a number of real inputting bits as one or more first data strings, and said outputting step (f) has the step of (f2) outputting MPEG-2 transport streams having a video signal having a number of real outputting bits less than said number of real inputting bits of said coded video signal, wherein said demultiplexing step (b) has the step of (b71) demultiplexing MPEG-2 transport streams inputted at a predetermined time interval (n) in said inputting step (a) into said one or more first data strings, said one or more second data strings, and said one or more third data strings, each having a number of real inputting bits, and said transforming step (c) comprises the steps of:

(c71) decoding said one or more first data strings to reconstruct video elementary streams having a number of real inputting bits and other information elementary streams, and separating said video elementary streams from said other information elementary streams;

(c72) transforming said video elementary streams reconstructed and separated in said decoding step (c71) to generate output video elementary streams having a number of real outputting bits (Video ES out(n)) less than said number of real inputting bits of said video elementary streams (Video ES in(n)); and (c73) generating one or more transformed first data strings having a number of real outputting bits less than said number of real inputting bits of said one or more first data strings demultiplexed in said demultiplexing step (b71) on the basis of said output video elementary streams generated in said transforming step (c72) and said other information elementary streams (PAT, PMT) reconstructed and separated in said decoding step (c71), whereby said multiplexing step (d) has the step of (d71) multiplexing said one or more transformed first data strings generated in said generating step (c73), said one or more second data strings demultiplexed in said demultiplexing step (b71), and said one or more corrected third data strings corrected in said correcting step (e) to generate a second coded signal to be outputted at said predetermined time interval (n), wherein said transforming step (c) comprises the steps of:

(c1101) computing a total number of real outputting bits of said output video elementary streams (totalVideoESout') generated in said transforming step (C72);

(c1102) computing a sum (THout(n)) of a target number of outputting bits of said output video elementary streams (tVideo TSout (n)) at said predetermined time interval (n) and a total number of real outputting bits of said output video elementary streams (totalVideoESout) which have been generated until the time when video elementary streams inputted prior to said predetermined time interval into a video ES buffer are consumed;

(c1103) judging upon whether said total number of real outputting bits of said output video elementary streams (totalVideoESout') computed in said computing step (c1011) is greater than said sum (THout(n)) computed in said computing step (c1102); and (c1104) terminating said transforming step (c) and starting said multiplexing step (d) for processing said one or more transformed first data strings when it is judged that said total number of real outputting bits (totalVideoESout') is greater than said sum (THout(n)) in said judging step (c1103).

9. A method of transcoding a coded multiplexed sound and moving picture sequence, comprising the steps of:

(a) inputting a first coded signal through a first transmitting path at an input bit rate;

(b) demultiplexing said first coded signal inputted in said inputting step (a) into one or more first data strings, one or more second data strings, and one or more third data strings, said one or more first data strings each having a number of real inputting bits;

(c) transforming said one or more first data strings demultiplexed in said demultiplexing step (b) into one or more first data strings having a number of real outputting bits less than said number of real inputting bits of said one or more first data strings, respectively;

(d) multiplexing said one or more transformed first data strings transformed in said transforming step (c), said one or more second data strings demultiplexed in said demultiplexing step (b), and one or more corrected third data strings to generate a second coded signal;

(e) correcting said one or more third data strings demultiplexed in said demultiplexing step (b), on the basis of said first coded signal, in accordance with a change of said second coded signal to generate said one or more corrected third data strings having a number of real inputting bits when said one or more transformed first data strings, said one or more second data, and said one or more corrected third data strings are multiplexed in said multiplexing step (d); and (f) outputting said second coded signal through a second transmitting path at a target bit rate lower than said input bit rate of said first coded signal, wherein said inputting step (a) has the step of (a2) inputting MPEG-2 transport streams, said demultiplexing step (b) has the step of (b2) demultiplexing said MPEG-2 transport streams inputted in said inputting step (a2) into one or more transport stream packets having a coded video signal having a number of real inputting bits as one or more first data strings, and said outputting sten (f) has the step of (f2) outputting MPEG-2 transport streams having a video signal having a number of real outputting bits less than said number of real inputting bits of said coded video signal, wherein said multiplexing step (d) comprises the steps of:

(d1201) computing a difference by subtracting a value of lastly past presentation time management information element PTS (last_PTS) of said first coded signal from a value of a synchronous time information element PCR (PCRcurrentaudio) located in a head position of a data string of said one or more second data strings;

(d1202) computing a difference (audio_th) between passing time of said data string of said one or more second data strings in said first coded signal and passing time of said data string of said one or more second data strings in said second coded signal;

(d1203) judging upon whether said difference (PCRcurrent_audio- last_PTS) computed in said computing step (d1201) is smaller than said difference (audio_th) computed in said computing step (d1202); and (d1204) locating said data string of said one or more second data strings in a rearward position of a data string of said one or more first data strings to be located in a rearward position of said data string of said one or more second data strings when it is judged that said difference (PCRcurrent_audio- last_PTS) computed in said computing step (d1201) is smaller than said difference (audio_th) computed in said computing step (d1202) in said judging step (d1203), and said outputting step (f)

has the step of (f1201) outputting said second coded signal at said predetermined time interval (n).

10. A method of transcoding a coded multiplexed sound and moving picture sequence, comprising the steps of:
   (a) inputting a first coded signal through a first transmitting path at an input bit rate;
   (b) demultiplexing said first coded signal inputted in said inputting step (a) into one or more first data strings, one or more second data strings, and one or more third data strings, said one or more first data strings each having a number of real inputting bits
   (c) transforming said one or more first data strings demultiplexed in said demultiplexing step (b) into one or more first data strings having a number of real outputting bits less than said number of real inputting bits of said one or more first data strings, respectively;
   (d) multiplexing said one or more transformed first data strings transformed in said transforming step (c), said one or more second data strings demultiplexed in said demultiplexing step (b), and one or more corrected third data strings to generate a second coded signal;
   (e) correcting said one or more third data strings demultiplexed in said demultiplexing step (b), on the basis of said first coded signal, in accordance with a change of said second coded signal to generate said one or more corrected third data strings having a number of real inputting bits when said one or more transformed first data strings, said one or more second data, and said one or more corrected third data strings are multiplexed in said multiplexing step (d); and
   (f) outputting said second coded signal through a second transmitting oath at a target bit rate lower than said input bit rate of said first coded signal,
      wherein said inputting step (a) has the step of (a2) inputting MPEG-2 transport streams, said demultiplexing step (b) has the step of (b2) demultiplexing said MPEG-2 transport streams inputted in said inputting step (a2) into one or more transport stream packets having a coded video signal having a number of real inputting bits as one or more first data strings, and said outputting step (f) has the step of (f2) outputting MPEG-2 transport streams having a video signal having a number of real outputting bits less than said number of real inputting bits of said coded video signal,
      wherein said multiplexing step (d) comprises the steps of:
         (d1301) computing a difference by subtracting a value of a synchronous time information element PCR (PCRcurrent_audio) to be past subsequently in said first coded signal from a value of a presentation time management information element PTS (next_PTS) of a just past data string of said one or more second data strings in said second coded signal;
         (d1302) computing a difference (audio_th) between passing time of said data string of said one or more second data strings in said first coded signal and passing time of said data string of said one or more second data strings in said second coded signal;
         (d1303) judging upon whether said difference (next_PTS-PCRcurrent_audio) computed in said computing step (d1301) is smaller than said difference (audio_th) computed in said computing step (d1302); and
         (d1304) locating said data string of said one or more second data strings in a forward position of a data string of said one or more first data strings to be located in a forward position of said data string of said one or more second data strings when it is judged that said difference (next_PTS-PCRcurrent_audio) computed in said computing step (d1301) is smaller than said difference (audio_th) computed in said computing step (d1302) in said judging step (d1303), and said outputting step (f) has the step of (f1301) outputting said second coded signal at said predetermined time interval (n).

11. An apparatus (600: 700: 200) for transcoding a coded multiplexed sound and moving picture sequence, comprising:
   inputting means (610: 710: 210) for inputting a first coded signal through a first transmitting path at an input bit rate;
   demultiplexing means (610: 710: 210) for demultiplexing said first coded signal inputted by said inputting means (610: 710: 210) into one or more first data strings, one or more second data strings, and one or more third data strings, said one or more first data strings each having a number of real inputting bits;
   transforming means (640: 744: 240) for transforming said one or more first data strings demultiplexed by said demultiplexing means (610: 710: 210) into one or more first data strings having a number of real outputting bits less than said number of real inputting bits of said one or more first data strings, respectively;
   multiplexing means for multiplexing said one or more transformed first data strings transformed by said transforming means (640: 744: 240), said one or more second data strings demultiplexed by said demultiplexing means (610: 710: 210), and one or more corrected third data strings to generate a second coded signal;
   correcting means (650: 742: 260) for correcting said one or more third data strings demultiplexed by said demultiplexing means (610: 710: 210), on the basis of said first coded signal, in accordance with a change of said second coded signal to generate said one or more corrected third data strings having a number of real inputting bits when said one or more transformed first data strings, said one or more second data, and said one or more corrected third data strings are multiplexed by said multiplexing means; and
   outputting means (620: 720: 220) for outputting said second coded signal through a second transmitting path at a target bit rate lower than said input bit rate of said first coded signal,
   said inputting means (610: 710: 210) for inputting a first coded signal through a first transmitting path is operable to input MPEG-2 transport streams, said demultiplexing means (610: 710: 210) is operable to demultiplex said MPEG-2 transport streams inputted by said inputting means (610: 710: 210) into one or more transport stream packets having a coded video signal having a number of real inputting bits as one or more first data strings, and said outputting means (620: 720: 220) is operable to output MPEG-2 transport streams having a video signal having a number of real outputting bits less than said number of real inputting bits of said coded video signal,
   wherein said demultiplexing means (710: 210) is operative to demultiplex MPEG-2 transport streams inputted at a predetermined time interval (n) by said inputting means (710: 210) into said one or more first data strings, said one or more second data strings, and said one or more third data strings, each having a number of real inputting bits, and said transforming means (744: 240) comprises:

a video elementary stream decoding unit (741; 742: 241; 242) for decoding said one or more first data strings to reconstruct video elementary streams having a number of real inputting bits and other information elementary streams, and separating said video elementary streams from said other information elementary streams;

a video elementary stream transforming unit (744: 100) for transforming said video elementary streams reconstructed and separated by said video elementary stream decoding unit (741; 742: 241; 242) to generate output video elementary streams having a number of real outputting bits (Video ES out(n)) less than said number of real inputting bits of said video elementary streams (Video ES in(n)); and a transformed first data string generating unit (745; 746: 245; 246) for generating one or more transformed first data strings having a number of real outputting bits less than said number of real inputting bits of said one or more first data strings demultiplexed by said demultiplexing means (710: 210) on the basis of said output video elementary streams generated by said video elementary stream transforming unit (744: 100) and said other information elementary streams (PAT, PMT) reconstructed and separated by said video elementary stream decoding unit (741; 742: 241; 242), whereby said multiplexing means is operable to multiplex said one or more transformed first data strings generated by said transformed first data string generating unit (745; 746: 245; 246), said one or more second data strings demultiplexed by said demultiplexing means (710: 210), and said one or more corrected third data strings corrected by said correcting means (742: 260) to generate a second coded signal to be outputted at said predetermined time interval (n), the apparatus (200) further comprising a computing unit (A) (113) being operative to:

assume that a number of real outputting bits of said one or more second data strings contained in said second coded signal at said predetermined time interval (n) is equal to a number of real inputting bits of said one or more second data strings (NonV_TS_in(n)) contained in said first coded signal at said predetermined time interval (n);

assume that a number of real outputting bits of said one or more third data strings (PATPMT_out) contained in said second coded signal at said predetermined time interval (n) is equal to said number of real inputting bits of said one or more corrected third data strings generated by said correcting means (260) at said predetermined time interval (n);

subtract said number of real inputting bits of said one or more second data strings (NonV_TS_in(n)) contained in said first coded signal at said predetermined time interval (n) and said number of real outputting bits of said one or more third data strings (PATPMT_out) contained in said second coded signal at said predetermined time interval (n) from a target number of outputting bits of all data strings (tAll_TS_out(n)) contained in said second coded signal at said predetermined time interval (n) to generate a value A (tNon_TS_out(n));

subtract a total number of real outputting bits of one or more transformed first data strings generated by said transformed first data string generating unit (245; 246) prior to said predetermined time interval from a total target number of outputting bits of one or more transformed first data strings generated by said transformed first data string generating unit (245; 246) prior to said predetermined time interval to generate a value (dVideo_TS (n)); and compute a target number of outputting bits of said transformed first data strings (tVideo_TS_out(n)) generated at said predetermined time interval (n) by said transformed first data string generating unit (245; 246) by adding said value A (tNon_TS_out (n)) and said value (dVideo_TS(n)).

12. The apparatus (600: 700: 200) as set forth in claim 11, which further comprises reference time setting means for computing a value of system clock (PCR) indicative of a start time said demultiplexing means (610: 710: 210), on the basis of a first reference time information element (first_PCR) contained in said first coded signal, and computing an initial value of said system clock (PCR_offset) for said second coded signal on the basis of said value of said system clock.

13. The apparatus (200) as set forth in claim 11, wherein said transforming means (100) further comprises:

a video transport stream packet decoding unit (241) for decoding said one or more transport stream packets having a coded video signal having a number of real inputting bits to reconstruct and output video PES packets;

a video PES packet decoding unit (242) for decoding said video PES packets decoded by said video transport stream packet decoding unit (241) to reconstruct and output video elementary streams having a real inputting bits, decoding time management information element DTS (DTS) and presentation time management information element PTS (PTS) of said video elementary streams, and PTS_DTS flags (PTS_DTS_flag) indicative of presence of said decoding time management information element DTS (DTS) and said presentation time management information element PTS (PTS);

a transforming unit (100) for transforming said video elementary streams decoded and outputted by said video PES packet decoding unit (242) into video elementary streams having a number of real outputting bits less than said number of real inputting bits of said video elementary streams (Video ES in(n));

a video PES packet generating unit (245) for generating transformed video PES packets on the basis of said transformed video elementary stream transformed by said transforming unit (100), said decoding time management information element DTS (DTS), said presentation time management information element PTS (PTS) and said PTS_DTS flags (PTS_DTS flag) indicative of presence of said decoding time management information element PTS (DTS) and said presentation time management information element PTS (PTS) decoded by said video PES packet decoding unit (242); and a video transport stream packet generating unit (246) for encoding said transformed video PES packets generated by said video PES packet generating unit (245) to generate a video transformed transport stream packets having a number of real outputting bits less than said number of real inputting bits of said video transport stream packets.

14. The apparatus (600: 700: 200) as set forth in claim 11, wherein said dew plexing means (610: 710: 210) is operative to demultiplex said first coded signal into transport stream packets having a coded audio signal as said one or more second data strings.

15. The apparatus (700: 200) as set forth in claim 11, wherein said demultiplexing means (710: 210) is operative to demultiplex MPEG-2 transport streams inputted at a predetermined time interval (n) by said inputting means (710: 210) into said one or more first data strings, said one or more second data strings, and said one or more third data strings, each having a number of real inputting bits, and said transforming means (744: 240) comprises:

a video elementary stream decoding unit (741; 742: 241; 242) for decoding said one or more first data strings to reconstruct video elementary streams having a number of real inputting bits and other information elementary streams, and separating said video elementary streams from said other information elementary streams;

a video elementary stream transforming unit (744: 100) for transforming said video elementary streams reconstructed and separated by said video elementary stream decoding unit (741; 742: 241; 242) to generate output video elementary streams having a number of real outputting bits (Video ES out(n)) less than said number of real inputting bits of said video elementary streams (Video ES in(n)); and a transformed first data string generating unit (745; 746: 245; 246) for generating one or more transformed first data strings having a number of real outputting bits less than said number of real inputting bits of said one or more first data strings demultiplexed by said demultiplexing means (710: 210) on the basis of said output video elementary streams generated by said video elementary stream transforming unit (744: 100) and said other information elementary streams (PAT, PMT) reconstructed and separated by said video elementary stream decoding unit (741; 742: 241; 242), whereby said multiplexing means is operable to multiplex said one or more transformed first data strings generated by said transformed first data string generating unit (745; 746: 245; 246), said one or more second data strings demultiplexed by said demultiplexing means (710: 210), and said one or more corrected third data strings corrected by said correcting means (742: 260) to generate a second coded signal to be outputted at said predetermined time interval (n).

16. An apparatus (600: 700: 200) for transcoding a coded multiplexed sound and moving picture sequence, comprising:

inputting means (610: 710: 210) for inputting a first coded signal through a first transmitting path at an input bit rate;

demultiplexing means (610: 710: 210) for demultiplexing said first coded signal inputted by said inputting means (610: 710: 210) into one or more first data strings, one or more second data strings, and one or more third data strings, said one or more first data strings each having a number of real inputting bits;

transforming means (640: 744: 240) for transforming said one or more first data strings demultiplexed by said demultiplexing means (610: 710: 210) into one or more first data strings having a number of real outputting bits less than said number of real inputting bits of said one or more first data strings, respectively;

multiplexing means for multiplexing said one or more transformed first data strings transformed by said transforming means (640: 744: 240), said one or more second data strings demultiplexed by said demultiplexing means (610: 710: 210), and one or more corrected third data strings to generate a second coded signal;

correcting means (650: 742: 260) for correcting said one or more third data strings demultiplexed by said demultiplexing means (610: 710: 210), on the basis of said first coded signal, in accordance with a change of said second coded signal to generate said one or more corrected third data strings having a number of real inputting bits when said one or more transformed first data strings, said one or more second data, and said one or more corrected third data strings are multiplexed by said multiplexing means; and outputting means (620: 720: 220) for outputting said second coded signal through a second transmitting path at a target bit rate lower than said input bit rate of said first coded signal, wherein said inputting means (610: 710: 210) for inputting a first coded signal through a first transmitting path is operable to input MPEG-2 transport streams, said demultiplexing means (610: 710: 210) is operable to demultiplex said MPEG-2 transport streams inputted by said inputting means (610: 710: 210) into one or more transport stream packets having a coded video signal having a number of real inputting bits as one or more first data strings, and said outputting means (620: 720: 220) is operable to output MPEG-2 transport streams having a video signal having a number of real outputting bits less than said number of real inputting bits of said coded video signal, wherein said demultiplexing means (710: 210) is operative to demultiplex MPEG-2 transport streams inputted at a predetermined time interval (n) by said inputting means (710: 210) into said one or more first data strings, said one or more second data strings, and said one or more third data strings, each having a number of real inputting bits, and said transforming means (744: 240) comprises:

a video elementary stream decoding unit (741; 742: 241; 242) for decoding said one or more first data strings to reconstruct video elementary streams having a number of real inputting bits and other information elementary streams, and separating said video elementary streams from said other information elementary streams;

a video elementary stream transforming unit (744: 100) for transforming said video elementary streams reconstructed and separated by said video elementary stream decoding unit (741; 742: 241; 242) to generate output video elementary streams having a number of real outputting bits (Video ES out(n)) less than said number of real inputting bits of said video elementary streams (Video ES in(n)); and a transformed first data string generating unit (745; 746: 245; 246) for generating one or more transformed first data strings having a number of real outputting bits less than said number of real inputting bits of said one or more first data strings demultiplexed by said demultiplexing means (710: 210) on the basis of said output video elementary streams generated by said video elementary stream transforming unit (744: 100) and said other information elementary streams (PAT, PMT) reconstructed and separated by said video elementary stream decoding unit (741; 742: 241; 242), whereby said multiplexing means is operable to multiplex said one or more transformed first data strings generated by said transformed first data string generating unit (745; 746: 245; 246), said one or more second data strings demultiplexed by said demultiplexing means (710: 210), and said one or more corrected third data strings corrected by said correcting means (742: 260) to generate a second coded signal to be outputted at said predetermined time interval (n), the apparatus further comprising:

computing unit (B) (113) being operative to compute a target number of outputting bits of said output video elementary streams (tVideo TSout (n)) on the basis of outputting bits of said second coded signal able to be outputted at said predetermined time interval (n);

computing unit (C) (115) being operative to compute a reference ratio of outputting bits to inputting bits (ioRatio (n)) on the basis of said target number of outputting bits of said output video elementary streams (tVideo TSout (n)) computed and said number of real inputting bits of said video elementary streams (Video ES in(n)) reconstructed by said video elementary stream decoding unit (241; 242); and computing unit (D) (115) being operative to compute a quantization scaling factor (Q(j)) required for transforming said video elementary streams to generate said output video elementary streams on the basis of said reference ratio of outputting bits to inputting bits (ioRatio (n)).

17. The apparatus (200) as set forth in claim 16, which further comprises:

computing unit (B) (115) being operative to compute a ratio of a total number of real outputting bits of said first one or more transformed data strings (outputTERatio (n)) generated by said transformed first data string generating unit (745; 746: 245; 246) prior to said predetermined time interval to a total number of real outputting bits of said output video elementary streams (totalVideoESout) prior to said predetermined time interval;

computing unit (F) (115) being operative to compute a target number of outputting bits of said output video elementary streams (tVideo TSout (n)) at said predetermined time interval (n) on the basis of said ratio (outputTERatio (n)) computed by the computing unit (E) (115); and computing unit (G) (115) being operative to compute a reference ratio of outputting bits to inputting bits (ioRatio (n)) on the basis of said target number of outputting bits of said output video elementary streams (tVideo TSout (n)) and said number of real inputting bits of said video elementary streams (Video ES in(n)) decoded by said video elementary stream decoding unit (241: 242).

18. An apparatus (600: 700: 200) for transcoding a coded multiplexed sound and moving picture sequence, comprising:

inputting means (610: 710: 210) for inputting a first coded signal through a first transmitting path at an input bit rate;

demultiplexing means (610: 710: 210) for demultiplexing said first coded signal inputted by said inputting means (610: 710: 210) into one or more first data strings, one or more second data strings, and one or more third data strings, said one or more first data strings each having a number of real inputting bits;

transforming means (640: 744: 240) for transforming said one or more first data strings demultiplexed by said demultiplexing means (610: 710: 210) into one or more first data strings having a number of real outputting bits less than said number of real inputting bits of said one or more first data strings, respectively;

multiplexing means for multiplexing said one or more transformed first data strings transformed by said transforming means (640: 744: 240), said one or more second data strings demultiplexed by said demultiplexing means (610: 710: 210), and one or more corrected third data strings to generate a second coded signal;

correcting means (650: 742: 260) for correcting said one or more third data strings demultiplexed by said demultiplexing means (610: 710: 210), on the basis of said first coded signal, in accordance with a change of said second coded signal to generate said one or more corrected third data strings having a number of real inputting bits when said one or more transformed first data strings, said one or more second data, and said one or more corrected third data strings are multiplexed by said multiplexing means; and outputting means (620: 720: 220) for outputting said second coded signal through a second transmitting path at a target bit rate lower than said input bit rate of said first coded signal, wherein said inputting means (610: 710: 210) for inputting a first coded signal through a first transmitting path is operable to input MPEG-2 transport streams, said demultiplexing means (610: 710: 210) is operable to demultiplex said MPEG-2 transport streams inputted by said inputting means (610: 710: 210) into one or more transport stream packets having a coded video signal having a number of real inputting bits as one or more first data strings, and said outputting means (620: 720: 220) is operable to output MPEG-2 transport streams having a video signal having a number of real outputting bits less than said number of real inputting bits of said coded video signal, wherein said demultiplexing means (710: 210) is operative to demultiplex MPEG-2 transport streams inputted at a predetermined time interval (n) by said inputting means (710: 210) into said one or more first data strings, said one or more second data strings, and said one or more third data strings, each having a number of real inputting bits, and said transforming means (744: 240) comprises:

a video elementary stream decoding unit (741; 742: 241; 242) for decoding said one or more first data strings to reconstruct video elementary streams having a number of real inputting bits and other information elementary streams, and separating said video elementary streams from said other information elementary streams;

a video elementary stream transforming unit (744: 100) for transforming said video elementary streams reconstructed and separated by said video elementary stream decoding unit (741; 742: 241; 242) to generate output video elementary streams having a number of real outputting bits (Video ES out(n)) less than said number of real inputting bits of said video elementary streams (Video ES in(n)); and a transformed first data string generating unit (745; 746: 245; 246) for generating one or more transformed first data strings having a number of real outputting bits less than said number of real inputting bits of said one or more first data strings demultiplexed by said demultiplexing means (710: 210) on the basis of said output video elementary streams generated by said video elementary stream transforming unit (744: 100) and said other information elementary streams (PAT, PMT) reconstructed and separated by said video elementary stream decoding unit (741; 742: 241; 242), whereby said multiplexing means is operable to multiplex said one or more transformed first data strings generated by said transformed first data string generating unit (745; 746: 245; 246), said one or more second data strings demultiplexed by said demultiplexing means (710: 210), and said one or more corrected third data strings corrected by said correcting means (742: 260) to generate a second coded signal to be outputted at said predetermined time interval (n), wherein said transforming means (240) comprises:

computing unit (H) (119) being operative to compute a total number of real outputting bits of said output video elementary streams (totalVideoESout') generated by said video elementary stream transforming unit (100);

computing unit (I) (119) being operative to compute a sum (THout(n)) of a target number of outputting bits of said output video elementary streams (tVideoTSout (n)) at said predetermined time interval (n) and a total number of real outputting bits of said output video elementary streams (totalVideoESout) which have been generated until the time when video elementary streams inputted prior to said predetermined time interval into a video ES buffer are consumed;

judging unit (A) (119) being operative to judge upon whether said total number of real outputting bits of said output video elementary streams (totalVideoESout') computed by said computing unit (H) (119) is greater than said sum (THout(n)) computed by said computing unit (1)(119); and control unit (119) being operative to terminate said transforming means (240) and starting said multiplexing means for processing said one or more transformed first data strings when it is judged that said total number of real outputting bits (totalVideoESout) is greater than by said sum (THout(n)) judging unit (A) (119).

19. An apparatus (600: 700: 200) for transcoding a coded multiplexed sound and moving picture sequence, comprising:

inputting means (610: 710: 210) for inputting a first coded signal through a first transmitting path at an input bit rate;

demultiplexing means (610: 710: 210) for demultiplexing said first coded signal inputted by said inputting means (610: 710: 210) into one or more first data strings, one or more second data strings, and one or more third data strings, said one or more first data strings each having a number of real inputting bits;

transforming means (640: 744: 240) for transforming said one or more first data strings demultiplexed by said demultiplexing means (610: 710: 210) into one or more first data strings having a number of real outputting bits less than said number of real inputting bits of said one or more first data strings, respectively;

multiplexing means for multiplexing said one or more transformed first data strings transformed by said transforming means (640: 744: 240), said one or more second data strings demultiplexed by said demultiplexing means (610: 710: 210), and one or more corrected third data strings to generate a second coded signal;

correcting means (650: 742: 260) for correcting said one or more third data strings demultiplexed by said demultiplexing means (610: 710: 210), on the basis of said first coded signal, in accordance with a change of said second coded signal to generate said one or more corrected third data strings having a number of real inputting bits when said one or more transformed first data strings, said one or more second data, and said one or more corrected third data strings are multiplexed by said multiplexing means; and outputting means (620: 720: 220) for outputting said second coded signal through a second transmitting path at a target bit rate lower than said input bit rate of said first coded signal, wherein said inputting means (610: 710: 210) for inputting a first coded signal through a first transmitting path is operable to input MPEG-2 transport streams, said demultiplexing means (610: 710: 210) is operable to demultiplex said MPEG-2 transport streams inputted by said inputting means (610: 710: 210) into one or more transport stream packets having a coded video signal having a number of real inputting bits as one or more first data strings, and said outputting means (620: 720: 220) is operable to output MPEG-2 transport streams having a video signal having a number of real outputting bits less than said number of real inputting bits of said coded video signal, wherein said multiplexing means comprises:

computing unit (J) (119) being operative to compute a PTS to PCR difference by subtracting a value of lastly past presentation time management information element PTS (last_PTS) of said first coded signal from a value of a synchronous time information element PCR (PCRcurrent_audio) located in a head position of a data string of said one or more second data strings;

computing unit (K) (119) being operative to compute a passing time difference (audio_th) between passing time of said data string of said one or more second data strings in said first coded signal and passing time of said data string of said one or more second data strings in said second coded signal;

judging unit (B) (220) being operative to judge upon whether said PTS to PCR difference (PCRcurrent_audio- last_PTS) computed by said computing unit (J) (119) is smaller than said passing time difference (audio_th) computed by said computing unit (K) (119); and locating unit (A) (220) being operative to locate said data string of said one or more second data strings in a rearward position of a data string of said one or more first data strings to be located in a rearward position of said data string of said one or more second data strings when it is judged that said PTS to PCR difference (PCRcurrent_audio- last_PTS) computed by said computing unit (J) (119) is smaller than said passing time difference (audio_th) computed by said computing unit (K) (119) by said judging unit (B) (220), and said outputting means (220) is operative to output said second coded signal at said predetermined time interval (n).

20. An apparatus (600: 700: 200) for transcoding a coded multiplexed sound and moving picture sequence, comprising:
- inputting means (610: 710: 210) for inputting a first coded signal through a first transmitting path at an input bit rate;
- demultiplexing means (610: 710: 210) for demultiplexing said first coded signal inputted by said inputting means (610: 710: 210) into one or more first data strings, one or more second data strings, and one or more third data strings, said one or more first data strings each having a number of real inputting bits;
- transforming means (640: 744: 240) for transforming said one or more first data strings demultiplexed by said demultiplexing means (610: 710: 210) into one or more first data strings having a number of real outputting bits less than said number of real inputting bits of said one or more first data strings, respectively;
- multiplexing means for multiplexing said one or more transformed first data strings transformed by said transforming means (640: 744: 240), said one or more second data strings demultiplexed by said demultiplexing means (610: 710: 210), and one or more corrected third data strings to generate a second coded signal;
- correcting means (650: 742: 260) for correcting said one or more third data strings demultiplexed by said demultiplexing means (610: 710: 210), on the basis of said first coded signal, in accordance with a change of said second coded signal to generate said one or more corrected third data strings having a number of real inputting bits when said one or more transformed first data strings, said one or more second data, and said one or more corrected third data strings are multiplexed by said multiplexing means; and
- outputting means (620: 720: 220) for outputting said second coded signal through a second transmitting path at a target bit rate lower than said input bit rate of said first coded signal,
- wherein said inputting means (610: 710: 210) for inputting a first coded signal through a first transmitting path is operable to input MPEG-2 transport streams, said demultiplexing means (610: 710: 210) is operable to demultiplex said MPEG-2 transport streams inputted by said inputting means (610: 710: 210) into one or more transport stream packets having a coded video signal having a number of real inputting bits as one or more first data strings, and said outputting means (620: 720: 220) is operable to output MPEG-2 transport streams having a video signal having a number of real outputting bits less than said number of real inputting bits of said coded video signal,
- wherein said multiplexing means comprises:
  - computing unit (L) (119) being operative to compute a PCR to PTS difference by subtracting a value of a synchronous time information element PCR (PCRcurrent_audio) to be past subsequently in said first coded signal from a value of a presentation time management information element PTS (next_PTS) of a just past data string of said one or more second data strings in said second coded signal;
  - computing unit (M) (119) being operative to compute a passing time difference (audio_th) between passing time of said data string of said one or more second data strings in said first coded signal and passing time of said data string of said one or more second data strings in said second coded signal;
  - judging unit (C) (220) being operative to judge upon whether said PCR to PTS difference (next_PTS-PCRcurrent_audio) computed by said computing unit (L) (119) is smaller than said passing time difference (audio_th) computed by said computing unit (M) (119); and
  - locating unit (B) (220) being operative to locate said data string of said one or more second data strings in a forward position of a data string of said one or more first data strings to be located in a forward position of said data string of said one or more second data strings when it is judged that said PCR to PTS difference (next_PTS-PCRcurrent_audio) computed by said computing unit (L) (119) is smaller than said passing time difference (audio_th) computed by said computing unit (M) (119), and said outputting means (220) is operative to output said second coded signal at said predetermined time interval (n).

21. A computer program product comprising a computer usable storage medium having computer readable code embodied therein for transcoding a coded multiplexed sound and moving picture sequence, comprising:
- (a) computer readable program code for inputting a first coded signal through a first transmitting path at an input bit rate;
- (b) computer readable program code for demultiplexing said first coded signal inputted by said computer readable program code (a) into one or more first data strings, one or more second data strings, and one or more third data strings, said one or more first data strings each having a number of real inputting bits;
- (c) computer readable program code for transforming said one or more first data strings demultiplexed by said computer readable program code (b) into one or more first data strings having a number of real outputting bits less than said number of real inputting bits of said one or more first data strings, respectively;
- (d) computer readable program code for multiplexing said one or more transformed first data strings transformed by said computer readable program code (c), said one or more second data strings demultiplexed by said computer readable program code (b), and one or more corrected third data strings to generate a second coded signal;
- (e) computer readable program code for correcting said one or more third data strings demultiplexed by said computer readable program code (b), on the basis of said first coded signal, in accordance with a change of said second coded signal to generate said one or more corrected third data strings having a number of real inputting bits when said one or more transformed first data strings, said one or more second data, and said one or more corrected third data strings are multiplexed by said computer readable program code (d); and
- (f) computer readable program code for outputting said second coded signal through a second transmitting path at a target bit rate lower than said input bit rate of said first coded signal,
- wherein said computer readable program code (a) has computer readable program code (a2) for inputting MPEG-2 transport streams, said computer readable program code (b) has computer readable program code (b2) for demultiplexing said MPEG-2 transport streams inputted by said computer readable program code (a2) into one or more transport stream packets having a coded video signal having a number of real inputting bits as one or more first data strings, and said computer readable program code (f) has computer readable program code (f2) for outputting MPEG-2 transport streams having a video signal having a number of real outputting bits less than said number of real inputting bits of said coded video signal, wherein said computer readable program code (b) has computer readable program code (b71) for demultiplexing MPEG-2 transport streams inputted at a predetermined time interval (n) by said computer readable program code (a) into said one or more first data strings, said one or more second data strings, and said one or more third data strings, each having a number of real inputting bits, and said computer readable program code (c) comprises:

(c71) computer readable program code for decoding said one or more first data strings to reconstruct video elementary streams having a number of real inputting bits and other information elementary streams, and separating said video elementary streams from said other information elementary streams;

(c72) computer readable program code for transforming said video elementary streams reconstructed and separated by said computer readable program code (c71) to generate output video elementary streams having a number of real outputting bits (Video ES out(n)) less than said number of real inputting bits of said video elementary streams (Video ES in(n)); and (c73) computer readable program code for generating one or more transformed first data strings having a number of real outputting bits less than said number of real inputting bits of said one or more first data strings demultiplexed by said computer readable program code (b71) on the basis of said output video elementary streams reconstructed by said computer readable program code (c72) and said other information elementary streams (PAT, PMT) reconstructed and separated by said computer readable program code (c71), whereby said computer readable program code (d) has computer readable program code (d71) for multiplexing said one or more transformed first data strings generated by said computer readable program code (c73), said one or more second data strings demultiplexed by said computer readable program code (b71), and said one or more corrected third data strings corrected by said computer readable program code (e) to generate a second coded signal to be outputted at said predetermined time interval (n), wherein said computer readable program code (c) comprises:

(c81) computer readable program code for assuming that a number of real outputting bits of said one or more second data strings contained in said second coded signal at said predetermined time interval (n) is equal to a number of real inputting bits of said one or more second data strings (NonV_TS_in(n)) contained in said first coded signal at said predetermined time interval (n);

(c82) computer readable program code for assuming that a number of real outputting bits of said one or more third data strings (PATPMT_out) contained in said second coded signal at said predetermined time interval (n) is equal to said number of real inputting bits of said one or more corrected third data strings generated by said computer readable program code (e) at said predetermined time interval (n);

(c83) computer readable program code for subtracting said number of real inputting bits of said one or more second data strings (Non_TS_n(n)) contained in said first coded signal at said predetermined time interval (n) and said number of real outputting bits of said one or more third data strings (PATPMT_out) contained in said second coded signal at said predetermined time interval (n) from a target number of outputting bits of all data strings (tAll_TS_out(n)) contained in said second coded signal at said predetermined time interval (n) to generate a value A (tNon_TS_out(n));

(c84) computer readable program code for subtracting a total number of real outputting bits of one or more transformed first data strings generated by said computer readable program code (c73) prior to said predetermined time interval from a total target number of outputting bits of one or more transformed first data strings generated by said computer readable program code (c73) prior to said predetermined time interval to generate a value (dVideo_TS (n)); and (c85) computer readable program code for computing a target number of outputting bits of said transformed first data strings (tVideo_TS_out(n)) generated at said predetermined time interval (n) by said computer readable program code (c73) by adding said value A (tNon_TS_out(n)) and said value (dVideo_TS (n)).

22. The computer program product as set forth in claim 21, which further comprises:

(g) computer readable program code for computing a value of system clock (PCR) indicative of a start time of said computer readable program code (b), on the basis of a first reference time information element (first_PCR) contained in said first coded signal; and (h) computer readable program code for computing an initial value of said system clock (PCR_offset) for said second coded signal on the basis of said value of said system clock computed by said computer readable program code (g).

23. The computer program product as set forth in claim 21, wherein said computer readable program code (c) further comprises:

(c51) computer readable program code for decoding said one or more transport stream packets having a coded video signal having a number of real inputting bits to reconstruct and output video PES packets;

(c52) computer readable program code for decoding said video PES packets decoded by said computer readable program code (c51) to reconstruct and output video elementary streams having a real inputting bits, decoding time management information element DTS (DTS) and presentation time management information element PTS (PTS) of said video elementary streams, and PTS_DTS flags (PTS_DTS_flag) indicative of presence of said decoding time management information element DTS (DTS) and said presentation time management information element PTS (PTS);

(c53) computer readable program code for transforming said video elementary streams decoded and outputted by said computer readable program code (c52) into video elementary streams having a number of real outputting bits less than said number of real inputting bits of said video elementary streams (Video ES in (n));

(c54) computer readable program code for generating transformed video PES packets on the basis of said transformed video elementary stream transformed by said computer readable program code (c53), said decoding time management information element DTS (DTS), said presentation time management information element PTS (PTS) and said PTSDTS flags (PTS_DTS_flag) indicative of presence of said decoding time management information element DTS (DTS) and said presentation time management information element PTS (PTS) decoded and outputted by said computer readable program code (c52); and (c55) computer readable program code for encoding said transformed video PES packets generated by said computer readable program code (c54) to generate a transformed video transport stream packets having a number of real outputting bits less than said number of real inputting bits of said video transport stream packets.

24. The computer program product as set forth in claim 21, wherein said computer readable program code (b) has computer readable program code for demultiplexing said first coded signal into transport stream packets having a coded audio signal as said one or more second data strings.

25. The computer program product as set forth in claim 21, wherein said computer readable program code (b) has computer readable program code (b71) for demultiplexing MPEG-2 transport streams inputted at a predetermined time interval (n) by said computer readable program code (a) into said one or more first data strings, said one or more second data strings, and said one or more third data strings, each having a number of real inputting bits, and said computer readable program code (c) comprises:

(c71) computer readable program code for decoding said one or more first data strings to reconstruct video elementary streams having a number of real inputting bits and other information elementary streams, and separating said video elementary streams from said other information elementary streams;

(c72) computer readable program code for transforming said video elementary streams reconstructed and separated by said computer readable program code (c71) to generate output video elementary streams having a number of real outputting bits (Video ES out(n)) less than said number of real inputting bits of said video elementary streams (Video ES in(n)); and (c73) computer readable program code for generating one or more transformed first data strings having a number of real outputting bits less than said number of real inputting bits of said one or more first data strings demultiplexed by said computer readable program code (b71) on the basis of said output video elementary streams reconstructed by said computer readable program code (c72) and said other information elementary streams (PAT, PMT) reconstructed and separated by said computer readable program code (c71), whereby said computer readable program code (d) has computer readable program code (d71) for multiplexing said one or more transformed first data strings generated by said computer readable program code (c73), said one or more second data strings demultiplexed by said computer readable program code (b71), and said one or more corrected third data strings corrected by said computer readable program code (e) to generate a second coded signal to be outputted at said predetermined time interval (n).

26. A computer program product comprising a computer usable storage medium having computer readable code embodied therein for transcoding a coded multiplexed sound and moving picture sequence, comprising:

(a) computer readable program code for inputting a first coded signal through first transmitting path at an input bit rate;

(b) computer readable program code for demultiplexing said first coded signal inputted by said computer readable program code (a) into one or more first data strings, one or more second data strings, and one or more third data strings, said one or more first data strings each having a number of real inputting bits;

(c) computer readable program code for transforming said one or more first data strings demultiplexed by said computer readable program code (b) into one or more first data strings having a number of real outputting bits less than said number of real inputting bits of said one or more first data strings, respectively;

(d) computer readable program code for multiplexing said one or more transformed first data strings transformed by said computer readable program code (c), said one or more second data strings demultiplexed by said computer readable program code (b), and one or more corrected third data strings to generate a second coded signal;

(e) computer readable program code for correcting said one or more third data strings demultiplexed by said computer readable program code (b), on the basis of said first coded signal, in accordance with a change of said second coded signal to generate said one or more corrected third data strings having a number of real inputting bits when said one or more transformed first data strings, said one or more second data, and said one or more corrected third data strings are multiplexed by said computer readable program code (d); and (f) computer readable program code for outputting said second coded signal through a second transmitting path at a target bit rate lower than said input bit rate of said first coded signal, wherein said computer readable program code (a) has computer readable program code (a2) for inputting MPEG-2 transport streams, said computer readable program code (b) has computer readable program code (b2) for demultiplexing said MPEG-2 transport streams inputted by said computer readable program code (a2) into one or more transport stream packets having a coded video signal having a number of real inputting bits as one or more first data strings, and said computer readable program code (f) has computer readable program code (f2) for outputting MPEG-2 transport streams having a video signal having a number of real outputting bits less than said number of real inputting bits of said coded video signal, wherein said computer readable program code (b) has computer readable program code (b71) for demultiplexing MPEG-2 transport streams inputted at a predetermined time interval (n) by said computer readable program code (a) into said one or more first data strings, said one or more second data strings, and said one or more third data strings, each having a number of real inputting bits, and said computer readable program code (c) comprises:

(c71) computer readable program code for decoding said one or more first data strings to reconstruct video elementary streams having a number of real inputting bits and other information elementary streams, and separating said video elementary streams from said other information elementary streams;

(c72) computer readable program code for transforming said video elementary streams reconstructed and separated by said computer readable program code (c71) to generate output video elementary streams having a number of real outputting bits (Video ES out(n)) less than said number of real inputting bits of said video elementary streams (Video ES in(n)); and (c73) computer readable program code for generating one or more transformed first data strings having a number of real outputting bits less than said number of real inputting bits of said one or more first data strings demultiplexed by said computer readable program code (b71) on the basis of said output video elementary streams reconstructed by said computer readable program code (c72) and said other information elementary streams (PAT, PMT) reconstructed and separated by said computer readable program code (c71), whereby said computer readable program code (d) has computer readable program code (d71) for multiplexing said one or more transformed first data strings generated by said computer readable program code (c73), said one or more second data strings demultiplexed by said computer readable program code (b71), and said one or more corrected third data strings corrected by said computer readable program code (e) to generate a second coded signal to be outputted at said predetermined time interval (n), wherein said computer readable program code (c72) comprises:

(c91) computer readable program code for computing a target number of outputting bits of said output video elementary streams (tVideo TSout (n)) on the basis of outputting bits of said second coded signal able to be outputted at said predetermined time interval (n);

(c92) computer readable program code for computing a reference ratio of outputting bits to inputting bits (ioRatio (n)) on the basis of said target number of outputting bits of said output video elementary streams (tVideo TSout (n)) computed by said computer readable program code (c91) and said number of real inputting bits of said video elementary streams (Video ES in(n)) reconstructed by said computer readable program code (c71); and (c93) computer readable program code for computing a quantization scaling factor (Q(j)) required for transforming said video elementary streams to generate said output video elementary streams, on the basis of said reference ratio of outputting bits to inputting bits (ioRatio (n)) computed by said computer readable program code (c92).

27. The computer program product as set forth in claim 26, wherein said computer readable program code (c91) comprises:

(c101) computer readable program code for computing a ratio of a total number of real outputting bits of said first one or more transformed data strings (outputTERatio (n)) generated by said computer readable program code (c73) prior to said predetermined time interval to a total number of real outputting bits of said output video elementary streams (totalVideoESout) prior to said predetermined time interval; and (c102) computer readable program code for computing a target number of outputting bits of said output video elementary streams (tVideo TSout (n)) at said predetermined time interval (n) on the basis of said ratio computed by said computer readable program code (c101), and said computer readable program code (c92) has computer readable program code (c103) for computing a reference ratio of outputting bits to inputting bits (ioRatio (n)) on the basis of said target number of outputting bits of said output video elementary streams (tVideo TSout (n)) computed by said computer readable program code (c102) and said number of real inputting bits of said video elementary streams (Video ES in(n)) reconstructed by said computer readable program code (c71).

28. A computer program product comprising a computer usable storage medium having computer readable code embodied therein for transcoding a coded multiplexed sound and moving picture sequence, comprising:

(a) computer readable program code for inputting a first coded signal through a first transmitting path at an input bit rate;

(b) computer readable program code for demultiplexing said first coded signal inputted by said computer readable program code (a) into one or more first data strings, one or more second data strings, and one or more third data strings, said one or more first data strings each having a number of real inputting bits;

(c) computer readable program code for transforming said one or more first data strings demultiplexed by said computer readable program code (b) into one or more first data strings having a number of real outputting bits less than said number of real inputting bits of said one or more first data strings, respectively (d) computer readable program code for multiplexing said one or more transformed first data strings transformed by said computer readable program code (c), said one or more second data strings demultiplexed by said computer readable program code (b), and one or more connected third data strings to generate a second coded signal;

(e) computer readable program code for correcting said one or more third data strings demultiplexed by said computer readable program code (b), on the basis of said first coded signal, in accordance with a change of said second coded signal to generate said one or more corrected third data strings having a number of real inputting bits when said one or more transferred first data strings, said one or more second data, and said one or more corrected third data strings are multiplexed by said computer readable program code (d); and (f) computer readable program code for outputting said second coded signal through a second transmitting path at a target bit rate lower than said input bit rate of said first coded signal, wherein said computer readable program code (a) has computer readable program code (a2) for inputting MPEG-2 transport streams, said computer readable program code (b) has computer readable program code (b2) for demultiplexing said MPEG-2 transport streams inputted by said computer readable program code (a2) into one or more transport stream packets having a coded video signal having a number of real inputting bits as one or more first data strings, and said computer readable program code (f) has computer readable program code (f2) for outputting MPEG-2 transport streams having a video signal having a number of real outputting bits less than said number of real inputting bits of said coded video signal, wherein said computer readable program code (b) has computer readable program code (b71) for demultiplexing MPEG-2 transport streams inputted at a predetermined time interval (n) by said computer readable program code (a) into said one or more first data strings, said one or more second data strings, and said one or more third data strings, each having a number of real inputting bits, and said computer readable program code (c) comprises:

- (c71) computer readable program code for decoding said one or more first data strings to reconstruct video elementary streams having a number of real inputting bits and other information elementary streams, and separating said video elementary streams from said other information elementary streams;
- (c72) computer readable program code for transforming said video elementary streams reconstructed and separated by said computer readable program code (c71) to generate output video elementary streams having a number of real outputting bits (Video ES out(n)) less than said number of real inputting bits of said video elementary streams (Video ES in(n)); and
- (c73) computer readable pro gram code for generating one or more transformed first data strings having a number of real outputting bits less than said number of real inputting bits of said one or more first data strings demultiplexed by said computer readable program code (b71) on the basis of said output video elementary streams reconstructed by said computer readable program code (c72) and said other information elementary streams (PAT, PMT) reconstructed and separated by said computer readable program code (c71), whereby said computer readable program code (d) has computer readable program code (d71) for multiplexing said one or more transformed first data strings generated by said computer readable program code (c73), said one or more second data strings demultiplexed by said computer readable program code (b71), and said one or more corrected third data strings corrected by said computer readable program code (e) to generate a second coded signal to be outputted at said predetermined time interval (n), wherein said computer readable program code (c) comprises:

- (c1011) computer readable program code for computing a total number of real outputting bits of said output video elementary streams (totalVideoESout') reconstructed by said computer readable program code (c72);
- (c1021) computer readable program code for computing a sum (THout(n)) of a target number of outputting bits of said output video elementary streams (tVideo TSout (n)) at said predetermined time interval (n) and a total number of real outputting bits of said output video elementary streams (totalVideoESout) which have been generated until the time when video elementary streams inputted prior to said predetermined time interval into a video ES buffer are consumed;
- (c1103) computer readable program code for judging upon whether said total number of real outputting bits of said output video elementary streams (totalVideoESout') computed by said computer readable program code (c1101) is greater than said sum (THout(n)) computed by said computer readable program code (c1102); and
- (c1104) computer readable program code for terminating said computer readable program code (c) and starting said computer readable program code (d) for processing said one or more transformed first data strings when it is judged that said total number of real outputting bits is greater than said sum (THout(n)) by said computer readable program code (c1103).

29. A computer program product comprising a computer usable storage medium having computer readable code embodied therein for transcoding a coded multiplexed sound and moving picture sequence, comprising:

- (a) computer readable program code for inputting a first coded signal through first transmitting path at an input bit rate;
- (b) computer readable program code for demultiplexing said first coded signal inputted by said computer readable program code (a) into one or more first data strings, one or more second data strings, and one or more third data strings, said one or more first data strings each having a number of real inputting bits;
- (c) computer readable program code for transforming said one or more first data strings demultiplexed by said computer readable program code (b) into one or more first data strings having a number of real outputting bits less than said number of real inputting bits of said one or more first data strings, respectively;
- (d) computer readable program code for multiplexing said one or more transformed first data strings transformed by said computer readable program code (c), said one or more second data strings demultiplexed by said computer readable program code (b), and one or more corrected third data strings to generate a second coded signal;
- (e) computer readable program code for correcting said one or more third data strings demultiplexed by said computer readable program code (b), on the basis of said first coded signal, in accordance with a change of said second coded signal to generate said one or more corrected third data strings having a number of real inputting bits when said one or more transformed first data strings, said one or more second data, and said one or more corrected third data strings are multiplexed by said computer readable program code (d), and
- (f) computer readable program code for outputting said second coded signal through a second transmitting path at a target bit rate lower than said input bit rate of said first coded signal, wherein said computer readable program code (a) has computer readable program code (a2) for inputting MPEG-2 transport streams, said computer readable program code (b) has computer readable program code (b2) for demultiplexing said MPEG-2 transport streams inputted by said computer readable program code (a2) into one or more transport stream packets having a coded video signal having a number of real inputting bits as one or more first data strings, and said computer readable program code (f) has computer readable program code (f2) for outputting MPEG-2 transport streams having a video signal having a number of real outputting bits less than said number of real inputting bits of said coded video signal, wherein said computer readable program code (d) comprises:
- (d1201) computer readable program code for computing a difference by subtracting a value of lastly past presentation time management information element PTS (last_PTS) of said first coded signal from a value of a synchronous time information element PCR (PCRcurrent_audio) located in a head position of a data string of said one or more second data strings;
- (d1202) computer readable program code for computing a difference (audio_th) between passing dine of said data string of said one or more second data strings in said first coded signal and passing time of said data string of said one or more second data strings in said second coded signal;
- (d1203) computer readable program code for judging upon whether said difference computed (PCRcurrent_audio- last_PTS) by said computer readable program product (d1201) is smaller than said difference (audio_th) computed by said computer readable program code (d1202); and (d1204) computer readable program code for locating said data string of said one or more second data strings in a rearward position of a data string of said one or more first data strings to be located in a rearward position of said data string of said one or more second data strings when it is judged that said difference (PCRcurrent_audio- last_PTS) computed by said computer readable program product (d1201) is smaller than said difference (audio_th) computed by said computer readable program code (d1202) by said computer readable program product (d1203), and said computer readable program code (f) has computer readable program code (f1201) for outputting said second coded signal at said predetermined time interval (n).

30. A computer program product comprising a computer usable storage medium having computer readable code embodied therein for transcoding a coded multiplexed sound and moving picture sequence, comprising:
- (a) computer readable program code for inputting a first coded signal through first transmitting path at an input bit rate;
- (b) computer readable program code for demultiplexing said first coded signal inputted by said computer readable program code (a) into one or more first data strings, one or more second data strings, and one or more third data strings, said one or more first data strings each having a number of real inputting bits;
- (c) computer readable program code for transforming said one or more first data strings demultiplexed by said computer readable program code (b) into one or more first data strings having a number of real outputting bits less than said number of real inputting bits of said one or more first data strings, respectively;
- (d) computer readable program code for multiplexing said one or more transformed first data strings transformed by said computer readable program code (c), said one or more second data strings demultiplexed by said computer readable program code (b), and one or more corrected third data strings to generate a second coded signal;
- (e) computer readable program code for correcting said one or more third data strings demultiplexed by said computer readable program code (b), on the basis of said first coded signal, in accordance with a change of said second coded signal to generate said one or more corrected third data strings having a number of real inputting bits when said one or more transformed first data strings, said one or more second data, and said one or more corrected third data strings are multiplexed by said computer readable program code (d); and
- (f) computer readable program code for outputting said second coded signal through a second transmitting path at a target bit rate lower than said input bit rate of said first coded signal, wherein said computer readable program code (a) has computer readable program code (a2) for inputting MPEG-2 transport streams, said computer readable program code (b) has computer readable program code (b2) for demultiplexing said MPEG-2 transport streams inputted by said computer readable program code (a2) into one or more transport stream packets having a coded video signal having a number of real inputting bits as one or more first data strings, and said computer readable program code (f) has computer readable program code (f2) for outputting MPEG-2 transport streams having a video signal having a number of real outputting bits less than said number of real inputting bits of said coded video signal, wherein said computer readable program code (d) comprises:
- (d1301) computer readable program code for computing a difference by subtracting a value of a synchronous time information element PCR (PCRcurrent_audio) to be past subsequently in said first coded signal from a value of a presentation time management information element PTS (next_PTS) of a just past data string of said one or more second data strings in said second coded signal;
- (d1302) computer readable program code for computing a difference (audio_th) between passing time of said data string of said one or more second data strings in said first coded signal and passing time of said data string of said one or more second data strings in said second coded signal;
- (d1303) computer readable program code for judging upon whether said difference (next_PTS-PCRcurrent_audio) computed by said computer readable program code (d1301) is smaller than said difference (audio_th) computed by said computer readable program code (d1302); and
- (d1304) computer readable program code for locating said data string of said one or more second data strings in a forward position of a data string of said one or more first data strings to be located in a forward position of said data string of said one or more second data strings when it is judged that said difference (next_PTS-PCRcurrent_audio) computed by said computer readable program code (d1301) is smaller than said difference (audio_th) computed by said computer readable program code (d1302) by said computer readable program code (d1303), and said computer readable program code (f) has computer readable program code (f1301) for outputting said second coded signal at said predetermined time interval (n).

* * * * *